(12) United States Patent
Ohmori et al.

(10) Patent No.: US 10,198,598 B2
(45) Date of Patent: Feb. 5, 2019

(54) INFORMATION PROCESSING DEVICE AND METHOD, PROGRAM, AND RECORDING MEDIUM

(71) Applicant: SONY CORPORATION, Tokyo (JP)

(72) Inventors: Mutsuhiro Ohmori, Kanagawa (JP); Tomohiro Tsunoda, Tokyo (JP); Shigehiro Shimada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 550 days.

(21) Appl. No.: 14/482,917

(22) Filed: Sep. 10, 2014

(65) Prior Publication Data

US 2014/0380449 A1 Dec. 25, 2014

Related U.S. Application Data

(63) Continuation of application No. 10/566,472, filed as application No. PCT/JP2004/011160 on Aug. 4, 2004, now Pat. No. 9,015,112.

(30) Foreign Application Priority Data

Aug. 8, 2003 (JP) .................. 2003-290053

(51) Int. Cl.
*G06F 7/00* (2006.01)
*G06F 21/79* (2013.01)
(Continued)

(52) U.S. Cl.
CPC .......... *G06F 21/79* (2013.01); *G06F 17/3074* (2013.01); *G06F 21/32* (2013.01);
(Continued)

(58) Field of Classification Search
CPC .................................................. G06F 17/3074
See application file for complete search history.

(56) References Cited

U.S. PATENT DOCUMENTS 6,236,981 B1 5/2001 Hill
6,308,203 B1 10/2001 Itabashi et al.
(Continued)

FOREIGN PATENT DOCUMENTS

GB 2 366 881 A 3/2002
JP 2000-148691 5/2000
(Continued)

OTHER PUBLICATIONS

"System and Methods for Automated, Controlled Situational Personal Information Distribution" ("This is I"); ip.com Journal; ip.com Inc.; West Henrietta; NY, US; Aug. 22, 2003; XP013012478; ISSN:1533-0001; 6 pgs.

(Continued)

*Primary Examiner* — Ajith Jacob
(74) *Attorney, Agent, or Firm* — Xsensus LLP

(57) ABSTRACT

To improve the convenience of a user and further provide service comfortable and safe for the user. A PK storing PMD as personal related information of a user communicates with a service system. When first using the service system, the PK stores the service ID of the service system and a spoofing preventing method. When the PK communicates with the service system for a second time and thereafter, a spoofing preventing process is mutually performed, and then the PMD is provided to the service system. The service system reads or changes the PMD on the basis of access permission information set in advance by the user. The present disclosure is applicable to PDAs.

20 Claims, 58 Drawing Sheets

(51) Int. Cl.
  *G06F 17/30* (2006.01)
  *G06F 21/32* (2013.01)
  *G06F 21/35* (2013.01)
  *G07C 9/00* (2006.01)
  *H04L 29/06* (2006.01)

(52) U.S. Cl.
  CPC ......... *G06F 21/35* (2013.01); *G07C 9/00158* (2013.01); *H04L 63/0428* (2013.01); *H04L 63/08* (2013.01); *H04L 63/102* (2013.01)

(56) References Cited

U.S. PATENT DOCUMENTS

| | | | |
|---|---|---|---|
| 6,405,049 | B2 | 6/2002 | Herrod et al. |
| 2002/0107649 | A1 | 8/2002 | Takiguchi et al. |
| 2002/0190964 | A1 | 12/2002 | Van Berkel |
| 2003/0069929 | A1 | 4/2003 | Millikan et al. |
| 2004/0068741 | A1 | 4/2004 | Kimura |
| 2004/0187018 | A1* | 9/2004 | Owen ............ G06F 21/31 713/184 |
| 2006/0178918 | A1* | 8/2006 | Mikurak ............ G06Q 10/06 705/7.25 |

FOREIGN PATENT DOCUMENTS

| | | |
|---|---|---|
| JP | 2001-216045 | 8/2001 |
| JP | 2001-357242 | 12/2001 |
| JP | 2002-259189 | 9/2002 |
| JP | 2002-271508 | 9/2002 |
| JP | 2002-320246 | 10/2002 |
| JP | 2002-342362 | 11/2002 |
| JP | 2003-16393 | 1/2003 |
| JP | 2003-85493 | 3/2003 |
| WO | WO 99/62210 | 12/1999 |

OTHER PUBLICATIONS

Supplementary European Search Report dated Jul. 5, 2012, in European Patent Application No. 04 77 1198.
Personal Information Management System for IC-card Services, Takeshi Takakura, et al.; The Information Processing Society of Japan memoir, Japan, Information Processing Society of Japan, Sep. 14, 2001, vol. 2001, No. 88 (2001-DPS-104), pp. 25-30.
Takakura, Takeshi et al.: "IC Card Service no Tameno Kojin Joho Kanri System no Kento"; Joho Shori Gakkai Kenkyu Hokoku, Information Processing Society of Japan, vol. 2001, No. 88 (2001-DPS-104), pp. 25-30, Sep. 14, 2001.

* cited by examiner

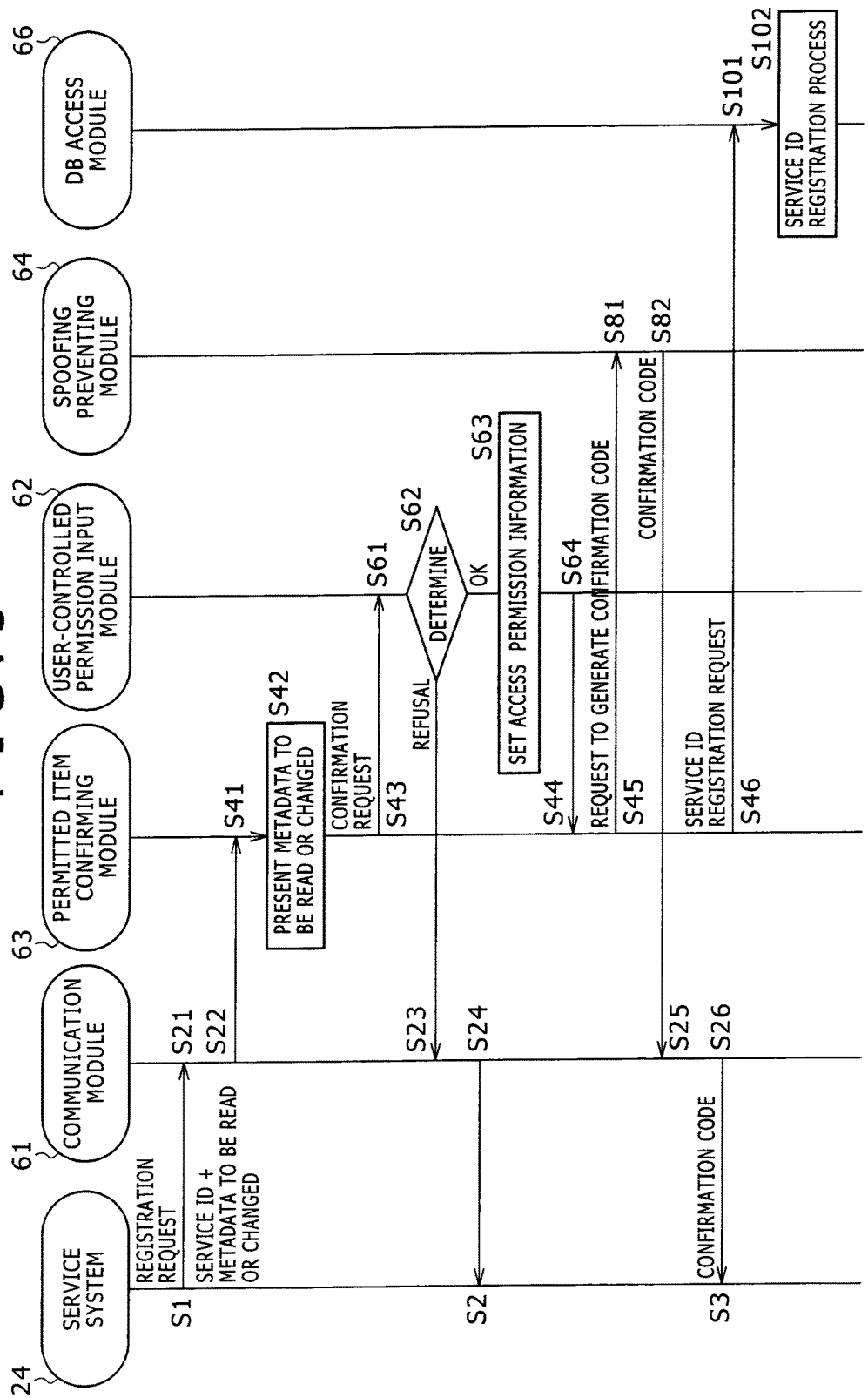

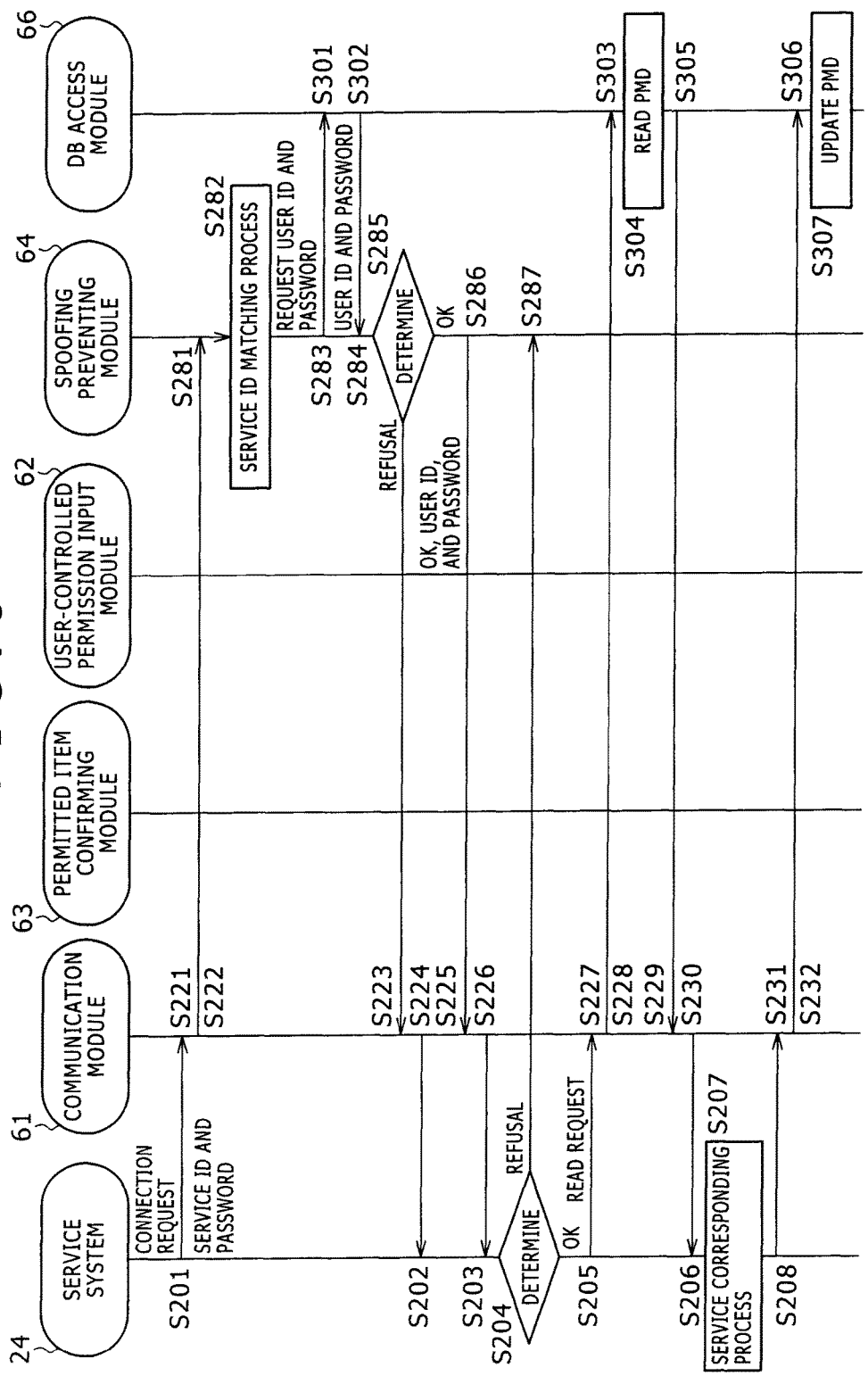

FIG. 20A

| PROPERTY | CONTENTS | ACCESS CONTROL |
|---|---|---|
| NAME | FOO | CONTROL INFORMATION |
| SPOOFING PREVENTING METHOD | PUBLIC KEY SYSTEM | CONTROL INFORMATION |
| SERVICE PUBLIC KEY | KEY DATA | CONTROL INFORMATION |
| PK PRIVATE KEY | KEY DATA | CONTROL INFORMATION |
| ACTION | PROGRAM | CONTROL INFORMATION |
| PROGRAM PREFERENCE INFORMATION | SPORTS 10, VARIETY 7, MUSIC 5, AND OTHERS 3 | CONTROL INFORMATION |
| ... | | |

FIG. 20B

| PROPERTY | CONTENTS | ACCESS CONTROL |
|---|---|---|
| NAME | FOO | CONTROL INFORMATION |
| SPOOFING PREVENTING METHOD | COMMON KEY SYSTEM | CONTROL INFORMATION |
| COMMON KEY | KEY DATA | CONTROL INFORMATION |
| ACTION | PROGRAM | CONTROL INFORMATION |
| PROGRAM PREFERENCE INFORMATION | SPORTS 10, VARIETY 7, MUSIC 5, AND OTHERS 3 | CONTROL INFORMATION |
| ... | | |

FIG.20C

| PROPERTY | CONTENTS | ACCESS CONTROL |
|---|---|---|
| NAME | FOO | |
| SPOOFING PREVENTING METHOD | PASSWORD SYSTEM | CONTROL INFORMATION |
| SERVICE PASSWORD | PASSWORD DATA | CONTROL INFORMATION |
| PK PASSWORD | PASSWORD DATA | CONTROL INFORMATION |
| ACTION | PROGRAM | CONTROL INFORMATION |
| PROGRAM PREFERENCE INFORMATION | SPORTS 10, VARIETY 7, MUSIC 5, AND OTHERS 3 | CONTROL INFORMATION |
| ... | | |

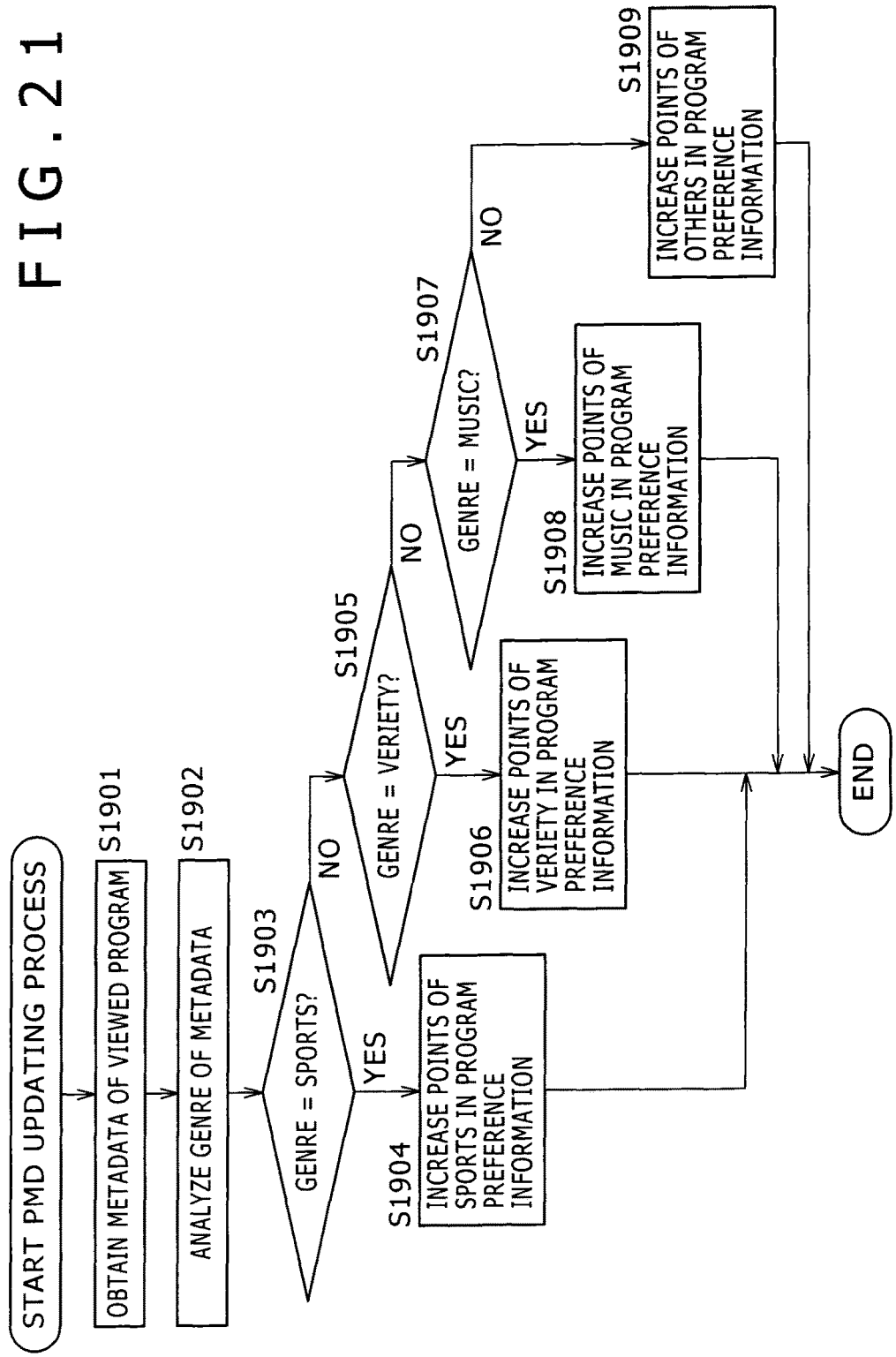

| PROPERTY | CONTENTS |
|---|---|
| R&B | 15 |
| JAZZ | 5 |
| POP | 15 |

322 —

| PROPERTY | CONTENTS |
|---|---|
| R&B | 17 |
| JAZZ | 5 |
| POP | 0 |

323 —

| PROPERTY | CONTENTS |
|---|---|
| R&B | 32 |
| JAZZ | 10 |
| POP | 15 |

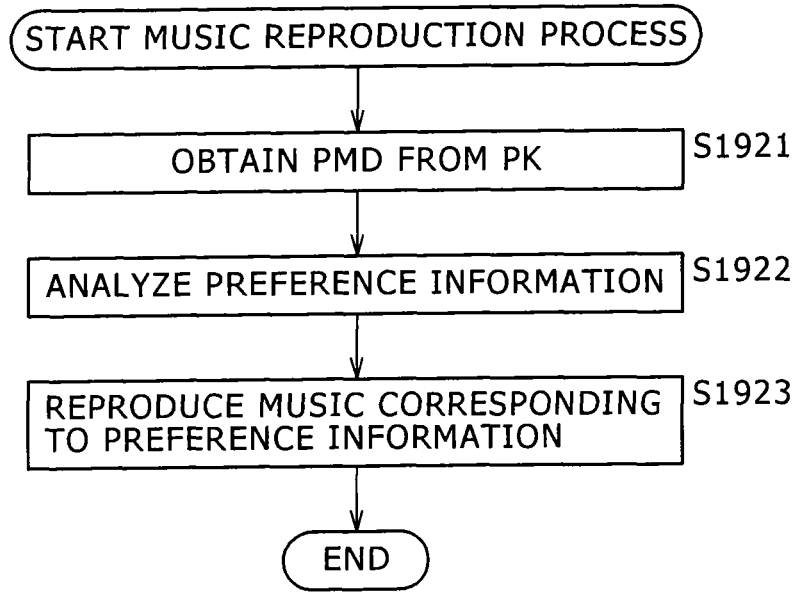
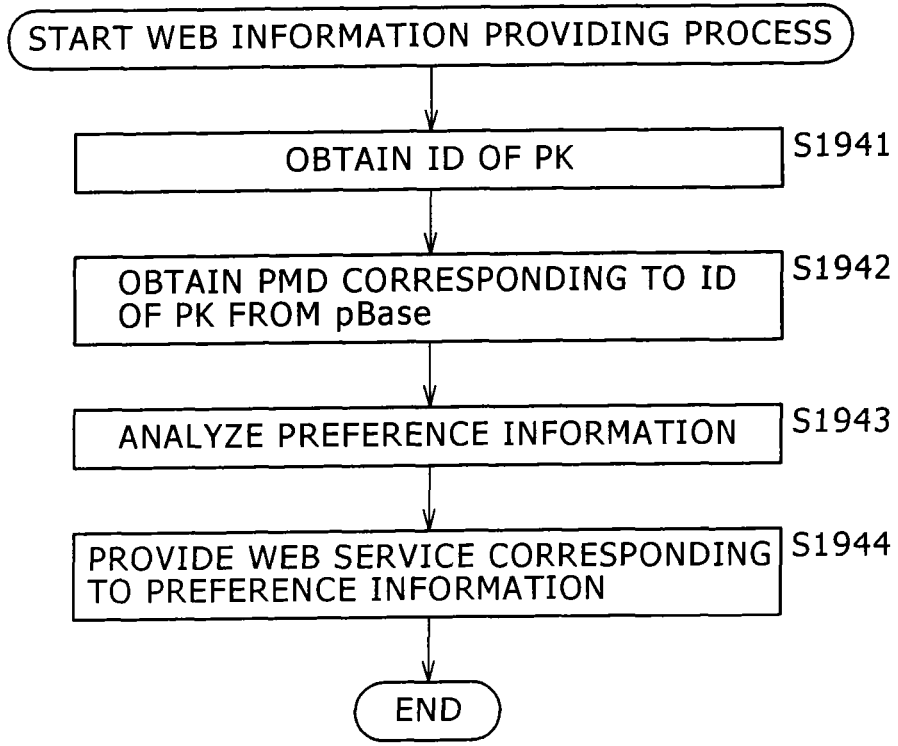

○ INTENSITY 1
○ INTENSITY 2

| PROPERTY | CONTENTS |
|---|---|
| PROGRAM | PROGRAM CODE ENTITY |
| NAME | FOO |
| PUSH | "URGENT MESSAGE RECEIVED..." |

801

F I G. 5 5
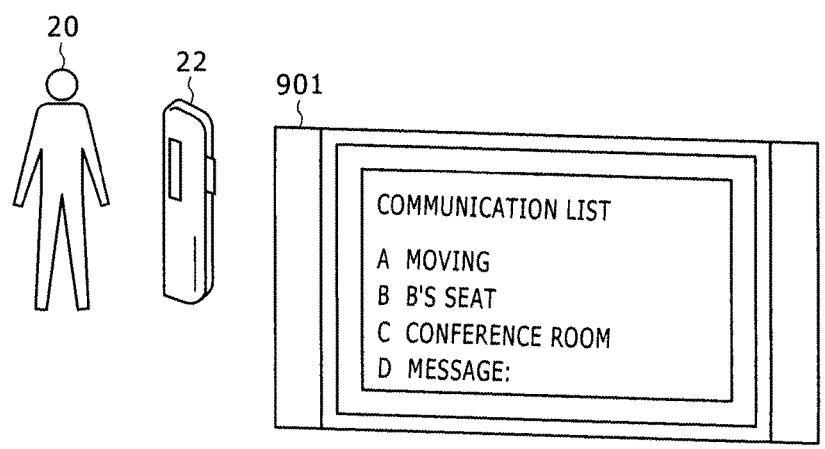

INFORMATION PROCESSING DEVICE AND METHOD, PROGRAM, AND RECORDING MEDIUM

CROSS-REFERENCE TO RELATED APPLICATIONS

This application is a continuation application of, and claims the benefit of priority under 35 U.S.C. § 120 from, U.S. Ser. No. 10/566,472, filed Jan. 31, 2006, herein incorporated by reference, which is a National Stage Application of International Application No. PCT/JP04/11160, filed Aug. 4, 2004, which claims the benefit of priority under 35 U.S.C. § 119 from Japanese Patent Application No. 2003-290053, filed Aug. 8, 2003.

TECHNICAL FIELD

The present invention relates to a device and a method for information processing, a program, and a recording medium that improve the convenience of a user and further provide service comfortable and safe for the user.

BACKGROUND ART

It has recently become possible to receive various services by presenting personal information. The personal information includes various information such as a name, an address, preference information, authentication information for a service, points information, information received from another person, and the like.

A technology is proposed in which when a user enters a store carrying a card storing such personal information, information on the card is read by a card reader mounted on a shopping cart, and an advertisement, a floor guide, information on a discount on a favorite article, or the like is displayed on the basis of the information on the card (see for example Non-Patent Document 1).

In addition, attempts are made to make the process of purchase of an article, payment or the like convenient by performing personal authentication using personal information (see for example Patent Documents 1 to 3).

According to Patent Document 1, an item code is input (or the bar code of an item is read) on the terminal of a user. A connection is made to a public network by remote communication using a pager or the like, and the item code is transferred to a PC at home or a PCS NCC (Personal Communication Service Network Control Center). The PCS NCC transmits information on the price of the item or the like from the item code to the terminal of the user. The item information is displayed only on the terminal of the user. When a request for purchase is made, actual payment is processed using electronic money or the like.

Patent Document 2 is intended to provide a platform for controlling financial information from a remote place. The financial information is provided by a bank. Also, service not related to banking business is provided between a bank and a nonbank.

Patent Document 3 is intended to realize functions of an electronic wallet, a wireless PIN (personal identification number) pad, and a contactless smart card, using a portable telephone. A service provider in a mobile telephone company or the like retains account and authorization information. When a predetermined function code is input from a portable telephone, the function code is transferred to the service provider, and a requested transaction is carried out. The central processing unit of the service provider determines whether authentication is necessary. When authentication is necessary, a personal authentication number is transferred to the central processing unit, the central processing unit performs an authentication process, and the transaction is carried out.

[Patent Document 1]
U.S. Pat. No. 5,991,601 (Personal intercommunication purchase and fulfillment system)
[Patent Document 2]
U.S. Pat. No. 5,787,403 (Bank-centric service platform, network and system)
[Patent Document 3]
U.S. Pat. No. 5,991,749 (Wireless telephony for collecting tolls, conducting financial transactions, and authorizing other activities)
[Non-Patent Document 1]
US2002-174025-A1 Method and system for providing targeted advertising and personalized customer services (IBM)

DISCLOSURE OF INVENTION

However, techniques of Non-Patent Document 1 do not allow an exchange of information with service received at another store. In addition, the techniques of Non-Patent Document 1 do not provide a spoofing preventing mechanism that authenticates a user using the card.

The techniques of Patent Document 1 require the creation of a database for retrieving the item information from the item code in database management in the PCS NCC, so that prompt processing cannot be performed.

The techniques of Patent Document 2 define a flow of service, but consideration is not given to what kind of authentication process is performed at the terminal of a user.

The techniques of Patent Document 3 require a fixed function code. Therefore, portable telephones and the like dependent on an authentication system and article information need to be created, and thus flexible system management cannot be performed. As a result, the convenience of the user may be impaired.

The present invention has been made in view of such a situation, and it is an object of the present invention to improve the convenience of a user and further provide service comfortable and safe for the user.

According to the present invention, there is provided a first information processing device storing user information related to a user and communicating with a plurality of other information processing devices. The first information processing device can include: presenting means for presenting user information to be read or changed by the other information processing device; specifying means for specifying permission to read or change the user information presented by the presenting means; identifying means for identifying the other information processing device; and storing means for storing the user information read or changed by the other information processing device identified by the identifying means in association with the other information processing device.

The first information processing device can further include communicating means for performing quasi-electrostatic field communication, electromagnetic wave communication, optical communication, or electric communication.

A device external to the information processing device can be used as an input or output interface.

When an initial communication with the other information processing device is performed, information for identifying the information processing device can be transmitted to the other information processing device.

When an initial communication with the other information processing device is performed, a first code used by the information processing device to encrypt information and a second code generated in correspondence with the first code can be generated, and the first code can be transmitted to the other information processing device, and a third code used by the other information processing device to encrypt information can be obtained via the communicating means.

The user information can be updated on a basis of a history of use of contents provided from the other information processing device.

A communication with an information managing device that manages the user information can be performed via a network, and the user information can be updated so that contents of the user information stored in the information processing device are identical with contents of the user information stored in the information managing device.

The information managing device can identify the other information processing device permitted to read or change the user information, and provide the user information to the other information processing device permitted to read or change the user information via the network.

The user can be authenticated on a basis of a change pattern of a quasi-electrostatic field or an electrostatic field occurring at a body of the user.

The user information can have preference information indicating preferences of the user, the preference information can be transmitted to an information device specified by the user, and the information device can be operated in correspondence with the preference information.

New user information can be created on a basis of a plurality of pieces of user information associated with a plurality of other information processing devices.

According to the present invention, there is provided a first information processing method of an information processing device, the information processing device storing user information related to a user and communicating with a plurality of other information processing devices. The first information processing method can include: a presenting step for presenting user information to be read or changed by the other information processing device; a specifying step for specifying permission to read or change the user information presented by a process of the presenting step; an identifying step for identifying the other information processing device; and a storing step for storing the user information read or changed by the other information processing device identified by a process of the identifying step in association with the other information processing device.

According to the present invention, there is provided a first program of an information processing device, the information processing device storing user information related to a user and communicating with a plurality of other information processing devices. The first program can make a computer perform: a presenting controlling step for controlling presenting user information to be read or changed by the other information processing device; a specifying controlling step for controlling specifying permission to read or change the user information presented by a process of the presenting controlling step; an identifying controlling step for controlling identifying the other information processing device; and a storing controlling step for performing control so as to store the user information read or changed by the other information processing device identified by a process of the identifying controlling step in association with the other information processing device.

According to the present invention, there is provided a first recording medium on which a program of an information processing device, the information processing device storing user information related to a user and communicating with a plurality of other information processing devices, is recorded. The program can make a computer perform: a presenting controlling step for controlling presenting user information to be read or changed by the other information processing device; a specifying controlling step for controlling specifying permission to read or change the user information presented by a process of the presenting controlling step; an identifying controlling step for controlling identifying the other information processing device; and a storing controlling step for performing control so as to store the user information read or changed by the other information processing device identified by a process of the identifying controlling step in association with the other information processing device.

In the first information processing device, the first information processing method, and the first program, user information to be read or changed by another information processing device is presented, permission to read or change the presented user information is specified, the other information processing device is identified, and the user information read or changed by the identified other information processing device is stored in association with the other information processing device.

According to the present invention, there is provided a second information processing device for communicating with a plurality of other information processing devices via a network and storing user information related to a user. The second information processing device can include: communicating means for communicating with a portable terminal possessed by the user via the network; obtaining means for obtaining the user information stored in the portable terminal and relating to the user; updating means for updating the user information stored in the information processing device on a basis of the user information obtained by the obtaining means; and generating means for generating data for updating the user information stored in the portable terminal.

When the portable terminal is not connected to the network, the communicating means can communicate with the other information processing device in place of the portable terminal.

Further stored as the user information can be: information for identifying the portable terminal; a password for the portable terminal to authenticate the other information processing device; a first code used by the portable terminal to encrypt information and a second code generated in correspondence with the first code; information for identifying the other information processing device; a password for the other information processing device to authenticate the portable terminal; and a third code used by the other information processing device to encrypt information.

The information processing device can further include updating means for updating the user information on a basis of a history of use of contents provided from the other information processing device.

An access point connecting the portable terminal with the network can be identified, a present value of the user can be determined on a basis of a position of the identified access point, and information on the present position of the user can be stored as user information.

An ID for identifying a device corresponding to the access point and an access key necessary to communicate with the device can be further stored as user information.

The communicating means can communicate with the portable terminal at predetermined time intervals to update the information on the present position of the user, the ID for identifying the device corresponding to the access point, and the access key.

When a request signal indicating a request for conversation with the user is received from the other information processing device via the network, the user information can be transmitted to the other information processing device.

The user information exceeding a storage capacity of the portable terminal can be further stored.

According to the present invention, there is provided a second information processing method of an information processing device, the information processing device communicating with a plurality of other information processing devices via a network and storing user information related to a user. The second information processing method can include: a communicating step for communicating with a portable terminal possessed by the user via the network; an obtaining step for obtaining the user information stored in the portable terminal and relating to the user; an updating step for updating the user information stored in the information processing device on a basis of the user information obtained by a process of the obtaining step; and a generating step for generating data for updating the user information stored in the portable terminal.

According to the present invention, there is provided a second program of an information processing device, the information processing device communicating with a plurality of other information processing devices via a network and storing user information related to a user. The second program can make a computer perform: a communicating controlling step for performing control so as to communicate with a portable terminal possessed by the user via the network; an obtaining controlling step for controlling obtaining the user information stored in the portable terminal and relating to the user; an updating controlling step for performing control so as to update the user information stored in the information processing device on a basis of the user information obtained by a process of the obtaining controlling step; and a generating controlling step for controlling generating data for updating the user information stored in the portable terminal.

According to the present invention, there is provided a second recording medium on which a program of an information processing device, the information processing device communicating with a plurality of other information processing devices via a network and storing user information related to a user, is recorded. The program can make a computer perform: a communicating controlling step for performing control so as to communicate with a portable terminal possessed by the user via the network; an obtaining controlling step for controlling obtaining the user information stored in the portable terminal and relating to the user; an updating controlling step for performing control so as to update the user information stored in the information processing device on a basis of the user information obtained by a process of the obtaining controlling step; and a generating controlling step for controlling generating data for updating the user information stored in the portable terminal.

In the second information processing device, the second information processing method, and the second program, communication with a portable terminal possessed by a user is performed via a network, user information stored in the portable terminal and relating to the user is obtained, the user information stored in the information processing device is updated on a basis of the obtained user information, and data for updating the user information stored in the portable terminal is generated.

According to the present invention, it is possible to provide service highly convenient to the user. In particular, it is possible to provide service comfortable and safe for the user.

BRIEF DESCRIPTION OF DRAWINGS

FIG. 5 is an arrow chart showing a flow of a process of initial registration of a service ID;

FIG. 6 is an arrow chart showing a flow of a process of preventing spoofing between the PK and a service system;

FIG. 20A is a diagram showing an example of composition of PMD;

FIG. 20B is a diagram showing an example of composition of PMD;

FIG. 20C is a diagram showing an example of composition of PMD;

FIG. 21 is a flowchart of assistance in explaining a PMD updating process;

FIG. 23 is a diagram showing new PMD generated on the basis of a plurality of pieces of PMD;

FIG. 26 is a flowchart of assistance in explaining a music reproduction process;

FIG. 27 is a flowchart of assistance in explaining a Web information providing process;

FIG. 55 is a diagram showing an example of a communication list;

BEST MODE FOR CARRYING OUT THE INVENTION

Figure 1:
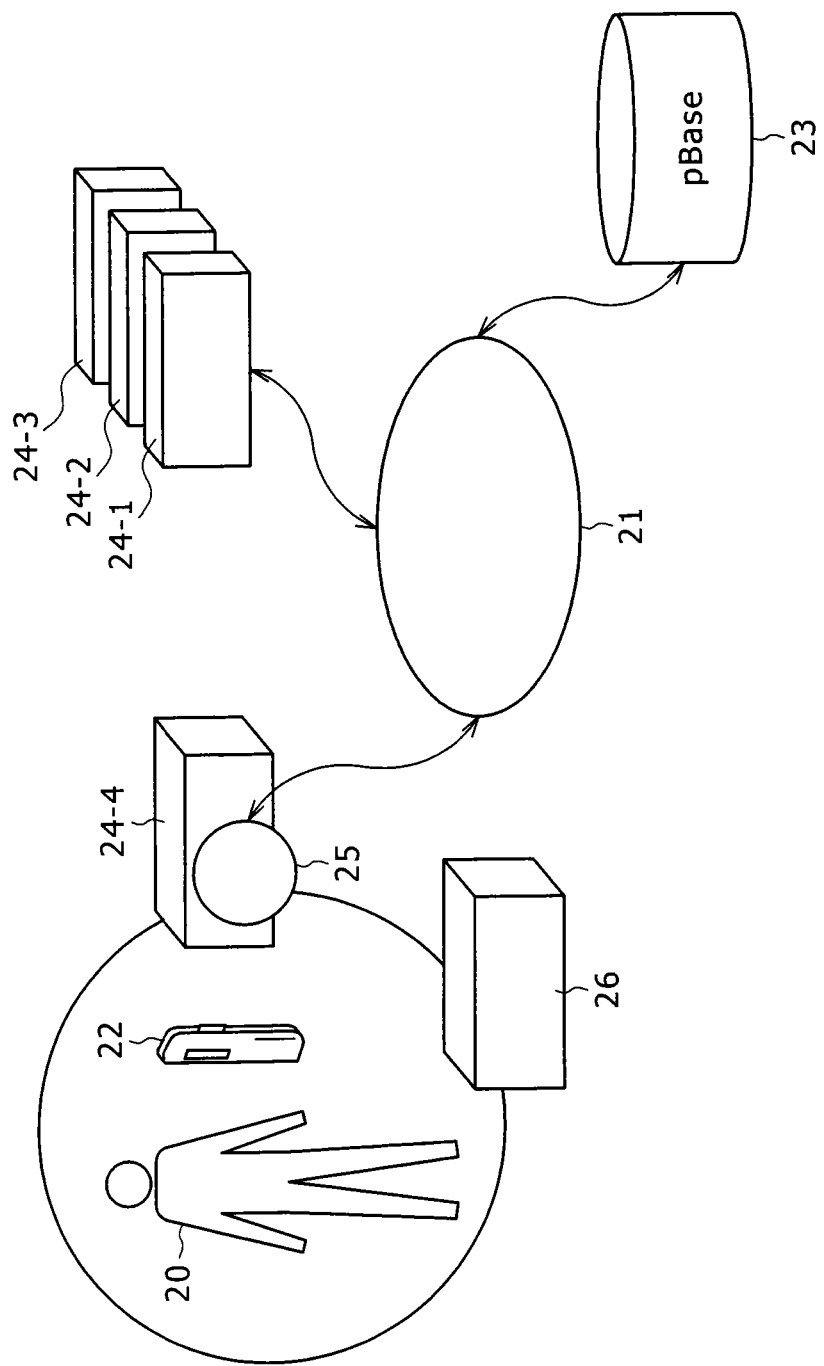
FIG. 1 is a diagram showing an example of configuration of a service providing system according to the present invention.

Preferred embodiments of the present invention will hereinafter be described with reference to the drawings. FIG. 1 is a block diagram showing an example of configuration of a service providing system 1 to which the present invention is applied. In this example, a user 20 carries a PK (Personal Key) 22 formed by a small portable computer or the like that stores personal related information on the user. The personal related information in this case refers not only to mere information for identifying the user, such as a name, an address and the like, but also to a set of various information related to the user, including preference information, authentication information, points information, information received from another person, and the like.

The PK 22 communicates with an access point 25 connected to the Internet 21 by wireless communication such as RF (Radio Frequency) communication, quasi-electrostatic field communication, optical communication or the like in an area 41 around the access point 25. The PK 22 also communicates with a nearby information device by wireless communication or the like. The PK 22 has an encryption function of encrypting information on the basis of an encryption key. The key data of the encryption key is stored in an SB (Secure Button) 26 as required. The SB 26 is a computer having a communication function. The SB 26 communicates with the PK 22 to transmit and receive key data to and from the PK 22.

The Internet 21 is connected with a pBase (Personal Information Base) 23 that obtains PMD (Personal Meta Data) as the personal related information on the user 20 from the PK 22 via the Internet 21, and stores the obtained PMD as a database. The pBase 23 is formed by a computer, and communicates with another information processing apparatus connected to the Internet 21. Incidentally, the pBase 23 also stores a plurality of pieces of PMD of PKs (users) other than the PK 22 (user 20).

The Internet 21 is also connected with service systems 24-1 to 24-3 formed by a computer or the like and each performing a predetermined process. The service systems 24-1 to 24-3 obtain the PMD from the PK 22 or the pBase 23 via the Internet 21, and execute a predetermined program on the basis of the obtained PMD, thereby providing the user with services such as the provision of information, the payment of shopping bills, and the like.

For example, the service system 24-1 is a contents server that provides Web pages, music information and the like to a personal computer. The service system 24-2 is a credit card processing server that performs payment and the like by credit card. The service system 24-3 is a communication server that controls communication performed with the user 20. The access point 25 is included in a service system 24-4 performing communication with the PK 22. Incidentally, when these service systems do not need to be individually distinguished from each other, the service systems will be referred to collectively as a service system 24.

While the service systems 24-1 to 24-4 are shown in this example, a large number of service systems are present in practice. The service system 24 is not limited to a personal computer, a server or the like, and may be formed by a console terminal, various consumer electronics devices (CE devices) or the like. Further, the service system 24 is not limited to being connected to the Internet 21, and may be installed anywhere as long as the service system 24 has a communication function. Incidentally, the PK 22 and the service system 24 can communicate with each other directly without the intermediation of the Internet 21.

Figure 2:
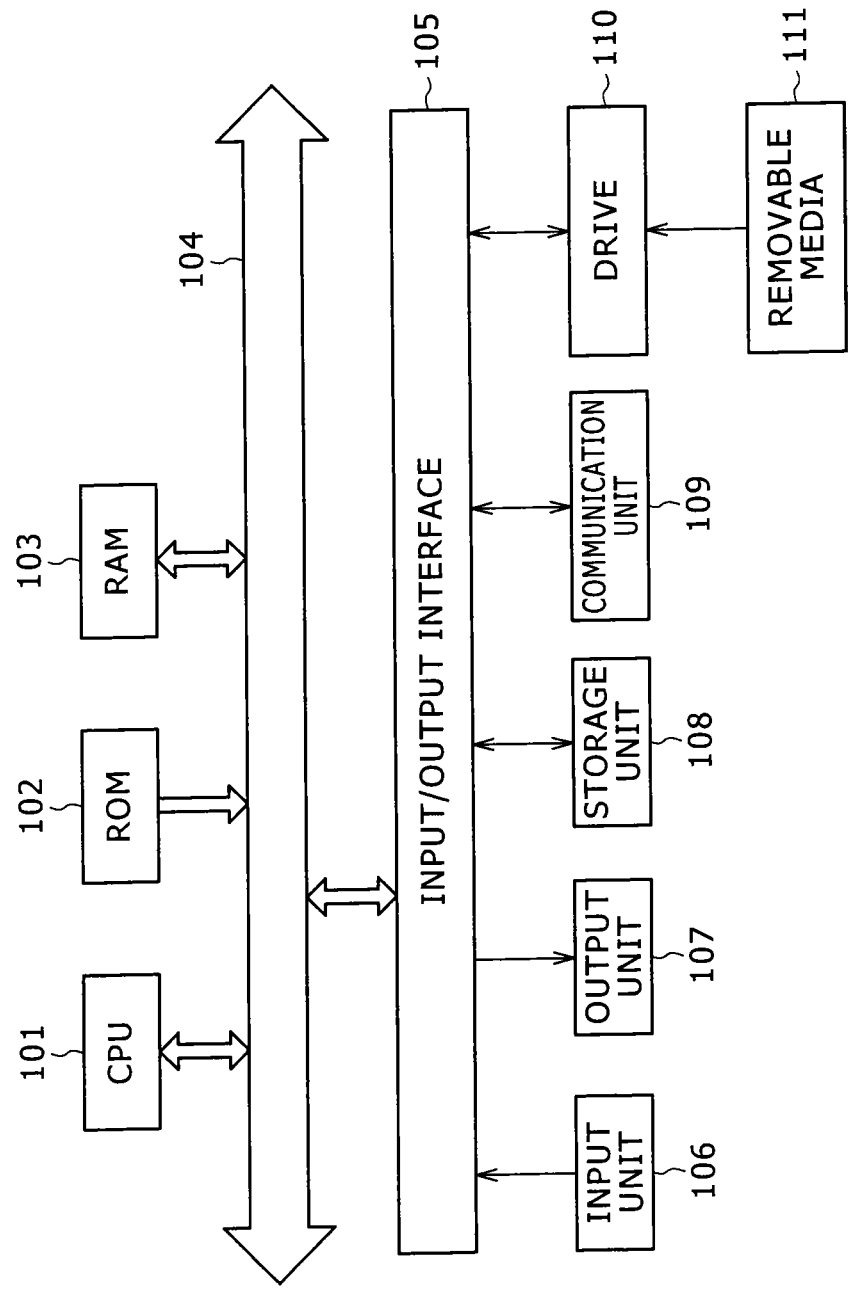
FIG. 2 is a block diagram showing an example of configuration of a PK in FIG. 1.

FIG. 2 is a block diagram showing an example of configuration of the PK 22. A CPU (Central Processing Unit) 101 performs various processes according to a program stored in a ROM (Read Only Memory) 102 or a program loaded from a storage unit 108 into a RAM (Random Access Memory) 103. The RAM 103 also stores data and the like necessary for the CPU 101 to perform various processes as appropriate.

The CPU 101, the ROM 102, and the RAM 103 are interconnected via a bus 104. The bus 104 is also connected with an input/output interface 105.

The input/output interface 105 is connected with an input unit 106 formed by a switch, a button or the like and an output unit 107 formed by a dot-matrix display, a speaker, a vibrating motor and the like and outputting information to be presented to the user by an image, audio, Braille, vibration and the like. The input/output interface 105 is also connected with the storage unit 108 formed by a hard disk, an EEPROM (Electrically Erasable and Programmable Read Only Memory) or the like and a communication unit 109 formed by a radio transmission and reception device or the like. Incidentally, a plurality of communication units may be provided according to methods of communication such as RF communication (electromagnetic wave communication), quasi-electrostatic field communication, optical communication and the like.

RF (Radio Frequency) communication is a communication of a wireless LAN typified by IEEE 802.11b, for example. This communication is possible within a radius of about few ten meters of a predetermined access point (hub). Quasi-electrostatic field communication is a system of communication that forms a closed electrostatic information space having a physical property (evanescent property) that does not propagate over a long distance and is formed only in a closed area in the vicinity of a human body. With the human body as an antenna of weak static electricity, this communication is possible in a limited space within a radius of about a few centimeters or a few meters of the human body. The user carrying the PK 22 can thereby make the PK 22 communicate while walking, for example.

Of course, the communication unit 109 can also perform wire electric communication typified by Ethernet (registered trademark) or the like, or optical communication using infrared rays or the like.

The input/output interface 105 is connected with a drive 110 as required. Removable media 111, for example, are loaded into the drive 110 as recording media on which a program according to the present invention is recorded. A computer program read from the removable media 111 is installed in the storage unit 108 as required.

Figure 3:
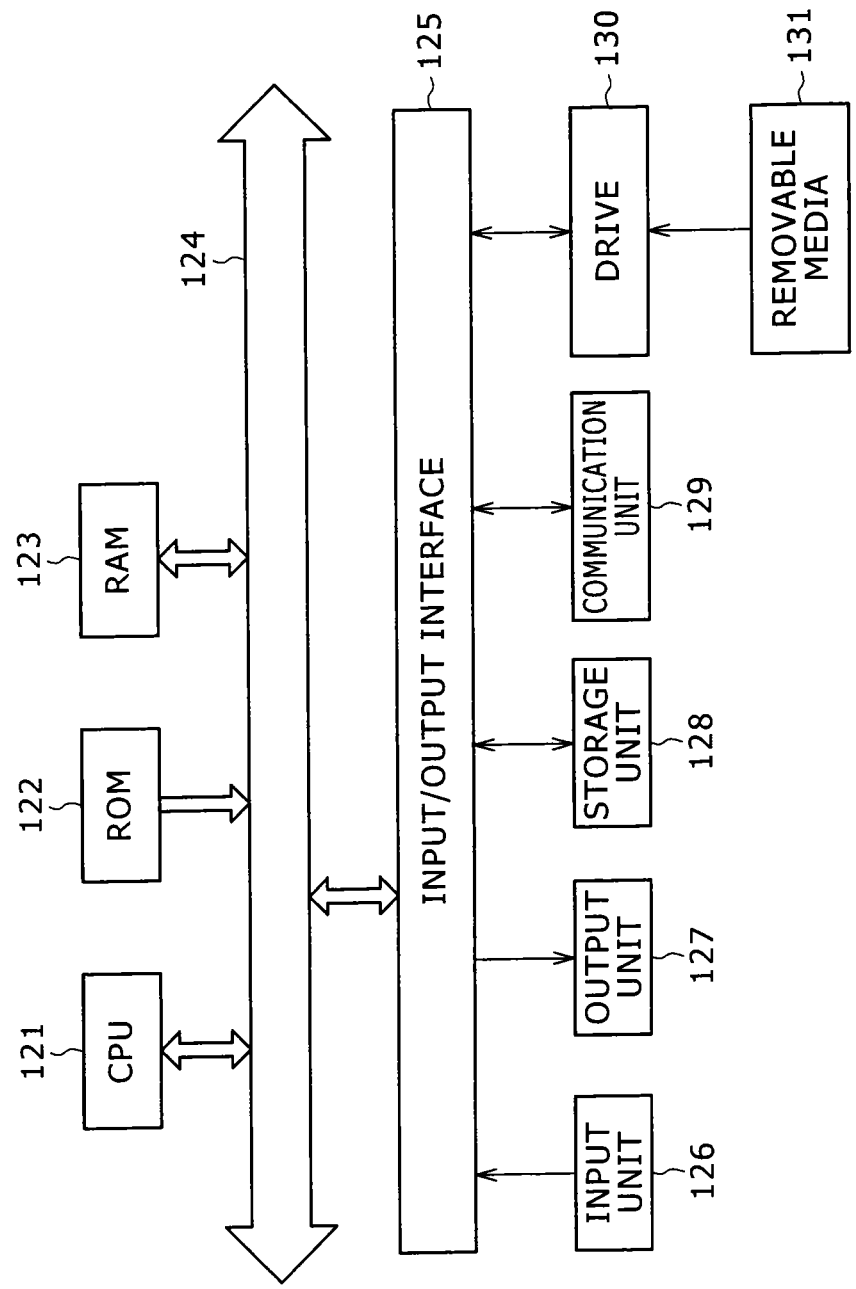
FIG. 3 is a block diagram showing an example of configuration of a pBase in FIG. 1.

FIG. 3 is a block diagram showing an example of configuration of the pBase 23. The configuration of the pBase 23 is similar to the configuration of the PK 22 shown in FIG. 2. A CPU 121 to removable media 131 in FIG. 3 correspond to the CPU 101 to the removable media 111 in FIG. 2. The functions of respective parts are similar to those of FIG. 2, and thus detailed description thereof will be omitted. However, a communication unit 129 is formed by a radio transmission and reception device as well as a wire communication device such as a LAN card, a modem and the like.

The service system 24 also has a similar configuration to that of FIG. 3, and the same figure is applied to the service system 24.

Figure 4:
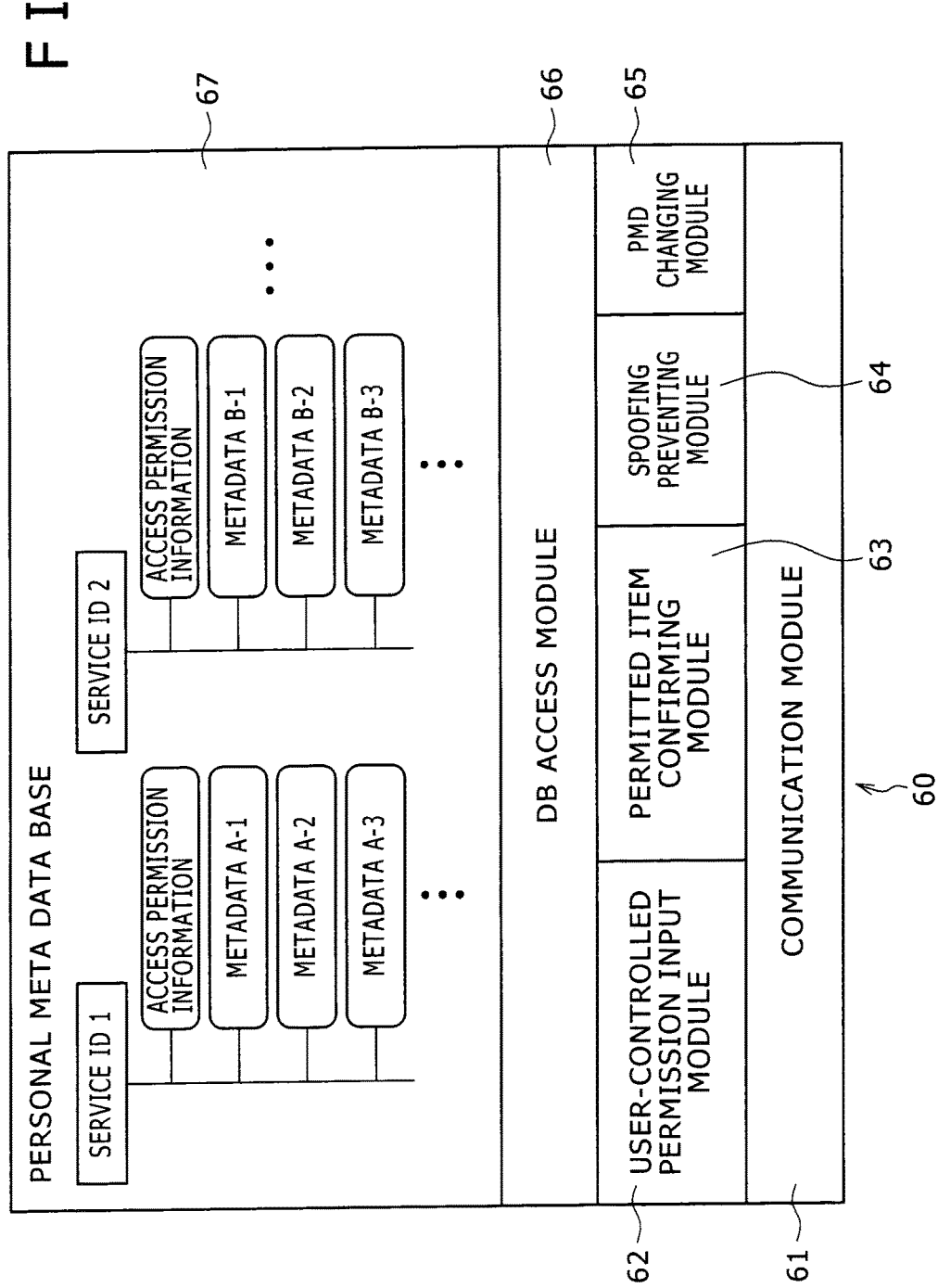
FIG. 4 is a block diagram showing an example of configuration of software of the PK in FIG. 1.

FIG. 4 is a block diagram showing an example of configuration of software 60 stored in the storage unit 108 of the PK 22. The software 60 includes a PMDB 67 storing MPD as personal information stored in the PK 22 as a database, and a communication module 61 controlling the communication unit 109 to perform communication.

The software 60 also includes a user-controlled permission input module 62 for receiving a specification of permission of access to the PMD, and a permitted item confirming module for presenting the PMD to allow the user to determine whether or not to allow access to PMD requested to be accessed by the service system 24. The software 60 further includes a spoofing preventing module 63 for preventing the spoofing of the service system 24, and a PMD changing module 65 for changing PMD as required. A DB access module 66 accesses the PMDB 67 on the basis of an instruction (request) from the user-controlled permission input module 62 to the PMD changing module 65 to read or change PMD.

The PMDB 67 is a database including a plurality of pieces of PMD. Pieces of information of each piece of PMD are associated with each other in the form of a directory with a service ID as a unique ID corresponding to each service system 24 serving as a key. In the directory (PMD) of a service ID 1, access permission information, metadata A-1, metadata A-2, metadata A-3, . . . are associated with each other.

The access permission information indicates whether access from the service system 24 to information associated with the directory is permitted or not, and is set by the user. The metadata A-1, the metadata A-2, the metadata A-3, . . . are personal related information used in the service system 24 corresponding to the service ID 1. When the service system corresponding to the service ID 1 is a contents server for providing contents such as a movie, a television program and the like, for example, metadata of a viewed program is stored in each of the metadata A-1, the metadata A-2, the metadata A-3, . . . . In addition, a user ID for identifying the PK 22 (user 20), authentication information such as a password, an encryption key or the like required in a spoofing preventing process, user preference information based on viewed programs, and control information for controlling a television receiver and the like, for example, are stored as PMD.

Similarly, in the directory (PMD) of a service ID 2, access permission information, metadata B-1, metadata B-2, metadata B-3, . . . are associated with each other. When the PK uses a new service system 24, a new service ID is registered, and a directory corresponding to the service ID is created. Each directory is set as PMD to form the PMDB 67.

Incidentally, details of an example of composition of PMD will be described later with reference to FIG. 20.

FIG. 5 is an arrow chart of a flow of a process when a service ID corresponding to a service system 24 is first registered (initial registration) in the PK 22. In step S1, the service system 24 transmits a registration request, a service ID, and information indicating metadata to be read or changed by the service system to the PK 22. This is received by the communication module 61 of the PK in step S21.

In step S22, the communication module 61 transfers the received contents to the permitted item confirming module 63. The permitted item confirming module 63 presents the metadata to be read or changed to the user in step S42. At this time, for example, metadata contents are displayed as text, graphics, or the like on the dot-matrix display or the like, or read by voice through the speaker. Alternatively, the metadata contents may be generated and presented in Braille by a mechanical mechanism, or presented as a signal such as a Morse signal or the like generated by vibration.

In step S43, the permitted item confirming module 63 outputs a confirmation request to the user-controlled permission input module 62. This is received in step S61. In step S62, the user-controlled permission input module 62 determines whether the user refuses access to the metadata to be read or changed, the metadata being presented in step S42. When the user-controlled permission input module 62 determines that the user refuses access to the metadata, the user-controlled permission input module 62 outputs a refusal signal. This is received by the communication module 61 in step S23. In step S24, the communication module 61 transmits the refusal signal to the service system 24. This is received in step S2.

On the other hand, when the user-controlled permission input module 62 determines in step S62 that the user does not refuse access to the metadata to be read or changed, the metadata being presented in step S42, the user-controlled permission input module 62 in step S63 sets information such for example as "reading and change permitted" or "only reading permitted" for each piece of the metadata to be read or changed on the basis of user specification. These pieces of information are stored as access permission information (FIG. 4) in the PMDB 67. In step S64, the user-controlled permission input module 62 notifies the permitted item confirming module 63 that the access control information is set. This is received in step S44. In step S45, the permitted item confirming module 63 makes a request to generate a confirmation code to the spoofing preventing module 64. This is received by the spoofing preventing module 64 in step S81.

In step S82, the spoofing preventing module 64 generates a confirmation code. The confirmation code indicates a spoofing preventing method carried out when the PK 22 and the service system 24 communicate with each other next time. That is, the confirmation code indicates a method for mutual confirmation that an unauthorized user or a third party intercepting a communication, for example, is not spoofing the PK 22 or the service system 24 by misrepresenting an address, an ID or the like of the unauthorized user or the third party.

As the spoofing preventing method, authentication using a password, authentication using information encrypted by a public key, and authentication using information encrypted by a common key, for example, are employed. However, in communication with the service system 24, an optimum spoofing preventing method is selected in consideration of a required degree of safety, the extent and frequency of checking for preventing spoofing, the safety and ease of an encryption key managing method, an amount of calculation in encryption and decryption, and the like. A confirmation code corresponding to the spoofing preventing method is generated. Incidentally, a spoofing preventing process will be described later with reference to FIG. 6 and FIG. 7.

In step S82, the spoofing preventing module 64 outputs the confirmation code to the communication module 61. This is received by the communication module 61 in step S25. In step S26, the communication module 61 transmits the confirmation code obtained in step S25 to the service system 24. This is received in step S3.

Incidentally, at this time, a user ID for identifying the PK 22 (the user of the PK 22) is also received by the service system 24. The service system 24 stores the user ID and the confirmation code corresponding to the user ID. The user ID may be in any form as long as the user ID allows the service system 24 to identify the PK 22 (the user of the PK 22). For example, the user ID may be formed by a combination of numbers, or may be formed by a predetermined character string. Further, different user IDs may be created so as to correspond to a plurality of service systems 24.

In step S46, the permitted item confirming module 63 outputs a service ID registration request to the DB access module 66. This is received by the DB access module 66 in step S101. In step S102, the DB access module 66 performs a service ID registration process to be described later with reference to FIG. 9. Thereby the service ID is registered, and PMD corresponding to the service ID is generated.

Thus, the service ID corresponding to the service system 24 is registered in the PK 22. The PMD metadata to be read or changed by the service system 24 is presented to the user when the service ID is registered. The user can therefore receive service with a greater sense of security. When the PK 22 communicates with the service system 24 whose service ID is registered next time, a spoofing preventing process can be performed on the basis of the confirmation code. Similarly, when the service system 24 communicates with the PK 22 whose user ID is registered next time, a spoofing preventing process can be performed on the basis of the confirmation code.

A spoofing preventing process when the PK 22 communicates with the service system 24 whose service ID is already registered will next be described with reference to FIG. 6 and FIG. 7.

FIG. 6 is an arrow chart of assistance in explaining a flow of a spoofing preventing process when authentication by password is employed as a spoofing preventing method between the PK 22 and the service system 24. In this example, the PK 22 confirms that the service system 24 is not spoofed, and thereafter the service system 24 confirms that the PK 22 is not spoofed. After the PK 22 and the service system 24 confirm that the service system 24 and the PK 22 are not spoofed, a process for reading or changing PMD is performed.

A password is a predetermined character string or code, for example. When a service ID is registered in the PK 22, a password (service password) for authenticating the service system 24 and a password (PK password) for authenticating the PK are generated as passwords corresponding to the service ID, and stored in the PMDB 67. When the service ID is registered, the service password and the PK password are also transmitted to the service system 24. The service password and the PK password are stored in a database in the storage unit 128 of the service system 24 in a state of being associated with the user ID of the PK 22.

In step S201, the service system 24 transmits a connection request, a service ID, and a password to the PK 22. This is received by the communication module of the PK 22 in step S221. Incidentally, a service password as described above is transmitted in step S201. In step S222, the communication module 61 transmits the contents received in step S221 to the spoofing preventing module 64. This is received in step S281.

Figure 9:
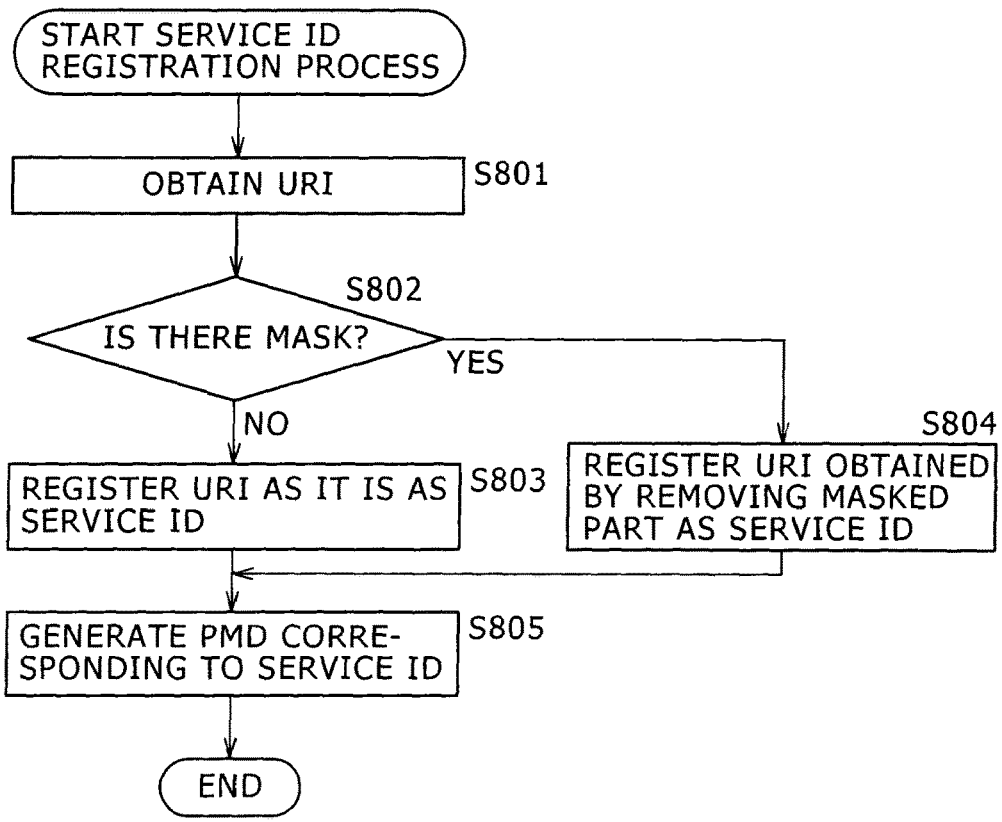
FIG. 9 is a flowchart of assistance in explaining a service ID registration process.

In step S282, the spoofing preventing module 64 performs a service ID matching process to be described later with reference to FIG. 9, and thereby recognizes the service ID. In step S283, the spoofing preventing module 64 communicates a request for a user ID and passwords corresponding to the service ID to the DB access module 66. This is received by the DB access module 66 in step S301. Incidentally, the service matching process in step S282 may be performed by the DB access module 66.

In step S302, the DB access module 66 reads a service password, a PK password, and a user ID corresponding to the service ID from the PMDB 67, and then outputs the service password, the PK password, and the user ID to the spoofing preventing module 64. The spoofing preventing module 64 compares the service password obtained in step S284 with the password obtained in step S281. When the spoofing preventing module 64 determines that the service password obtained in step S284 does not match the password obtained in step S281, the spoofing preventing module 64 determines that the service system 24 may be spoofed, and communicates a refusal signal indicating refusal of communication to the communication module 61. This is received by the communication module 61 in step S223. In step S224, the communication module 61 transmits the refusal signal to the service system 24. This is received by the service system 24 in step S202.

Thus, in a case where the password corresponding to the service ID is not transmitted from the service system 24 when communication is started, the communication is refused by the PK 22.

On the other hand, when the spoofing preventing module 64 determines in step S285 that the service password obtained in step S284 matches the password obtained in step S281, the spoofing preventing module 64 in step S286 outputs a code (OK) indicating that it has been confirmed that the service system 24 is not spoofed, the user ID, and the PK password obtained in step S284 to the communication module 61. This is received by the communication module 61 in step S225. In step S226, the communication module 61 transmits the information obtained in step S225 to the service system 24. This is received by the service system 24 in step S203.

In step S204, the service system 24 reads a PK password corresponding to the user ID received in step S203 from the database of the service system 24 itself, compares the read PK password with the password received in step S203, and determines whether the passwords match each other. When the service system 24 determines in step S204 that the passwords do not match each other, the service system 24 determines that the PK 22 may be spoofed, and transmits a refusal signal indicating refusal of communication to the PK 22. This is received by the spoofing preventing module 64 via the communication module 61 in the PK 22 in step S287.

Thus, in a case where the password corresponding to the user ID is not transmitted from the PK 22 when communication is started, the communication is refused by the service system 24.

On the other hand, when the service system 24 determines in step S204 that the passwords match each other, the service system 24 determines that the PK 22 is not spoofed. In step S205, the service system 24 transmits a request to read PMD to the PK 22. This is received by the communication module 61 of the PK 22 in step S227. In step S228, the communication module 61 outputs the contents received in step S227 to the DB access module 66. This is received by the DB access module 66 in step S303.

In step S304, the DB access module 66 checks whether the PMD (PMD metadata) requested to be read by the service system 24 is in correspondence with the service ID corresponding to the service system 24 and allowed to be read. When the PMD is allowed to be read, the DB access module 66 reads the PMD from the PMDB 67. In step S305, the DB access module 66 outputs the read PMD to the communication module 61. This is received by the communication module 61 in step S229.

In step S230, the communication module 61 transmits the information obtained in step S229 to the service system 24. This is received by the service system 24 in step S206.

In step S207, the service system 24 performs various processes (service corresponding process) on the basis of the PMD received in step S206. When the PMD needs to be changed as a result of the process in step S207, the service system 24 in step S208 changes contents of the PMD, and transmits the contents to the PK 22. This is received by the communication module 61 of the PK 22 in step S231.

In step S232, the communication module 61 outputs the information received in step S231 to the DB access module 66. This is received by the DB access module 66 in step S306. In step S307, the DB access module 66 checks whether the PMD obtained in step S306 is in correspondence with the service ID corresponding to the service system 24 and allowed to be changed. When the PMD is allowed to be changed, the corresponding PMD in the PMDB 67 is changed (updated so as to correspond to the changed contents).

Thus, since a check for spoofing can be made before reading or changing PMD, safe service can be provided. Further, since a check for spoofing of the service system 24 is made by the PK 22 and a check for spoofing of the PK 22 is made by the service system 24, safer service can be provided.

Another example of a spoofing preventing process when the PK 22 communicates with the service system 24 whose service ID is already registered will next be described with reference to FIG. 7. FIG. 7 is an arrow chart of assistance in explaining a flow of a spoofing preventing process when authentication using information encrypted by a public key is employed as a spoofing preventing method between the PK 22 and the service system 24.

Also in this example, the PK 22 confirms that the service system 24 is not spoofed, and thereafter the service system 24 confirms that the PK 22 is not spoofed. After the PK 22 and the service system 24 confirm that the service system 24 and the PK 22 are not spoofed, a process for reading or changing PMD is performed.

In this example, the PK 22 and the service system 24 have a function of encrypting or decrypting information by the encryption algorithm of a public key system such as RSA or the like. When a service ID is registered, the PK 22 stores a public key of the service system 24 in the PMDB 67 in association with the service ID of the service system 24, and the service system 24 stores a public key of the PK 22 in the database in the storage unit 128 in association with the user ID of the PK 22. Private keys of the PK 22 and the service system 24 are stored in the respective storage unit 108 or 128.

In step S401, the service system 24 transmits a connection request and a service ID to the PK 22. This is received by the communication module of the PK 22 in step S421. In step S422, the communication module 61 transmits the information received in step S421 to the spoofing preventing module 64. This is received in step S481.

Figure 10:
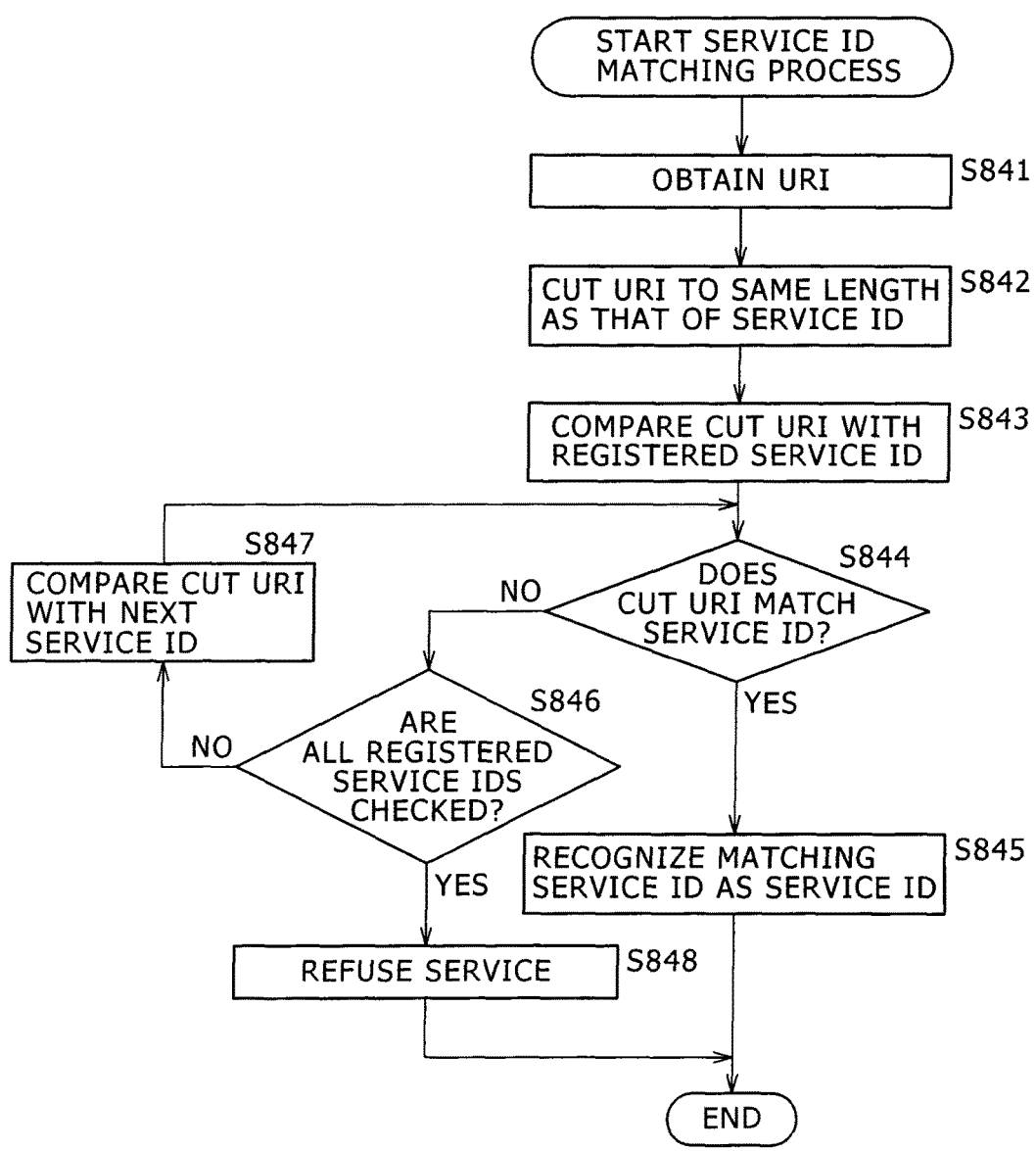
FIG. 10 is a flowchart of assistance in explaining a service ID matching process.

In step S482, the spoofing preventing module 64 performs a service ID matching process to be described later with reference to FIG. 10, and thereby recognizes the service ID. In step S483, the spoofing preventing module 64 communicates a request for the user ID corresponding to the service ID, the private key of the PK, and the public key of the service system 24 to the DB access module 66. This is received by the DB access module 66 in step S501. Incidentally, the service matching process in step S482 may be performed by the DB access module 66.

In step S502, the DB access module 66 reads the public key of the service system 24 corresponding to the service ID and the public key of the PK from the PMDB 67, and then outputs the public key of the service system 24 and the public key of the PK to the spoofing preventing module 64. This is received by the spoofing preventing module 64 in step S484.

In step S485, to authenticate the service system 24, the spoofing preventing module 64 generates a challenge code formed by a predetermined code, encrypts the challenge code by the public key corresponding to the service ID (the public key of the service system 24), and outputs the encrypted challenge code and the user ID to the communication module 61. This is received by the communication module 61 in step S423. In step S424, the communication module 61 transmits the information obtained in step S423 to the service system 24. This is received by the service system 24 in step S402.

In step S403, the service system 24 decrypts the encrypted challenge code received in step S402 by the private key of the service system 24, sets the decrypted challenge code as a response code, encrypts the response code by the public key corresponding to the user ID (the public key of the PK 22), and transmits the encrypted response code to the PK 22. This is received by the communication module 61 of the PK 22 in step S425.

In step S426, the communication module 61 outputs the encrypted response code received in step S425 to the spoofing preventing module 64. This is received by the spoofing preventing module 64 in step S486.

In step S487, the spoofing preventing module 64 decrypts the encrypted response code received in step S486 by the private key of the PK 22, and compares the decrypted response code with the challenge code generated in step S485 to determine whether the challenge code and the response code match each other. When the spoofing preventing module 64 determines that the challenge code does not match the response code, the spoofing preventing module 64 determines that the service system 24 may be spoofed, and communicates a refusal signal indicating refusal of communication to the communication module 61. This is received by the communication module 61 in step S426. In step S427, the communication module 61 transmits the refusal signal to the service system 24. This is received by the service system 24 in step S404.

Thus, the challenge code is transmitted from the PK 22 when communication is started. When the response code matching the challenge code is not returned from the service system 24, the communication is refused by the PK 22.

On the other hand, when the spoofing preventing module 64 determines in step S487 that the challenge code and the response code match each other, the spoofing preventing module 64 in step S488 outputs a code (OK) indicating that it has been confirmed that the service system 24 is not spoofed to the service system 24 via the communication module 61. This is received by the service system 24 in step S405.

In step S406, to authenticate the PK 22, the service system 24 generates a challenge code formed by a predetermined code, encrypts the challenge code by the public key corresponding to the user ID (the public key of the PK 22), and outputs the encrypted challenge code to the PK 22. This is received by the communication module 61 of the PK 22 in step S429. In step S430, the communication module 61 transmits the information obtained in step S429 to the spoofing preventing module 64. This is received by the spoofing preventing module 64 in step S489.

In step S490, the spoofing preventing module 64 decrypts the encrypted challenge code received in step S489 by the private key of the PK 22, sets the decrypted challenge code as a response code, encrypts the response code by the public key corresponding to the service ID (the public key of the service system 24), and outputs the encrypted response code to the communication module 61. This is received by the communication module 61 in step S431. In step S432, the communication module 61 transmits the information received in step S431 to the service system 24. This is received by the service system 24 in step S407.

In step S408, the service system 24 decrypts the encrypted response code received in step S407 by the private key of the service system 24, and determines whether the decrypted response code matches the challenge code generated in step S406. When the service system 24 determines that the challenge code does not match the response code, the service system 24 determines that the PK 22 may be spoofed, and communicates a refusal signal indicating refusal of communication to the PK 22. This is received by the communication module 61 of the PK 22 in step S433. In step S434, the communication module 61 transmits the information received in step S433 to the spoofing preventing module 64. This is received by the spoofing preventing module 64 in step S491.

Thus, the challenge code is transmitted from the service system 24 when communication is started. When the response code matching the challenge code is not returned from the PK 22, the communication is refused by the service system 24.

On the other hand, when the service system 24 determines in step S408 that the challenge code and the response code match each other, the service system 24 determines that it has been confirmed that the PK 22 is not spoofed. In step S409, the service system 24 transmits a request to read PMD to the PK 22. This is received by the communication module 61 of the PK 22 in step S435. In step S436, the communication module 61 outputs the information received in step S435 to the DB access module 66. This is received by the DB access module 66 in step S503.

In step S504, the DB access module 66 checks whether the PMD (PMD metadata) requested to be read by the service system 24 is in correspondence with the service ID corresponding to the service system 24 and allowed to be read. When the PMD is allowed to be read, the DB access module 66 reads the PMD from the PMDB 67. In step S505, the DB access module 66 outputs the read PMD to the communication module 61. This is received by the communication module 61 in step S437.

In step S438, the communication module 61 transmits the information obtained in step S437 to the service system 24. This is received by the service system 24 in step S410.

In step S411, the service system 24 performs various processes (service corresponding process) on the basis of the PMD received in step S410. When the PMD needs to be changed as a result of the process in step S411, the service system 24 in step S412 changes contents of the PMD, and transmits the contents to the PK 22. This is received by the communication module 61 of the PK 22 in step S439.

In step S440, the communication module 61 outputs the information received in step S439 to the DB access module 66. This is received by the DB access module 66 in step S506. In step S507, the DB access module 66 checks whether the PMD obtained in step S506 is in correspondence with the service ID corresponding to the service system 24 and allowed to be changed. When the PMD is allowed to be changed, the corresponding PMD in the PMDB 67 is changed (updated to the changed contents).

Thus, since each of the PK 22 and the service system 24 can check the other for spoofing before reading or changing PMD, safe service can be provided. In addition, the challenge code and the response code for authenticating the PK 22 or the service system 24 are each encrypted or decrypted by the public key or the private key of the PK 22 or the service system 24. Thus, even if a third party intercepts the communication, the contents of the challenge code and the response code are concealed, so that spoofing can be prevented more reliably.

Figure 7:
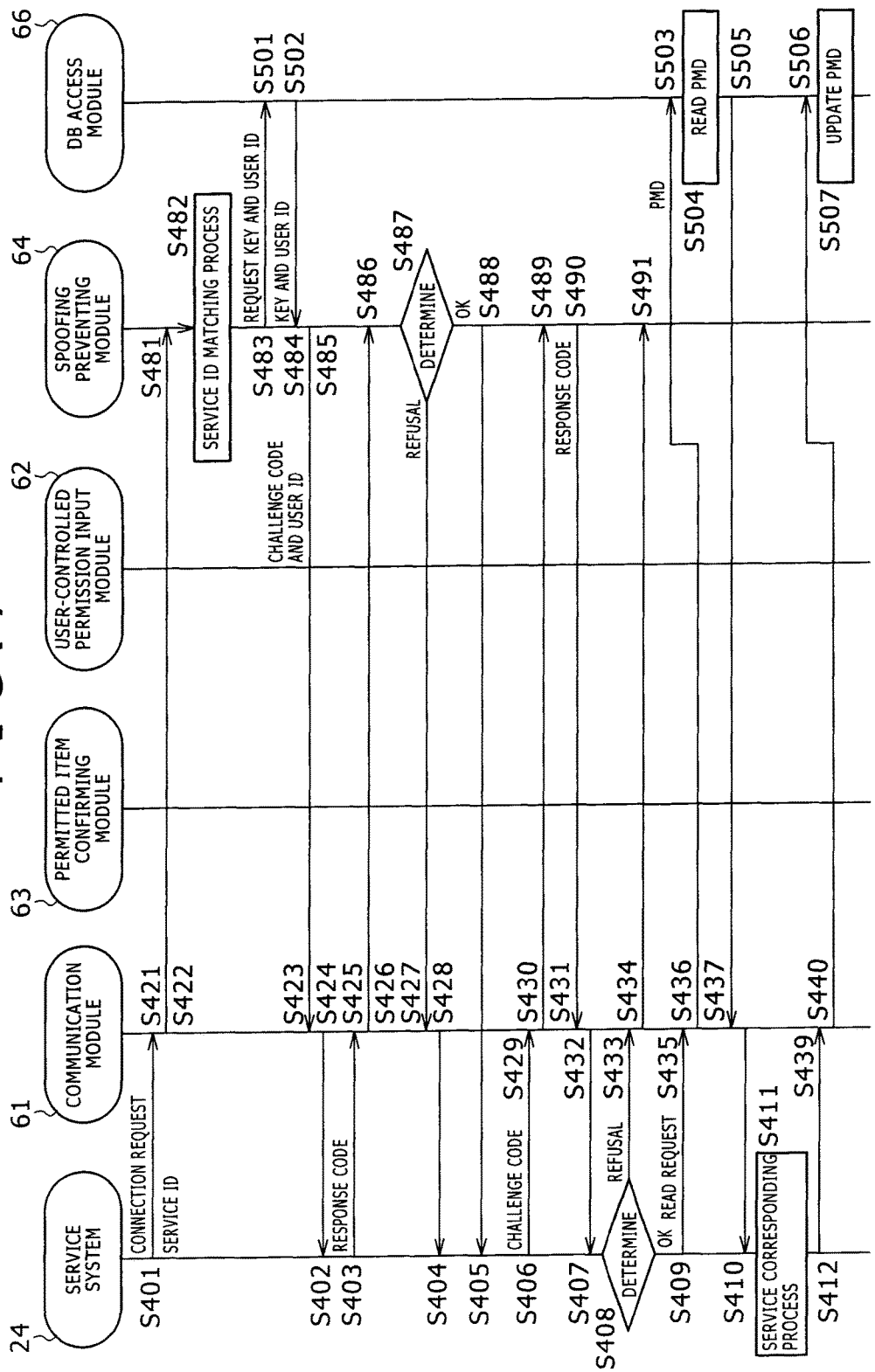
FIG. 7 is an arrow chart showing a flow of a process of preventing spoofing between the PK and the service system.

It is to be noted that while description with reference to FIG. 7 has been made of an example in which the challenge code and the response code are encrypted by the encryption algorithm of a public key system, the PK 22 and the service system 24 may have a function of encrypting and decrypting information by the encryption algorithm of a common key system rather than the encryption algorithm of a public key system, so that the PK 22 and the service system 24 retain an encryption key common to the PK 22 and the service system 24, and the challenge code and the response code are encrypted by the key to be communicated.

In this case, when a service ID is registered, the PK 22 generates an encryption key corresponding to the service ID, and stores the encryption key in the PMDB 67 in association with the service ID. At the same time, the PK 22 transmits the same encryption key to the service system 24, and the encryption key is stored in the database of the service system 24 in correspondence with the user ID of the PK 22.

When the encryption key is leaked, the PK 22 and the service system 24 need to change the encryption key. When a private key used in the encryption algorithm of the public key system of a certain service system is leaked, for example, a public key corresponding to the service ID needs to be changed in a large number of PKs using the service system. However, when the PK 22 and the service system 24 retain an encryption key common to the PK 22 and the service system 24, a leakage of the encryption key can be dealt with by changing only the encryption key of the PK 22 and the service system 24 using the key.

It is to be noted that while description with reference to FIG. 7 has been made of an example in which the challenge code and the response code are encrypted, all communication contents may be encrypted.

Also, while description with reference to FIG. 7 has been made of an example in which the private key (or the common key) is stored in the PK 22 (PMDB 67), the private key (or the common key) may be stored in a device different from the PK 22, for example the SB 26 in FIG. 1. In this case, prior to communication with the service system 24, the PK 22 and the SB 26 communicate with each other so that the private key is transmitted from the SB 26 to the PK 22 (at this time, the SB communicates as one service system with the PK). The PK erases the private key when a certain time has passed, and communicates with the SB 26 to obtain the private key each time the private key is required.

Figure 8:
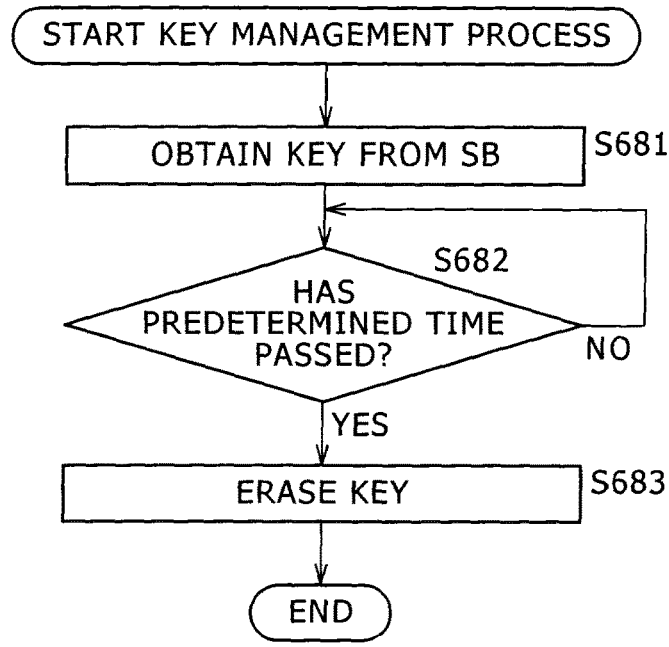
FIG. 8 is a flowchart of assistance in explaining a key management process.

A key management process of the PK 22 in this case will be described with reference to FIG. 8. This process is performed prior to a spoofing preventing process as shown in FIG. 7 performed when the PK 22 communicates with the service system 24.

In step S681, the CPU 101 of the PK 22 obtains a key from the SB 26, and stores the key in the storage unit 108. In step S682, the CPU 101 determines whether a predetermined time (for example one hour) has passed. The CPU 101 stands by until the CPU 101 determines that the predetermined time has passed. When the CPU 101 determines in step S682 that the predetermined time has passed, the key stored in the storage unit 108 is erased in step S683.

Key management is thus performed. This prevents a leakage of the private key even when the PK 22 is stolen, for example.

Details of the service ID registration process in step S102 in FIG. 5 will next be described with reference to FIG. 9. In many cases, the service system 24 is a server connected to the Internet 21. This process is performed when the URI (Uniform Resource Identifiers) of the server forming the service system 24 is obtained as information for identifying the service system 24 in step S102 in FIG. 5.

In step S801, the DB access module 66 obtains a URI. In step S802, the DB access module 66 determines whether there is a mask. A mask is information indicating a predetermined segment in the URI, and is set in advance by the user, for example.

URIs are managed as unique addresses on the Internet 21. Various servers all over the world are named "http://aaa.bbb.ccc," for example. A part "http://aaa.bbb." (or "http://aaa.") generally denotes the name of a company or the like corresponding to service provided by the server. A part "ccc" changes according to contents of the service. When a user allows PMD to be read or changed for all of various services provided by a specific company, the service system 24 may be identified by referring to only the part "http://aaa.bbb." In such a case, a second segment (the part "ccc") is set as a mask.

When the DB access module 66 determines in step S802 that there is a mask, the process proceeds to step S804, where the DB access module 66 registers the URI (the part "http://aaa.bbb.") obtained by removing the masked part as a service ID. When the DB access module 66 determines in step S802 that there is no mask, the process proceeds to step S803, where the DB access module 66 registers the URI as it is ("http://aaa.bbb.ccc") as a service ID.

After the process in step S803 or S804, the process proceeds to step S805, where the DB access module 66 generates PMD corresponding to the service ID by associating the service ID with personal related information used in the service system 24 corresponding to the service ID.

The service ID is thus registered.

Details of the service ID matching process in step S282 in FIG. 6 or step S482 in FIG. 7 will next be described with reference to FIG. 10. Incidentally, in this example, the service ID matching process is performed by the DB access module 66.

In step S841, the DB access module 66 obtains a URI. In step S842, the DB access module 66 cuts the URI to the same length as that of a service ID. At this time, when "http://aaa.bbb.ccc" is obtained as the URI, for example, the part "http://aaa.bbb." is cut out. In step S843, the DB access module 66 compares the URI cut out in step S842 with a registered service ID.

In step S844, the DB access module 66 determines whether the URI matches the service ID as a result of comparison in step S843. When the DB access module 66 determines that the URI does not match the service ID, the process proceeds to step S846, where the DB access module 66 determines whether all registered IDs are checked. When the DB access module 66 determines that all the registered IDs are not checked yet, the process proceeds to step S847, where the DB access module 66 compares the URI cut out in step S842 with a next service ID, and then returns to step S844.

When the DB access module 66 determines in step S844 that the URI matches the service ID as a result of the comparison in step S843, the process proceeds to step S845, where the matching service ID is recognized as a service ID for identifying the service system 24.

When the DB access module 66 determines in step S846 that all the registered IDs are checked, the process proceeds to step S848, where the DB access module 66 notifies refusal of this service.

The service ID is thus recognized.

As described above, personal related information is stored as PMD in the PK 22. It is desirable that PMD stored within the PK 22 be encrypted and thereby concealed so as to prevent abuse of the PK 22 even if the PK 22 is stolen.

For example, the PMD may be encrypted by the public key of the PK 22, and decrypted using the private key as required. The private key is stored in the SB. Hence, when communication between the PK 22 and the SB is ceased, the private key is not present in the PK, and thus the PMD cannot be read or changed.

Alternatively, the PK 22 may authenticate the user 20 so that the PMD can be used only when the user 20 is authenticated.

When the user cannot be authenticated by a one-time password (or a fixed password) or biometric authentication to be described later within a certain time, for example, control for reading or changing the PMD may be prohibited, or the PMD may be erased automatically. When the PMD is erased, and then the user is authenticated by a one-time password or biometric authentication, the PMD of the PK 22 is restored using the PMD stored in the pBase 23.

Figure 11A:
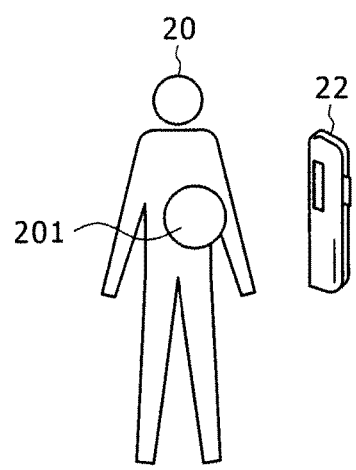
FIG. 11A is a diagram representing an example in which the PK authenticates a user.

FIG. 11 is a diagram representing an example of authentication of the user 20 by the PK 22. FIG. 11A is a diagram representing an example in which the PK 22 detects a chip 201 always carried by a user 20 and authenticates the user. The chip 201 is for example a sufficiently small transmitter that transmits a radio wave of a specific frequency at all times and is always carried by the user 20. Suppose in this case that the PK 22 has a sensor for detecting the radio wave transmitted by the chip 201, and that the sensor is connected to the input unit 106 of the PK 22. The PK 22 authenticates the user 20 by detecting the radio wave of a frequency transmitted by the chip 201 registered in advance.

Figure 12:
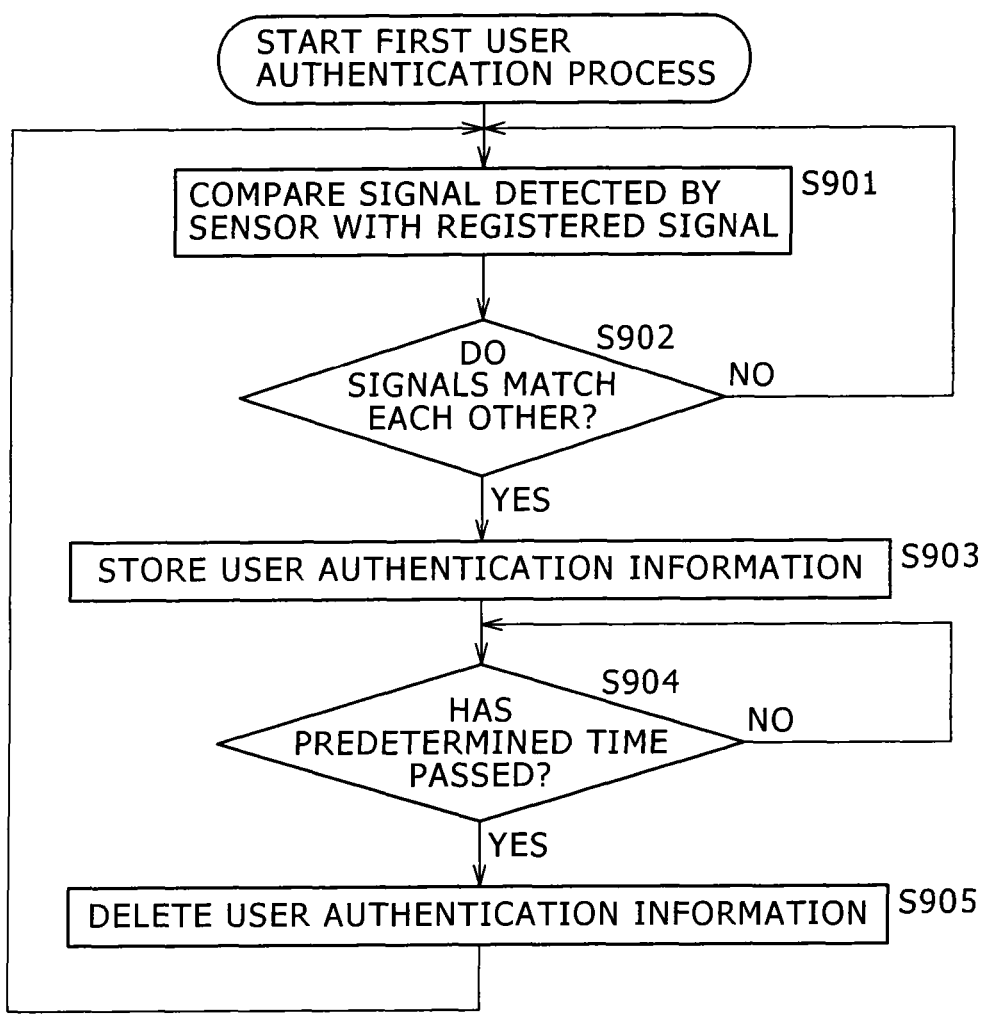
FIG. 12 is a flowchart of assistance in explaining a first user authentication process.

A first user authentication process in which the PK 22 authenticates the user 20 in this case will be described with reference to FIG. 12. This process continues being performed at all times while the PK 22 is in an ON state, for example.

In step S901, the CPU 101 of the PK 22 compares a signal detected by the sensor with the signal of the registered chip 201. In step S902, the CPU 101 determines whether the signals match each other as a result of comparison in step S901. When the CPU 101 determines that the signals do not match each other, the process returns to step S901.

When the CPU 101 determines in step S902 that the signals match each other, the process proceeds to step S903, where user authentication information is stored. At this time, information indicating that the user 20 is authenticated is stored in the storage unit 108 as user authentication information together with a present time (date and time).

In step S904, the CPU 101 determines whether a predetermined time (for example one hour) has passed. The CPU 101 stands by until the CPU 101 determines that the predetermined time has passed. When the CPU 101 determines in step S904 that the predetermined time has passed, the process proceeds to step S905, where the CPU 101 deletes the user authentication information. The process then returns to step S901 to repeat the process from step S901 on down.

Figure 11B:
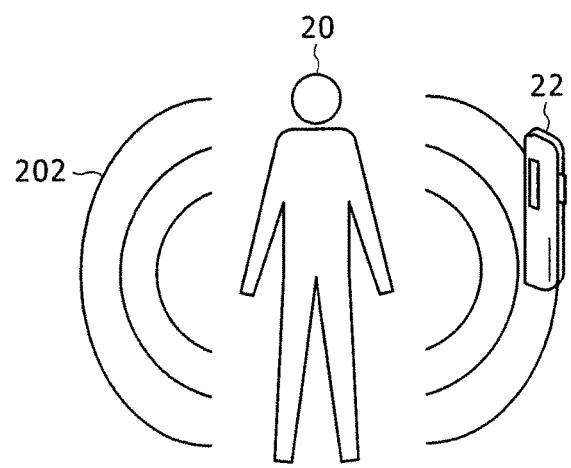
FIG. 11B is a diagram representing an example in which the PK authenticates a user.

Alternatively, authentication using biometric characteristics (a fingerprint, a voice print, an iris, a walk pattern and the like) of the user, that is, biometric authentication may be performed. FIG. 11B is a diagram showing an example in which a user 20 is authenticated by detecting a walk pattern 202 as a biometric characteristic of the user 20. Suppose in this case that the PK 22 is provided with a sensor for detecting changes in a quasi-electrostatic field, and that the sensor is connected to the input unit 106 of the PK 22. The PK 22 authenticates the user 20 by detecting the walk pattern of the user 20 registered in advance. Incidentally, the walk pattern is a change pattern of a quasi-electrostatic field occurring at a human body when the person walks, and this pattern can be used to recognize the person (see for example "METHOD AND DEVICE FOR DETECTING WALK," Japanese Patent Laid-Open No. 2003-58857).

Figure 13:
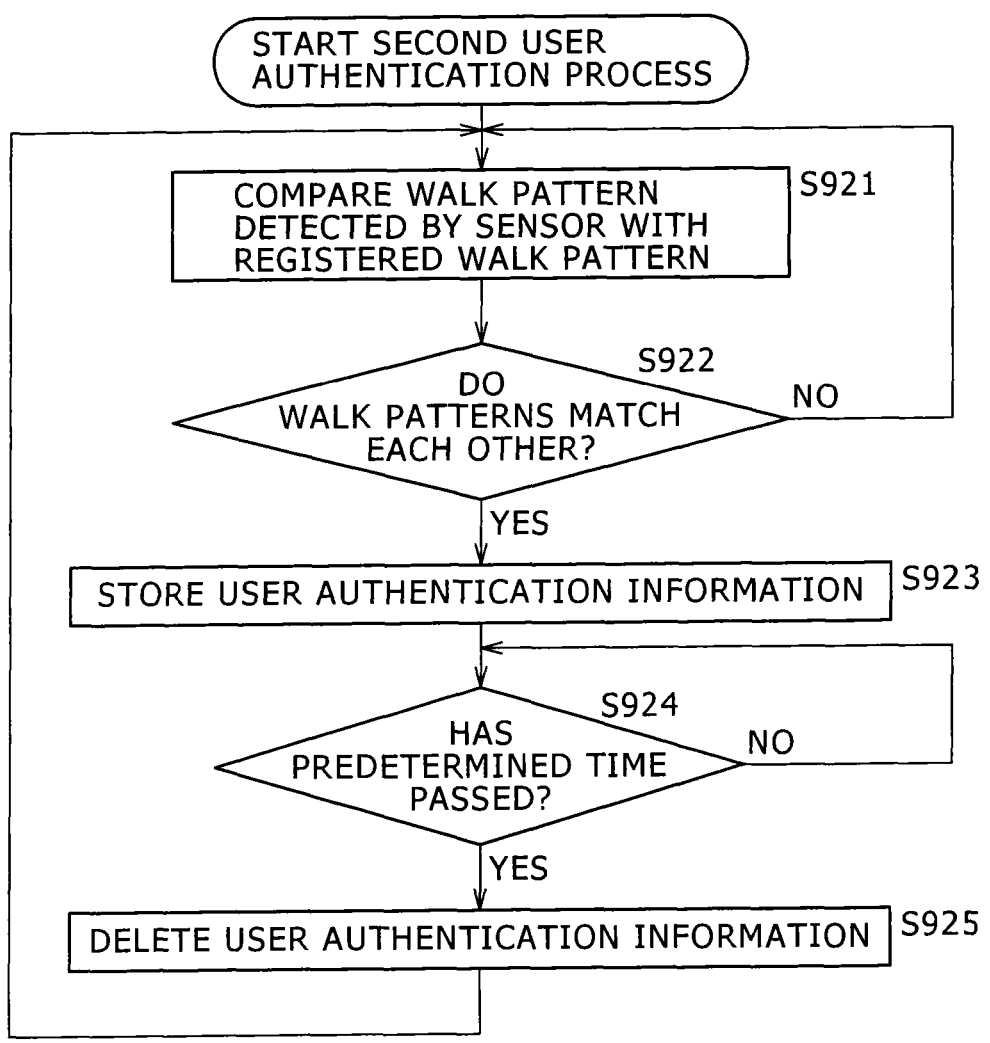
FIG. 13 is a flowchart of assistance in explaining a second user authentication process.

A second user authentication process in which the PK 22 authenticates the user 20 in this case will be described with reference to FIG. 13. This process continues being performed at all times while the PK 22 is in an ON state, for example.

In step S921, the CPU 101 of the PK 22 compares a change pattern (walk pattern) of a quasi-electrostatic field detected by the sensor with the walk pattern of the registered user. In step S902, the CPU 101 determines whether the walk patterns match each other as a result of comparison in step S921. When the CPU 101 determines that the walk patterns do not match each other, the process returns to step S921.

When the CPU 101 determines in step S922 that the walk patterns match each other, the process proceeds to step S923, where user authentication information is stored. At this time, information indicating that the user 20 is authenticated is stored in the storage unit 108 as user authentication information together with a present time (date and time).

In step S924, the CPU 101 determines whether a predetermined time (for example one hour) has passed. The CPU 101 stands by until the CPU 101 determines that the predetermined time has passed. When the CPU 101 determines in step S924 that the predetermined time has passed, the process proceeds to step S925, where the CPU 101 deletes the user authentication information. The process then returns to step S921 to repeat the process from step S921 on down.

Thus, the PK 22 authenticates the user 20 at intervals of the predetermined time. While the example in which the user 20 is authenticated by the chip 201 or the walk pattern 202 has been described above, the user authentication method is not limited to this. For example, the PK 22 is made to communicate with a nearby personal computer, and the user may be authenticated on the basis of a password input from the personal computer.

Figure 14:
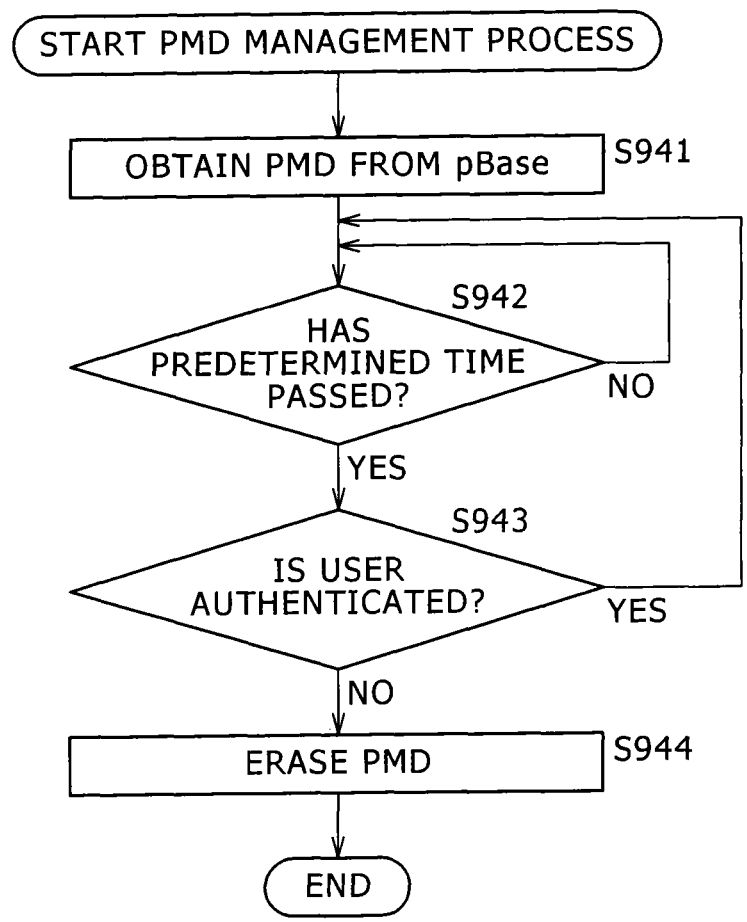
FIG. 14 is a flowchart of assistance in explaining a PMD management process.

As described above, when the user cannot be authenticated, the PK 22 can automatically erase PMD. A PMD management process in this case will be described with reference to FIG. 14. This process is performed each time PMD is required in the PK 22. Incidentally, prior to the performance, the CPU 101 of the PK 22 checks that the user authentication information stored in step S903 in FIG. 12 or step S923 in FIG. 13 is present in the storage unit 108 (that the user is authenticated).

In step S941, the CPU 101 communicates with the pBase 23 to obtain PMD from the pBase 23, and stores the PMD in the storage unit 108. In step S942, the CPU 101 determines whether a predetermined time (for example three hours) has passed since the PMD was obtained in step S941. The CPU 101 stands by until the CPU 101 determines that the predetermined time has passed.

When the CPU 101 determines in step S942 that the predetermined time has passed, the process proceeds to step S943, where the CPU 101 determines whether the user is authenticated. At this time, the CPU 101 determines whether the user authentication information stored in step S903 in FIG. 12 or step S923 in FIG. 13 is present in the storage unit 108. When the user authentication information is present, the CPU 101 determines that the user is authenticated. When the user authentication information is not present, the CPU 101 determines that the user is not authenticated. When the CPU 101 determines in step S943 that the user is authenticated, the process returns to step S942 to repeat the process from step S942 on down.

When the CPU 101 determines in step S943 that the user is not authenticated, the CPU 101 proceeds to step S944 to erase the PMD obtained in step S941 from the storage unit 108.

Thus, when the PK 22 cannot authenticate the user, the PMD is automatically erased.

As described above, the PK 22 is a small computer that can be easily carried by the user. When various interfaces (for example a display, a touch panel and the like) are arranged directly on the PK 22, the user may not easily carry the PK 22 because of a resulting increase in size and weight of the PK 22.

It is therefore desirable that interfaces arranged directly on the PK 22 be as small as possible and that a device or the like external to the PK 22 be used as an interface for inputting or outputting complex information, for example.

Figure 15:
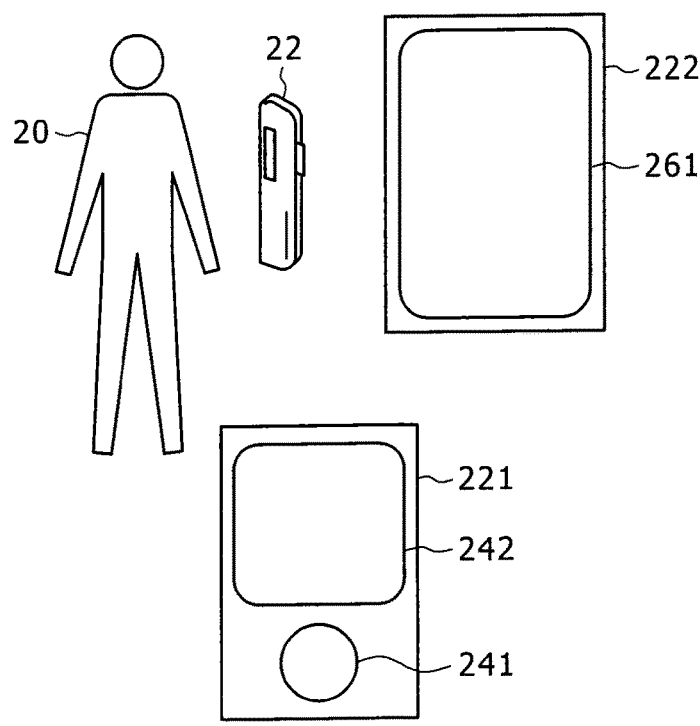
FIG. 15 is a diagram showing an example in which devices external to the PK are used to form an input/output interface.

FIG. 15 is a diagram showing an example in which the PK 22 uses an external console 221 and an external console 222 as an interface for input or output. In this case, the PK 22 performs wireless communication such as RF communication or the like with the external consoles 221 and 222. The external console 221 includes an item list screen 242 and a push switch 241. For example, a PMD list is displayed on the item list screen 242. By operating the push switch 241, the user specifies permission of access to the PMD displayed on the item list screen 242.

The external console 222 has a display 261 with a touch pad. A console displayed on the display 261 with the touch pad can be changed to provide a different interface corresponding to a service ID, for example.

Incidentally, the external console 221 or 222 can be considered to be one service system providing interface service to the PK 22. In this case, the PK 22 communicates with a server storing control code for the external console 221 or 222 as a service system, and thereby obtains the control code for the external console 221 or 222. The PK 22 thereafter communicates with the external console 221 or 222 as a service system to make the control code implemented in the external console 221 or 222.

Figure 16:
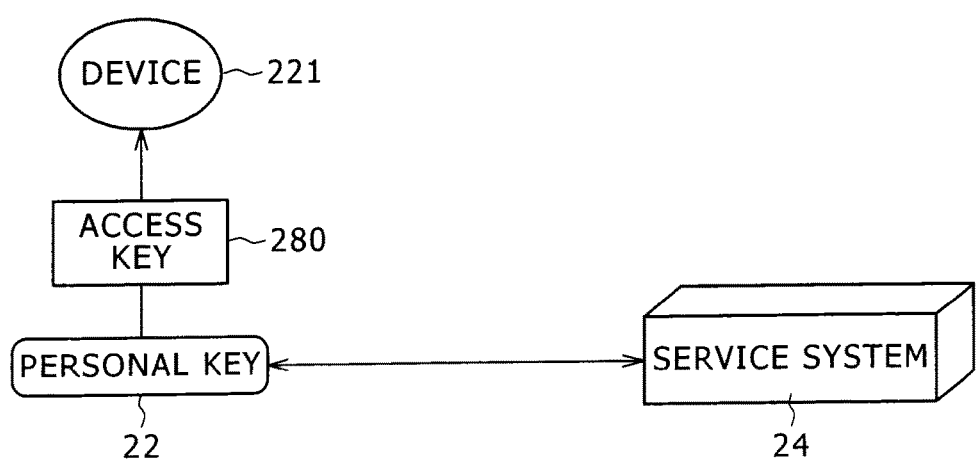
FIG. 16 is a diagram showing a state in which an access key to a peripheral device is concealed by the PK.

By thus controlling a peripheral device such as the external console 221 or the like from the service system 24 via the PK 22, service can be received while an access key 280 such as the address of the peripheral device (the external console 221 or the like) is concealed from the service system 24, as shown in FIG. 16.

Figure 17A:
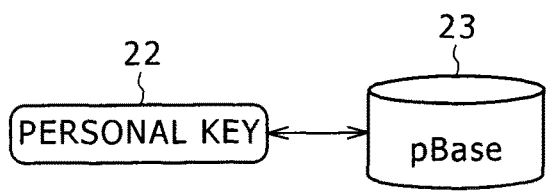
FIG. 17A is a diagram showing a pattern of communication between the PK, the pBase and the service system.

The use of PMD by the PK 22, the pBase 23, and the service system 24 will next be described with reference to FIG. 17. As described above, the PK 22 communicates with the access point 25 connected to the Internet 21 by wireless communication such as RF communication, quasi-electrostatic field communication, optical communication or the like, and is thereby connected to the Internet 21. At this time, as shown in FIG. 17A, the PK 22 and the pBase 23 are connected to each other via the Internet 21, PMD contents of the PK 22 and the pBase 23 are compared with each other, and PMD synchronization is performed. For example, when the PMD contents of the PK 22 are updated, the PMD of the pBase 23 is updated in the same manner, whereby PMD synchronization is performed. Incidentally, details of PMD synchronization will be described later.

Figure 17B:
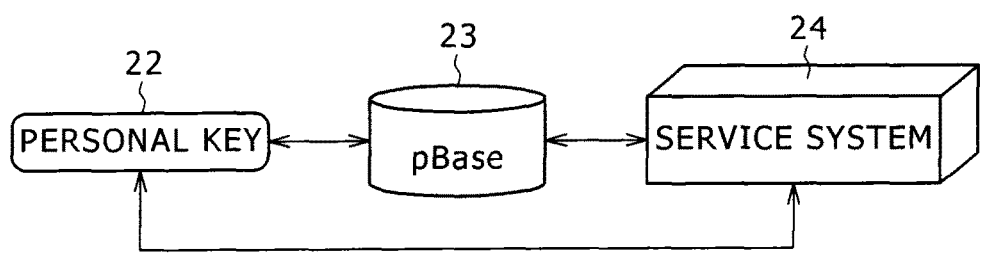
FIG. 17B is a diagram showing a pattern of communication between the PK, the pBase and the service system.

In addition, for example, when all PMD cannot be stored in the PK 22, the PMD can be stored in the pBase 23 so that as shown in FIG. 17B, the service system 24 provides service to the user of the PK 22 referring to the PMD in the pBase 23.

Figure 17C:
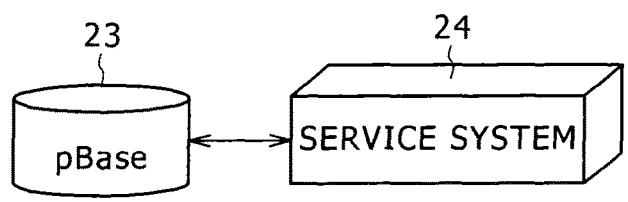
FIG. 17C is a diagram showing a pattern of communication between the PK, the pBase and the service system.

Alternatively, when the PK 22 cannot be connected to the Internet 21, since the pBase 23 stores the PMD of the PK 22, the user can receive service by making the pBase 23 communicate with the service system 24 in place of the PK 22 (by substituting the pBase 23 for the PK 22), as shown in FIG. 17C. In such a case, a spoofing preventing process and PMD transmission and reception are performed between the pBase 23 in place of the PK 22 and the service system 24.

Figure 18:
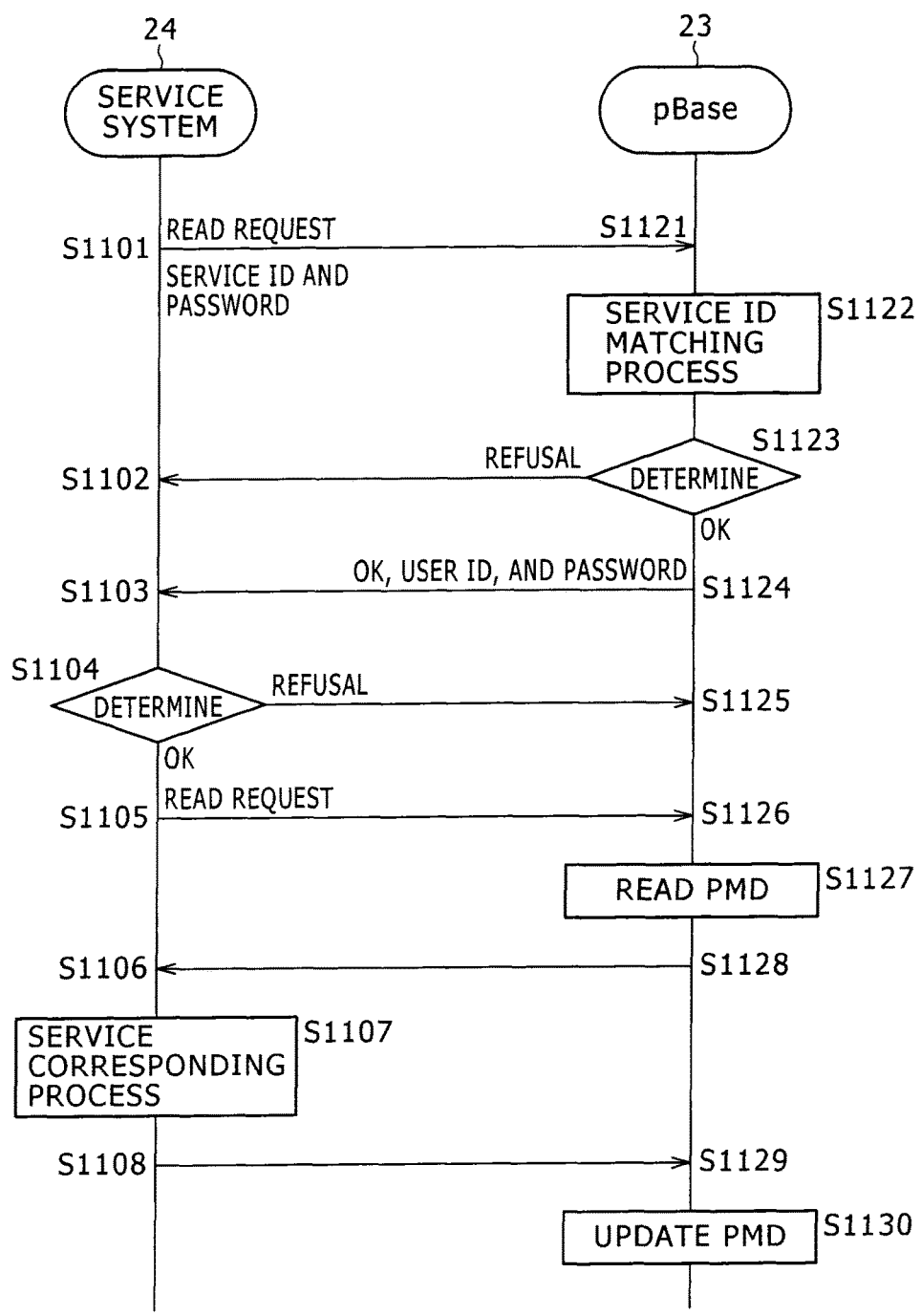
FIG. 18 is an arrow chart showing a flow of a process of preventing spoofing between the pBase and the service system.
Figure 19:
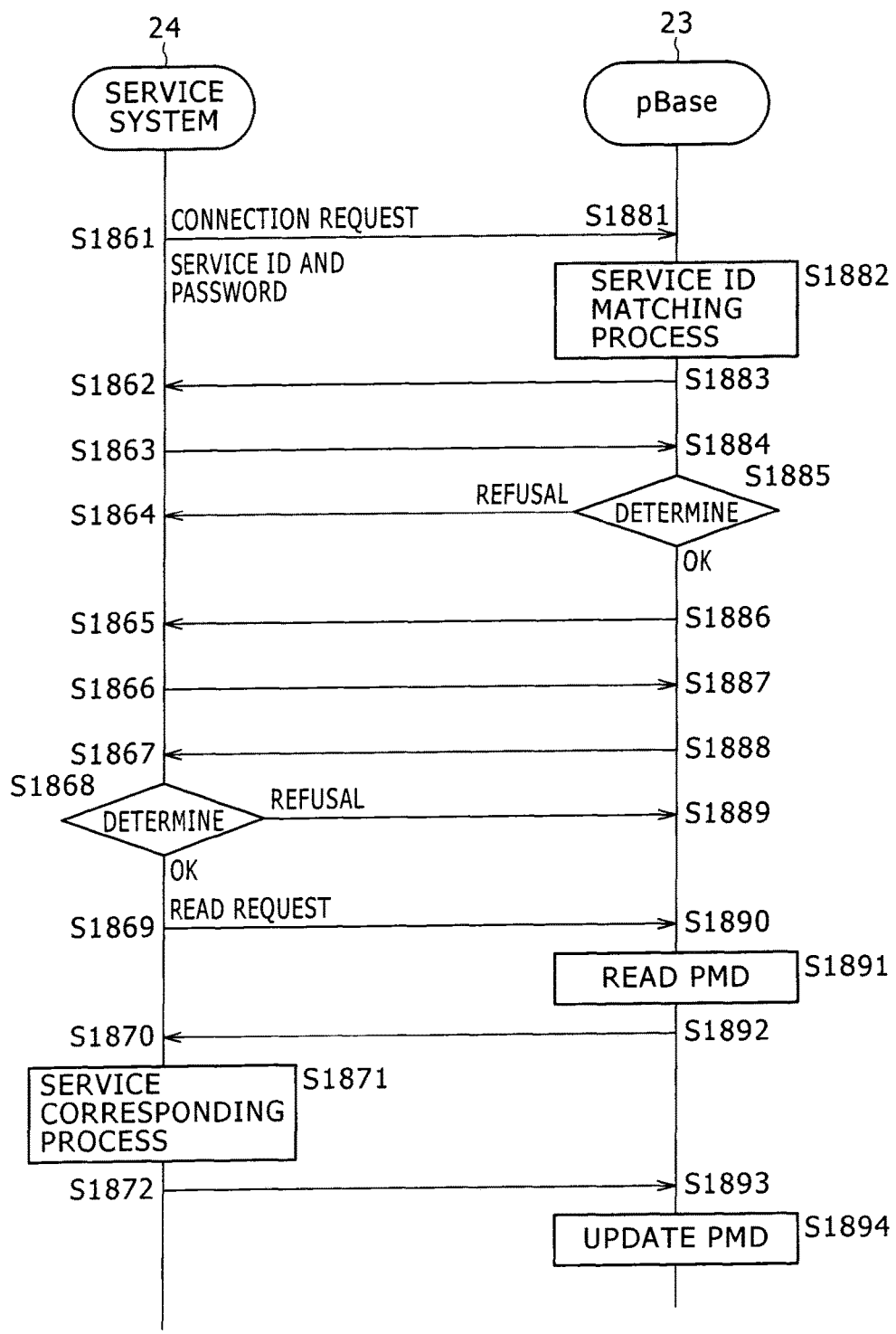
FIG. 19 is an arrow chart showing a flow of a process of preventing spoofing between the pBase and the service system.

A flow of a process between the pBase 23 and the service system 24 in the case of FIG. 17C will be described with reference to FIG. 18 and FIG. 19. Suppose in an example of FIG. 18 that PMD corresponding to the PK 22 (the user of the PK 22) is stored in a database in the storage unit 128 of the pBase 23, and that authentication by password is employed as a spoofing preventing method between the pBase 23 and the service system 24 as in the case of FIG. 6.

In the same figure, the pBase 23 confirms that the service system 24 is not spoofed, and thereafter the service system 24 confirms that the pBase 23 is not spoofed. After the pBase 23 and the service system 24 confirm that the service system 24 and the pBase 23 are not spoofed, a process for reading or changing PMD is performed. Suppose in this example that a PK password, a service system password, the user ID of the PK 22, and the service ID of the service system 24 are also stored as PMD of the PK 22 in the database in the storage unit 128 of the pBase 23.

In step S1101, the service system 24 transmits a connection request, the service ID, and the password to the pBase 23. This is received in step S1121. In step S1122, the pBase 23 performs the service ID matching process described above with reference to FIG. 10, and thereby recognizes the service ID. The pBase 23 reads the service password, the PK password, and the user ID corresponding to the service ID from the database in the storage unit 128. In step S1123, the pBase 23 compares the service password obtained in step S1121 with the service password read from the database in the storage unit 128. When the pBase 23 determines that the service passwords do not match each other, the pBase 23 determines that the service system 24 may be spoofed. The pBase 23 communicates a refusal signal indicating refusal of communication to the service system 24. This is received in step S1102.

Thus, in a case where the password corresponding to the service ID is not transmitted from the service system 24 when communication is started, the communication is refused by the pBase 23.

On the other hand, when the pBase 23 determines in step S1123 that the service passwords match each other, the pBase 23 in step S1124 transmits a code (OK) indicating that it has been confirmed that the service system 24 is not spoofed, the user ID, and the PK password corresponding to the user ID to the service system 24. This is received in step S1103.

In step S1104, the service system 24 reads a PK password corresponding to the user ID received in step S1103 from the database of the service system 24 itself, compares the read PK password with the PK password received in step S1103, and determines whether the PK passwords match each other. When the service system 24 determines in step S1104 that the PK passwords do not match each other, the service system 24 determines that the pBase 23 may be spoofed. The service system 24 transmits a refusal signal indicating refusal of communication to the pBase 23. This is received in step S1125.

Thus, in a case where the password corresponding to the user ID is not transmitted from the pBase 23 when communication is started, the communication is refused by the service system 24.

On the other hand, when the service system 24 determines in step S1104 that the PK passwords match each other, the service system 24 determines that it is confirmed that the pBase 23 is not spoofed. In step S1105, the service system 24 transmits a request to read PMD to the pBase 23. This is received in step S1126. In step S1127, the pBase 23 checks whether the PMD requested to be read by the service system 24 is in correspondence with the service ID corresponding to the service system 24 and allowed to be read. When the PMD is allowed to be read, the pBase 23 reads the PMD from the database in the storage unit 128. In step S1128, the pBase 23 transmits the read PMD to the service system 24. This is received in step S1106.

In step S1107, the service system 24 performs various processes (service corresponding process) on the basis of the PMD received in step S1106. When the PMD needs to be changed as a result of the process in step S1107, the service system 24 in step S1108 changes contents of the PMD, and transmits the contents to the pBase 23. This is received in step S1129. In step S1130, the pBase 23 checks whether the PMD obtained in step S1129 is in correspondence with the service ID corresponding to the service system 24 and allowed to be changed. When the PMD is allowed to be changed, the corresponding PMD in the database of the storage unit 128 is changed (updated to the changed contents).

Thus, since checks for spoofing can be made between the pBase 23 in place of the PK 22 and the service system 24 before reading or changing PMD as in the case of FIG. 6, safe service can be provided.

Another example of a process between the pBase 23 and the service system 24 in the case of FIG. 17C will next be described with reference to FIG. 19. Suppose in this case that PMD corresponding to the PK 22 (the user of the PK 22) is stored in the storage unit 128 of the pBase 23, and that authentication using information encrypted by a public key is employed as a spoofing preventing method between the pBase 23 and the service system 24 as in the case of FIG. 7.

In the same figure, the pBase 23 confirms that the service system 24 is not spoofed, and service system 24 have a function of encrypting or decrypting information by the encryption algorithm of a public key system such as RSA or the like. Incidentally, suppose that the private key of the PK 22, the public key of the service system 24, the user ID of the PK 22, and the service ID of the service system 24 are stored as PMD of the PK 22 in the database in the storage unit 128 of the pBase 23.

In step S1861, the service system 24 transmits a connection request and the service ID to the pBase 23. This is received in step S1881. In step S1882, the pBase 23 performs a service ID matching process in the same manner as described above with reference to FIG. 10, and thereby recognizes the service ID. The pBase 23 obtains the user ID corresponding to the service ID, the public key of the service system 24, and the private key of the PK 22.

In step S1883, to authenticate the service system 24, the pBase 23 generates a challenge code formed by a predetermined code, encrypts the challenge code by the public key corresponding to the service ID (the public key of the service system 24), and transmits the encrypted challenge code and the user ID to the service system 24. This is received in step S1862.

In step S1863, the service system 24 decrypts the encrypted challenge code received in step S1862 by the private key of the service system 24, sets the decrypted challenge code as a response code, encrypts the response code by the public key corresponding to the user ID, and transmits the encrypted response code to the pBase 23. This is received in step S1884.

In step S1885, the pBase 23 decrypts the encrypted response code received in step S1884 by the private key of the PK 22, and compares the decrypted response code with the challenge code generated in step S1883 to determine whether the challenge code and the response code match each other. When the pBase 23 determines that the challenge code does not match the response code, the pBase 23 determines that the service system 24 may be spoofed. The pBase 23 communicates a refusal signal indicating refusal of communication to the service system 24. This is received in step S1864.

Thus, the challenge code is transmitted from the pBase 23 when communication is started. When the response code matching the challenge code is not returned from the service system 24, the communication is refused by the pBase 23.

On the other hand, when the pBase 23 determines in step S1885 that the challenge code and the response code match each other, the pBase 23 in step S1886 transmits a code (OK) indicating that it has been confirmed that the service system 24 is not spoofed to the service system 24. This is received in step S1865.

In step S1866, to authenticate the pBase 23 (PK 22), the service system 24 generates a challenge code formed by a predetermined code, encrypts the challenge code by the public key corresponding to the user ID (the public key of the PK 22), and transmits the encrypted challenge code to the pBase 23. This is received in step S1887.

In step S1888, the pBase 23 decrypts the encrypted challenge code received in step S1887 by the private key of the PK 22, sets the decrypted challenge code as a response code, encrypts the response code by the public key corresponding to the service ID, and transmits the encrypted response code to the service system 24. This is received by the service system 24 in step S1867.

In step S1868, the service system 24 decrypts the encrypted response code received in step S1867 by the private key of the service system 24, and determines whether the decrypted response code matches the challenge code generated in step S1866. When the service system 24 determines that the challenge code does not match the response code, the service system 24 determines that the pBase 23 may be spoofed. The service system 24 transmits a refusal signal indicating refusal of communication to the pBase 23. This is received in step S1889.

Thus, the challenge code is transmitted from the service system 24 when communication is started. When the response code matching the challenge code is not returned from the pBase 23, the communication is refused by the service system 24.

On the other hand, when the service system 24 determines in step S1868 that the challenge code and the response code match each other, the service system 24 determines that it is confirmed that the pBase 23 is not spoofed. In step S1869, the service system 24 transmits a request to read PMD to the pBase 23. This is received in step S1890. In step S1891, the pBase 23 checks whether the PMD requested to be read by the service system 24 is in correspondence with the service ID corresponding to the service system 24 and allowed to be read. When the PMD is allowed to be read, the pBase 23 reads the PMD from the database of the storage unit 128. In step S1892, the pBase 23 transmits the read PMD to the service system 24. This is received by the service system 24 in step S1870.

In step S1871, the service system 24 performs various processes (service corresponding process) on the basis of the PMD received in step S1870. When the PMD needs to be changed as a result of the process in step S1871, the service system 24 in step S1872 changes contents of the PMD, and transmits the contents to the pBase 23. This is received in step S1893. In step S1894, the pBase 23 checks whether the PMD received in step S1893 is in correspondence with the service ID corresponding to the service system 24 and allowed to be changed. When the PMD is allowed to be changed, the corresponding PMD in the database of the storage unit 128 is changed (updated to the changed contents).

Thus, since checks for spoofing are made between the pBase 23 in place of the PK 22 and the service system 24 as in the case of FIG. 7 before reading or changing PMD, safe service can be provided. Incidentally, description with reference to FIG. 19 has been made of an example in which the challenge codes and the response codes are encrypted by the encryption algorithm of a public key system, the challenge codes and the response codes may be encrypted by the encryption algorithm of a common key system.

FIGS. 20A to 20C are diagrams showing detailed examples of composition of PMD. The PMD shown in the same figures is a set of metadata associated with a service ID (for example the service ID 1), as described above. Described in the PMD are properties as identifying information for identifying the metadata, and the contents of the properties. A property "name" indicates a user ID provided to the service system 24 corresponding to the service ID 1, and "foo" is described as contents of the property.

A property "spoofing preventing method" in FIG. 20A indicates the method of a spoofing preventing process performed with the service system 24 corresponding to the service ID 1, and "public key system" is described as contents of the property. A property "spoofing preventing method" corresponds to the confirmation code generated in step S82 in FIG. 5. A property "service public key" indicates the public key of the service system 24 corresponding to the service ID 1, and key data is described as contents of the property. A property "PK private key" indicates the private key of the PK 22, and key data is described as contents of the property.

As shown in FIG. 20B, when "common key system" is described as contents of the property "spoofing preventing method," a property "common key" is generated in the PMD in place of the property "service public key" and the property "PK private key," and key data is described as contents of the property. As shown in FIG. 20C, when "password system" is described as contents of the property "spoofing preventing method," a property "service password" and a property "PK password" are generated in the PMD in place of the property "service public key" and the property "PK private key," and a service password and a PK password are described as contents of the properties, respectively.

A property "action" indicates a processing program executed by service corresponding to the service ID 1, and a program is described as contents of the property. A property "program preference information" indicates user preference information used in the service corresponding to the service ID 1, and "sports 10, variety 7, music 5, and others 3" is described as contents of the property.

Access control describes access control information corresponding to the contents of the properties. Control information is set for each property. The control information is a code formed by a predetermined number of bits, and is set as follows, for example.

A setting for indicating whether or not to permit reading of the contents of the property in the service corresponding to the service ID 1 is made by a first bit. A setting for indicating whether or not to permit changing of the contents of the property in the service corresponding to the service ID 1 is made by a second bit. A setting for indicating whether or not to permit reading of contents of the property in service corresponding to a service ID other than the service ID 1 is made by a third bit. A setting for indicating whether or not to permit changing of the contents of the property in service corresponding to a service ID other than the service ID 1 is made by a fourth bit.

In addition, a bit for making a setting to indicate whether or not to permit the execution of the program, a bit for making a setting to allow free access (not to limit access), and the like may be provided. Incidentally, the control information set under the access control may be stored collectively as access permission information (FIG. 4).

A PMD updating process will next be described with reference to FIG. 21. This process is performed by the service system 24 as one service corresponding process in step S207 in FIG. 6 or step S411 in FIG. 7 when the service system 24 provides contents viewing service, for example.

In step S1901, the CPU 121 obtains the metadata of a viewed program (contents). In step S1902, the CPU 121 analyzes the genre of the metadata. In step S1903, the CPU 121 determines whether the genre analyzed in step S1902 is sports. When the CPU 121 determines that the genre is sports, the CPU 121 proceeds to step S1904 to increase points of sports in the contents of the property "program preference information" in the PMD. For example, "sports 10, variety 7, music 5, and others 3" in FIG. 20 is changed to "sports 11, variety 7, music 5, and others 3."

When the CPU 121 determines in step S1903 that the genre analyzed in step S1902 is not sports, the CPU 121 determines in step S1905 whether the genre is variety. When the CPU 121 determines that the genre is variety, the CPU 121 proceeds to step S1906 to increase points of variety in the contents of the property "program preference information" in the PMD. For example, "sports 10, variety 7, music 5, and others 3" in FIG. 20 is changed to "sports 10, variety 8, music 5, and others 3."

When the CPU 121 determines in step S1905 that the genre analyzed in step S1902 is not variety, the CPU 121 determines in step S1907 whether the genre is music. When the CPU 121 determines that the genre is music, the CPU 121 proceeds to step S1908 to increase points of music in the contents of the property "program preference information" in the PMD. For example, "sports 10, variety 7, music 5, and others 3" in FIG. 20 is changed to "sports 10, variety 7, music 6, and others 3."

When the CPU 121 determines in step S1907 that the genre analyzed in step S1902 is not music, the CPU 121 proceeds to step S1909 to increase points of others in the contents of the property "program preference information" in the PMD. For example, "sports 10, variety 7, music 5, and others 3" in FIG. 20 is changed to "sports 10, variety 7, music 5, and others 4."

The PMD is thus updated in the service system 24. The updated PMD is transmitted to the PK 22, and then the PMD of the PK 22 is updated.

While the above description has been made of an example in which the service system 24 performs the PMD updating process and the PMD of the PK 22 is updated in response to the update, the PK 22 may perform the PMD updating process. Alternatively, the pBase 23 may perform the PMD updating process, and the PMD of the PK 22 is synchronized with the PMD of the pBase 23.

Figure 22:
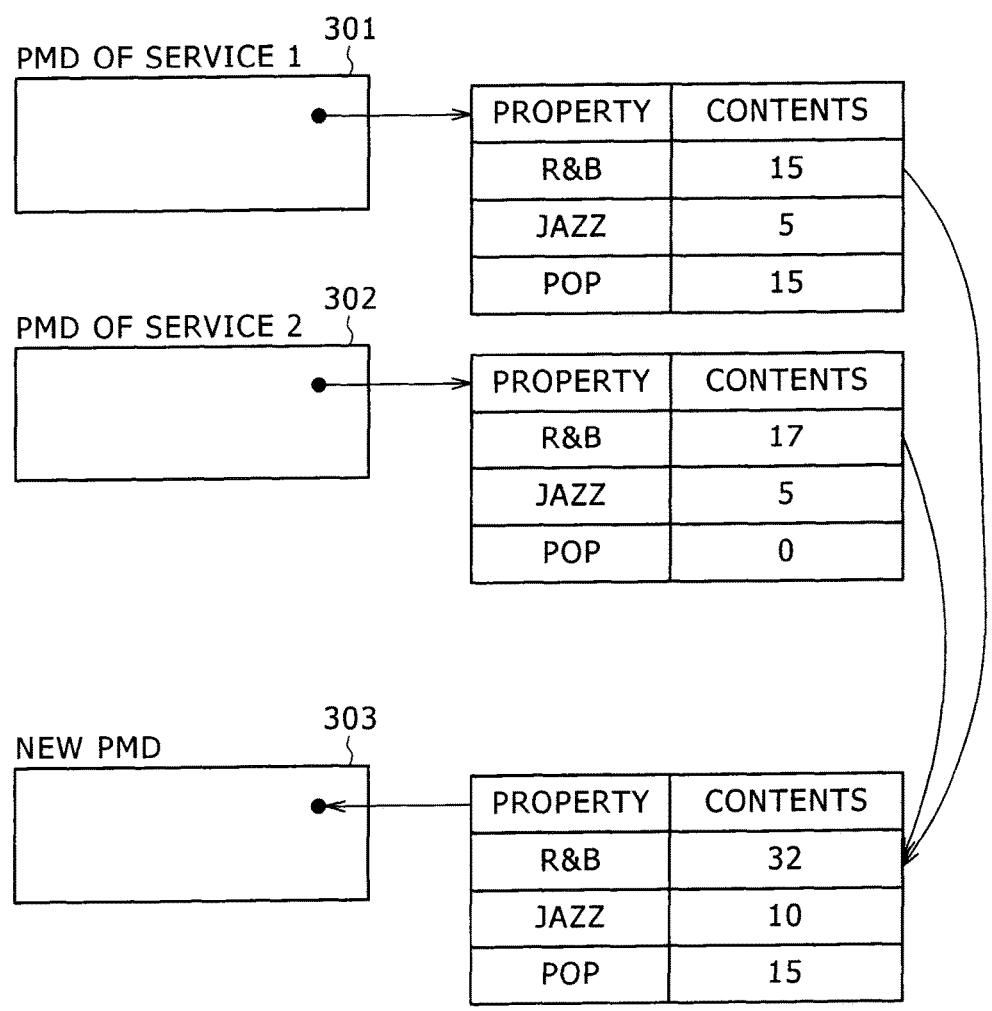
FIG. 22 is a diagram showing new PMD generated on the basis of a plurality of pieces of PMD.

It is possible to generate new PMD by combining contents of PMD used in different services. Suppose for example that a service corresponding to the service ID 1 and a service corresponding to the service ID 2 both provide contents related to music, and that there are a property "R&B," a property "jazz," and a property "POP" in PMD 301 corresponding to the service ID 1 and PMD 302 corresponding to the service ID 2 as shown in FIG. 22.

In this case, the PMD 301 and the PMD 302 are combined with each other to generate new PMD 303. At this time, the contents (15) of the property "R&B" in the PMD 301 and the contents (17) of the property "R&B" in the PMD 302 are added together, so that the contents of a property "R&B" in the new PMD 303 are set to "32 (=17+15)." Similarly, the contents of a property "jazz" in the new PMD 303 are set to "10 (=5+5)," and the contents of a property "POP" in the new PMD 303 are set to "15 (=15+0)."

The new PMD 303 thus generated is for example generated as PMD corresponding to the service IDs of the plurality of music providing services, and used as information on preference in music of the user of the PK 22.

It is also possible for the service system 24 (or the pBase 23) to generate new PMD by combining contents of PMD of a plurality of PKs 22. FIG. 23 shows an example in this case. There are a PK 22-1 and a PK 22-2 as PKs using one service system 24 (or pBase 23). There are a property "R&B," a property "jazz," and a property "POP" in the PMD 321 of the PK 22-1 and the PMD 322 of the PK 22-2. In this case, the service system 24 (or the pBase 23) generates new PMD 323 by combining the PMD 321 and the PMD 322 with each other.

At this time, the contents (15) of the property "R&B" in the PMD 321 and the contents (17) of the property "R&B" in the PMD 322 are added together, so that the contents of a property "R&B" in the new PMD 323 are set to "32 (=17+15)." Similarly, the contents of a property "jazz" in the new PMD 323 are set to "10 (=5+5)," and the contents of a property "POP" in the new PMD 323 are set to "15 (=15+0)."

The new PMD 303 thus generated is for example generated as common PMD of a plurality of users, and provided to a user of a PK 22 whose preference information is not stored yet as information on preference of the user.

Figure 24:
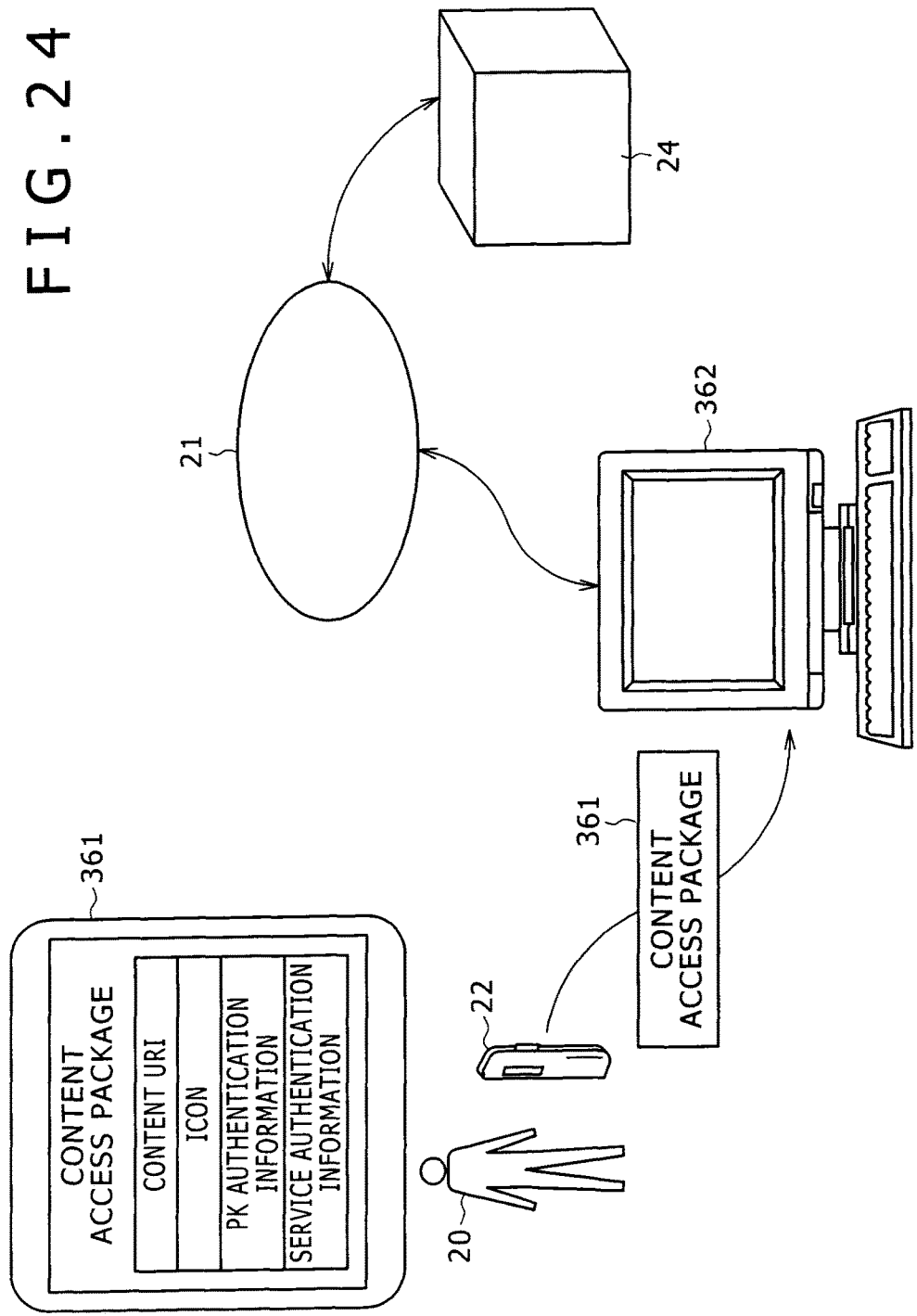
FIG. 24 is a diagram showing an example of composition of a content access package.

It is also possible to use the service system 24 from another device than the PK 22. In such a case, as shown in FIG. 24, the user 20 makes the PK 22 communicate with a terminal 362 specified by the user 20 to transmit a content access package 361 to the terminal 26. Then the terminal 362 communicates with the service system 24. The content access package 361 is a package in which information necessary to communicate with the service system 24 is collected. The content access package 361 for example includes a unique ID for identifying contents, such as a content URI or the like, an icon formed by a simple image, a character string or the like related to the contents, PK authentication information (for example the private key of the PK 22, the user ID and the like) used for a spoofing preventing process performed between the terminal 362 and the service system 24, and service authentication information (for example the public key of the service system 24, the service ID and the like).

Thus, the user can use the terminal 362 as if the terminal 362 is the PK 22 (as a virtual PK).

Figure 25:
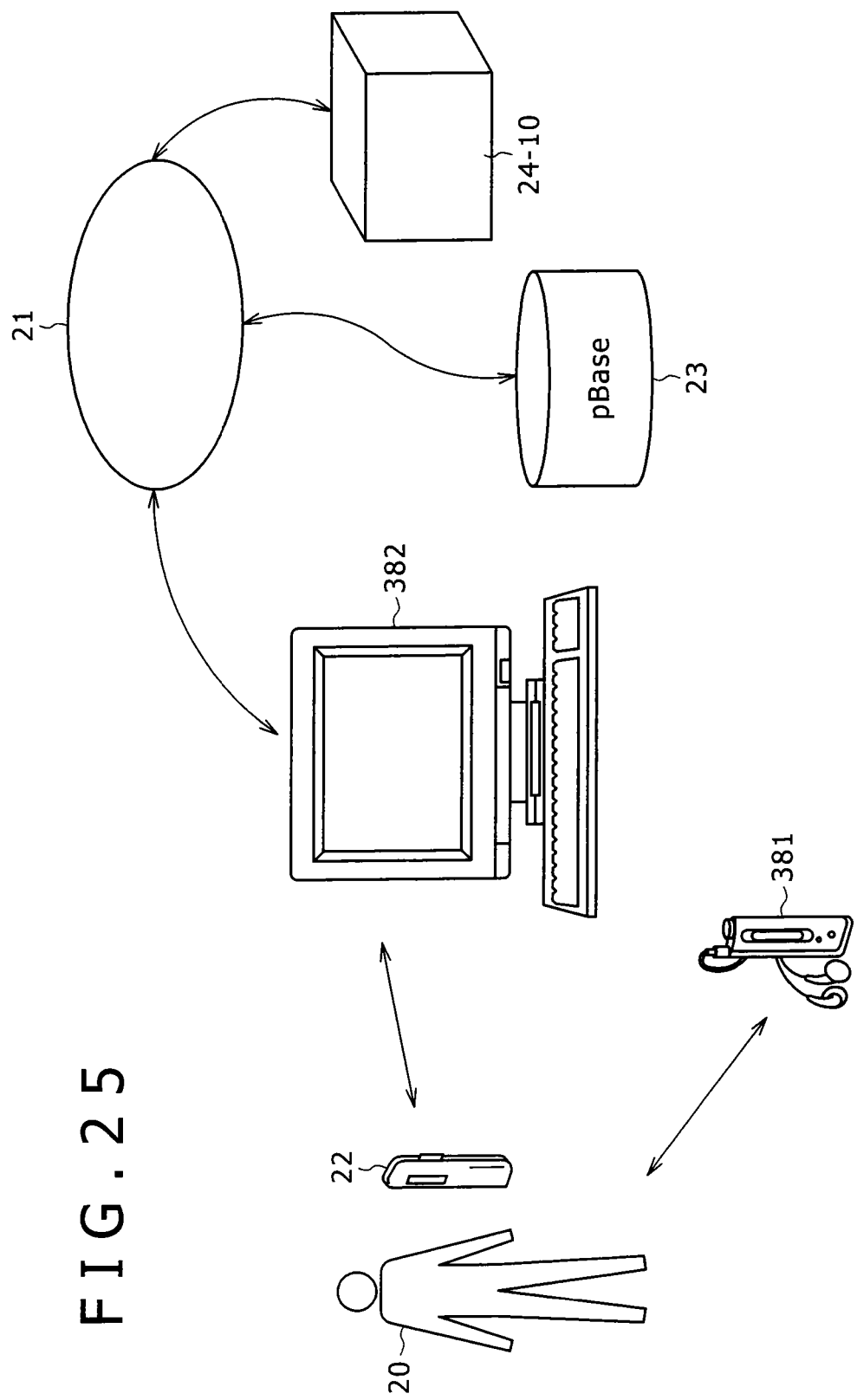
FIG. 25 is a diagram showing an example of personalizing various devices by the PK.

An example in which PMD is used to reflect one's preference information in an information device (the reflection will hereinafter be referred to as personalization) will next be described with reference to FIGS. 25 to 27. In FIG. 25, the user 20 of the PK 22 uses a music reproducing device 381 that reproduces music on the basis of predetermined music data, and a personal computer 382 that is connected to the Internet 21 for Web browsing and the like.

The user 20 can make the music reproducing device reproduce favorite music of the user using the PMD of the PK 22. In this case, the PK 22 communicates with the music reproducing device 381 by wireless communication or the like without the intervening Internet 21 with the music reproducing device 381 as one service system. At this time, a process as represented in FIG. 6 or FIG. 7 is performed between the PK 22 and the music reproducing device 381. At this time, for example, a request to read PMD of music preference information is transmitted from the music reproducing device 381 to the PK 22 in step S409 in FIG. 7. In step S504, the PMD of music preference information is transmitted from the PK 22 to the music reproducing device 381. Then, when the music reproducing device 381 obtains the PMD from the PK 22 in step S410, a process of reproducing favorite music of the user is performed as a service corresponding process in step S411. The music reproduction process of the music reproducing device 381 in this case will be described with reference to FIG. 26.

In step S1921, the music reproducing device 381 obtains PMD from the PK 22. In step S1922, the music reproducing device 381 analyzes preference information in the PMD obtained in step S1921. In step S1923, the music reproducing device 381 reproduces music corresponding to the preference information.

By thus transmitting the PMD including the preference information to the music reproducing device 381, the favorite music can be reproduced. Since the PMD is stored in the PK 22 and can thus be carried to various places, a music reproducing device on the spot can be personalized into a music reproducing device reproducing one's favorite music.

The user 20 in FIG. 25 can also make the personal computer 382 display a favorite Web page of the user using the PMD of the pBase 23. In this case, the PK 22 communicates with a service system 24-10 via the Internet 21. At this time, a process as represented in FIG. 6 or FIG. 7 is performed between the PK 22 and the service system 24-10. Then, the service system 24-10 identifies the pBase 23 storing the PMD of the user 20 on the basis of the user ID of the PK 22, and obtains the PMD of the user 20 from the pBase 23. At this time, a process as shown in FIG. 18 or FIG. 19 is performed between the service system 24-10 and the pBase 23. For example, in step S1869 in FIG. 19, a request to read PMD of Web preference information is transmitted from the service system 24-10 to the pBase 23. In step S1891, the PMD of Web preference information is transmitted from the pBase 23 to the service system 24-10.

When the service system 24-10 obtains the PMD from the pBase 23 in step S1870, the service system 24-10 performs a process of providing Web service suiting the taste of the user to the personal computer 382 as the service corresponding process in step S1871. The Web information providing process of the service system 24-10 in this case will be described with reference to FIG. 27.

In step S1941, the service system 24-10 obtains the user ID of the PK 22. In step S1942, the service system 24-10 obtains PMD corresponding to the user ID obtained in step S1941 from the pBase 23. In step S1943, the service system 24-10 analyzes the preference information of the PMD obtained in step S1942. In step S1944, the service system 24-10 provides Web service corresponding to the preference information.

Alternatively, a cookie as a text file created in the personal computer 382 of the user by the service system 24-10 may be stored as PMD in the PK 22 or the pBase 23, and the cookie may be transmitted to the personal computer 382 each time Web browsing is performed.

The Web service is thus provided. PMD that cannot be stored because of a high volume of the PMD, for example, is stored in the pBase 23, and an information device such as a personal computer or the like can be personalized on the basis of the PMD of the pBase 23. As a result, personalization that reflects the preference of the user more accurately can be performed.

Figure 28:
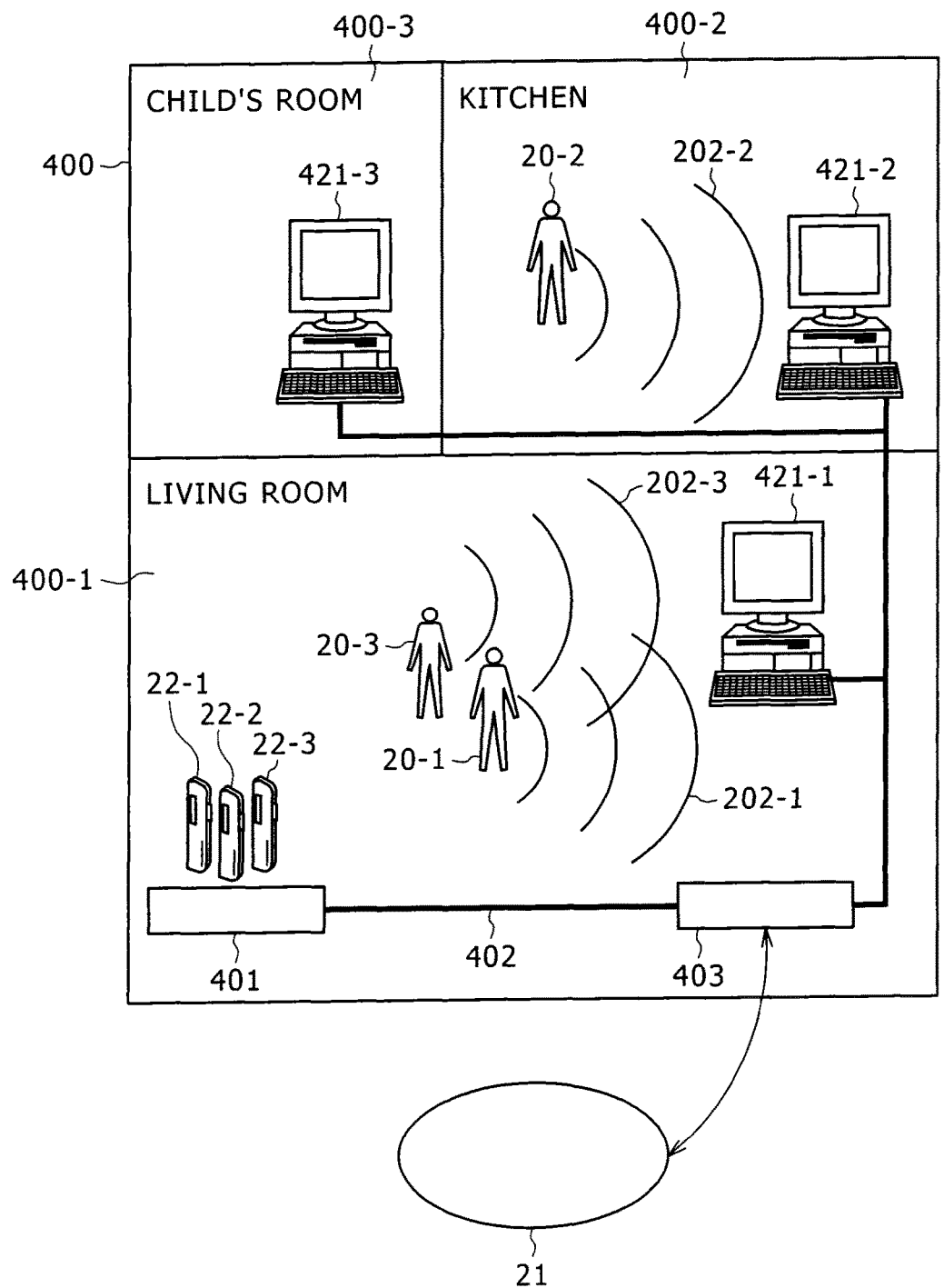
FIG. 28 is a diagram showing an example of personalizing various devices by the PK.

Another example of personalizing an information device using PMD will next be described with reference to FIG. 28. In the same figure, three users 20-1 to 20-3 live in a house 400. The users 20-1 to 20-3 own PKs 22-1 to 22-3, respectively. There are three rooms in the house 400: a living room 400-1; a kitchen 400-2; and a child's room 400-3. Contents boxes 421-1 to 421-3 that obtain data (contents) such as various images or music and store or reproduce the contents are installed in the respective rooms.

The contents boxes 421-1 to 421-3 are connected to a router 403 via a LAN 402. The contents boxes 421-1 to 421-3 communicate with various servers connected to the Internet 21 via the router 403 to obtain various contents.

The contents boxes 421-1 to 421-3 have a sensor for detecting a walk pattern. When a user passes by the sensor, the sensor detects the walk pattern to identify the user. The router 403 has a firewall function for preventing unauthorized access from the Internet 21, and a storage unit for storing a predetermined volume of data. The LAN 402 is connected with a cradle 401 on which PKs are mounted to be charged. The cradle 401 transmits information of the mounted PKs to the router 403.

The users 20-1 to 20-3 carry the PKs 22-1 to 22-3 while the users 20-1 to 20-3 are out, and mount their own PKs on the cradle 401 when returning to the house 400. When the PKs 22-1 to 22-3 are mounted on the cradle 401, the cradle 401 transmits the PMD of the PKs 22-1 to 22-3 to the router 403. The router 403 communicates with the Pbse 23 via the Internet 21 to obtain the PMD of the users 20-1 to 20-3 from the Pbse 23 and store the PMD of the users 20-1 to 20-3 in the storage unit. Incidentally, suppose that preference information and walk pattern information on the preferences and the walk patterns of the users 20-1 to 20-3 are stored in the PMD of the users 20-1 to 20-3.

The contents boxes 421-1 to 421-3 obtain walk pattern information on the walk patterns of the users 20-1 to 20-3 from the router 403, and reproduce contents suiting the taste of a nearby user. When the user 20-2 is in the kitchen, for example, the contents box 421-2, which detects the walk pattern 202-2 of the user 20-2, obtains the PMD of the user 20-2 from the router 403, analyzes the preference information, and reproduces music or the like corresponding to the preference information among contents stored in the contents box 421-2.

When the users 20-1 and 20-3 are in the living room 400-1, the contents box 421-1 detects the walk patterns 202-1 and 202-3 of the users 20-1 and 20-3, obtains the PMD of the user 20-1 and the PMD of the user 20-3 from the router 403, analyzes the preference information of the PMD of the user 20-1 and the PMD of the user 20-3, and for example reproduces music suiting the taste of the user 20-1 and reproduces video suiting the taste of the user 20-3 among contents stored in the contents box 421-1. Thus, the contents boxes 421-1 to 421-3 in the house 400 can be personalized in such a manner as to correspond to a nearby user.

While in this example, description has been made of an example where the contents boxes 421-1 to 421-3 are personalized, various CE devices and the like can be personalized by a similar method, and the user can personalize a desired device by using the PK.

Figure 29:
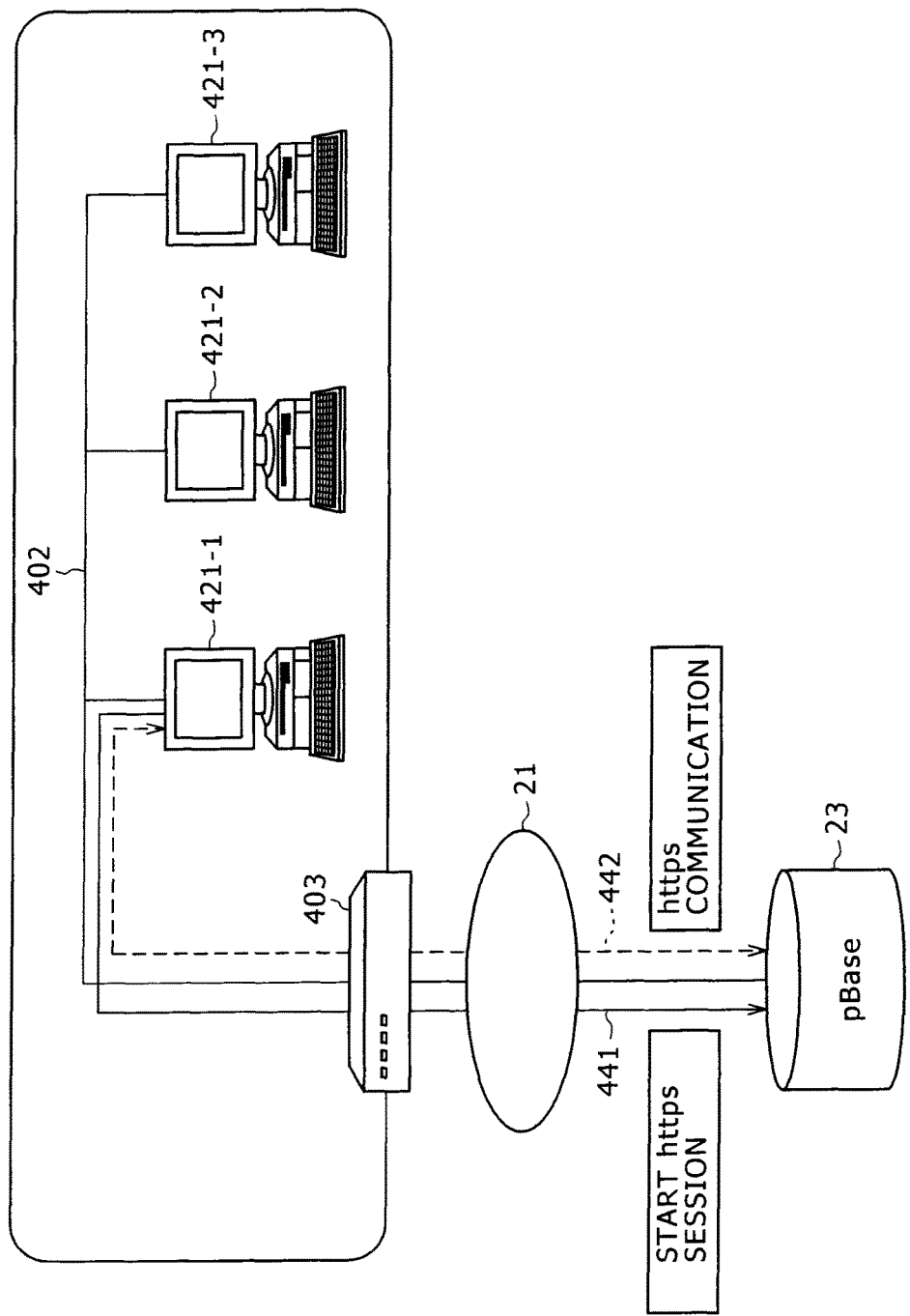
FIG. 29 is a diagram showing an example of communication performed via a router having a firewall function.

Since the router 403 has a firewall function as described above, communication between a device connected to the LAN 402 and a device connected to the Internet 21, for example, is limited (for example, a protocol (port number) usable in communication between a contents box and the pBase is limited). Thus, communication between a device connected to the LAN 402 and the Internet 21 is performed as shown in FIG. 29. First, a session is started using an https (SSL) protocol as indicated by an arrow 441 from the contents box 421-1 to the pBase 23. After the session is established, the contents box 421-1 and the pBase 23 perform communication using the https protocol as indicated by a dotted line 442.

In addition, as described above with reference to FIG. 17A, PMD synchronization is performed between the PKs 22-1 to 22-3 and the pBase 23. In the example of FIG. 28, PMD synchronization is performed via the cradle 402 and the contents boxes 421-1 to 421-3. A flow of a process when PMD synchronization is performed between the PK 22-1, the cradle 401, the pBase 23, and the contents box 421-1 will be described with reference to FIG. 30.

In step S2001, when the PK 22-1 is mounted on the cradle 401, the PK 22-1 transmits the PMD contents of the PK 22-1 itself to the cradle 401. This is received in step S2021. In step S2022, the cradle 401 transmits the information received in step S2021 to the pBase 23. This is received in step S2041. In step S2042, the pBase 23 performs a PMD synchronizing process to be described later with reference to FIG. 31. Thereby, PMD stored in the pBase 23 is updated, and synchronizing data for updating the PMD of the PK 22-1 is generated.

In step S2043, the pBase 23 transmits the synchronizing data to the cradle 401. This is received in step S2023. In step S2024, the cradle 401 transmits the information received in step S2023 to the PK 22-1. This is received in step S2002. Then, in step S2003, the PK 22-1 updates the PMD of the PK 22-1 on the basis of the synchronizing data received in step S2002, whereby the PMD of the PK 22-1 is synchronized with the PMD of the pBase 23.

When the contents box 421-1 reproduces contents, the contents box 421-1 in step S2061 transmits history information such as a history of contents viewing or the like to the pBase 23. This is received in step S2044. The pBase 23 updates the preference information of the PMD on the basis of the history information. In step S2045, the pBase 23 transmits a result of updating the PMD as synchronizing data to the cradle 401. This is received in step S2025. In step S2026, the cradle 401 transmits the information received in step S2025 to the PK 22-1. This is received in step S2003. In step S2005, the PMD of the PK 22-1 is updated.

PMD synchronization is thus performed.

Details of the PMD synchronizing process in step S2042 in FIG. 30 will next be described with reference to FIG. 31.

Figure 30:
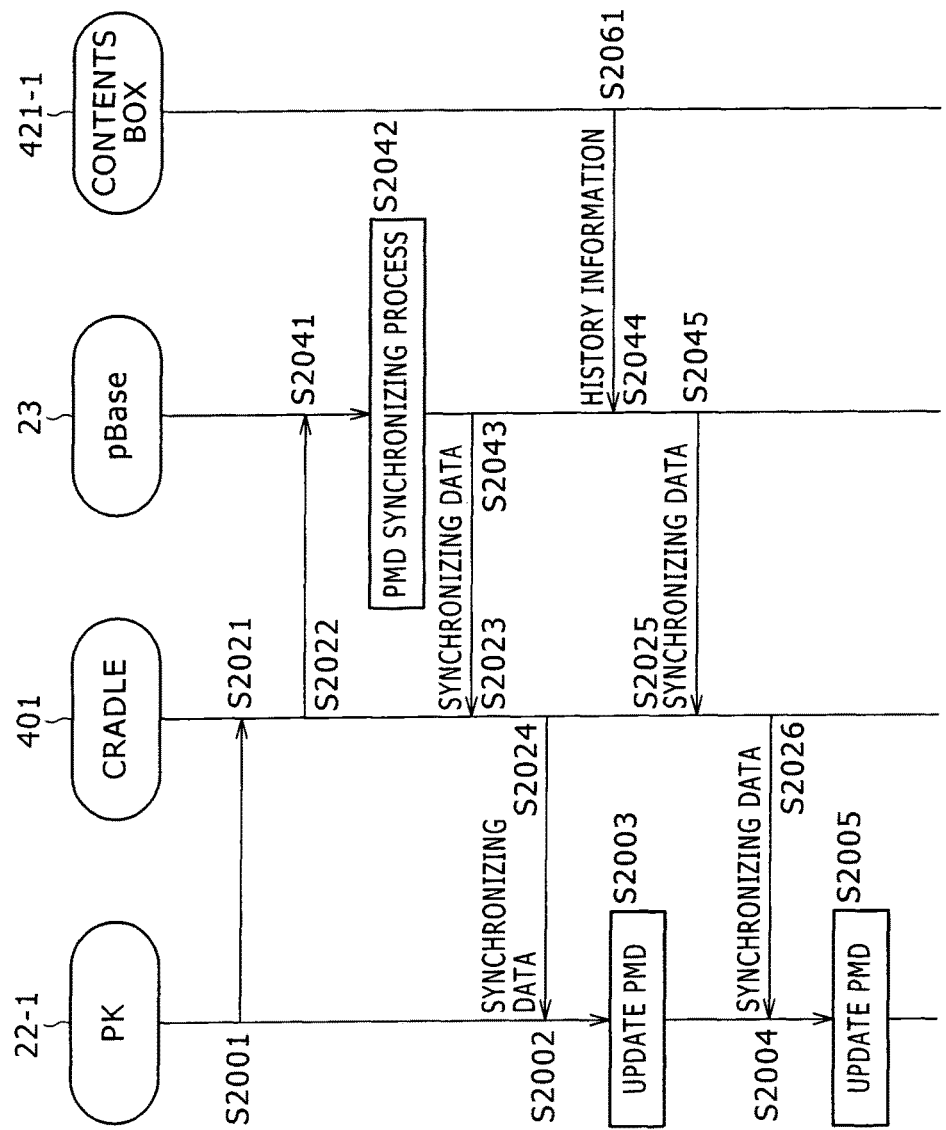
FIG. 30 is an arrow chart showing a flow of a process of PMD synchronization.
Figure 31:
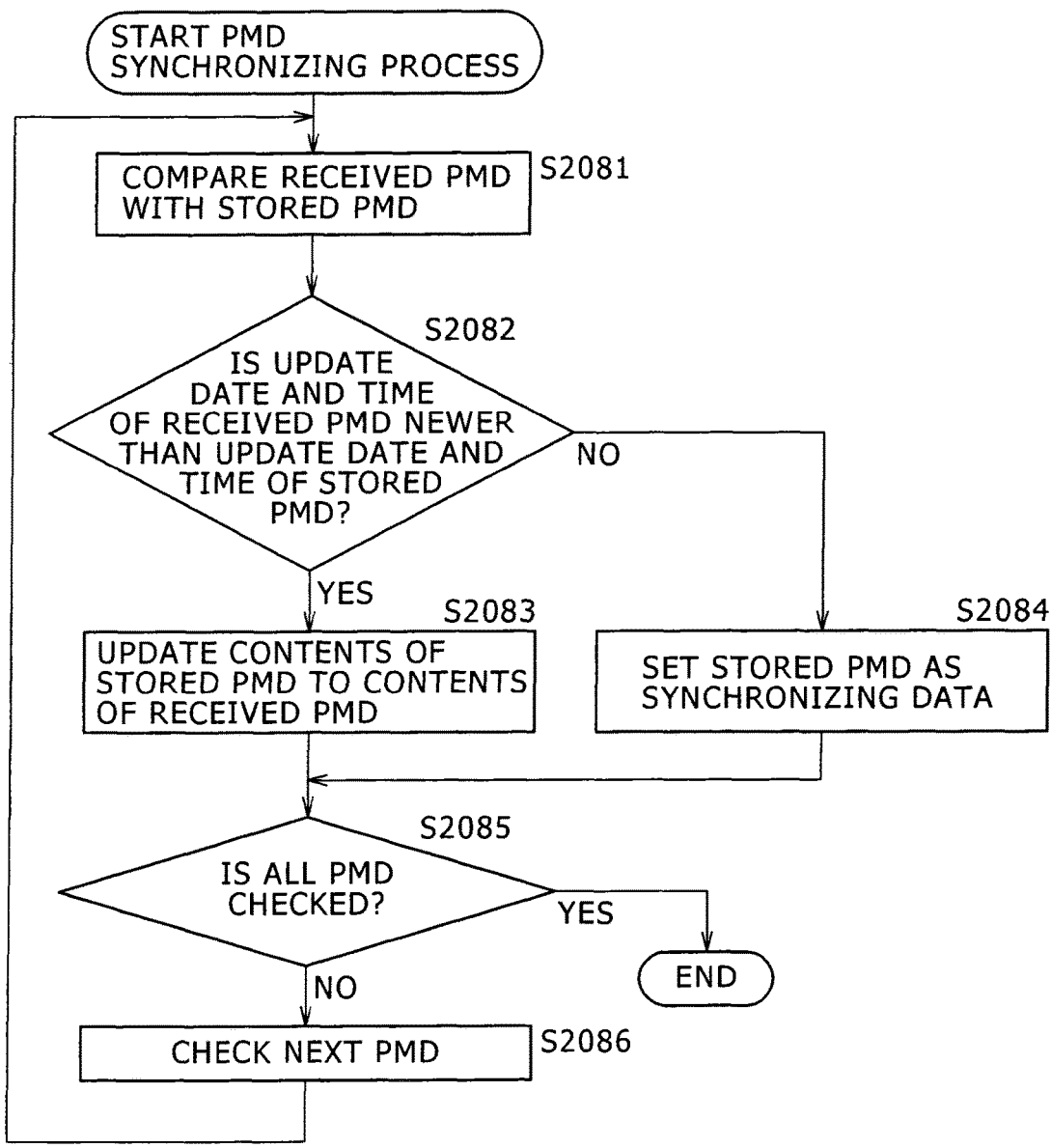
FIG. 31 is a flowchart of assistance in explaining a PMD synchronization process.

In step S2081, the CPU 121 compares the contents of the PMD received in step S2041 in FIG. 30 with the contents of the PMD stored in the pBase 23. At this time, one piece of PMD corresponding to the received PMD is extracted at a time from among the PMD stored in the pBase 23 to be compared, and update date and time information indicating a date and time when the PMD was last updated is compared.

In step S2082, the CPU 121 determines whether the update date and time of the PMD received in step S2041 is newer than the update date and time of the PMD stored in the pBase 23. When the CPU 121 determines that the update date and time of the received PMD is newer than the update date and time of the PMD stored in the pBase 23, the CPU 121 proceeds to step S2083 to update the contents of the PMD stored in the pBase 23 to the contents of the received PMD.

On the other hand, when the CPU 121 determines in step S2082 that the update date and time of the PMD received in step S2041 is not newer than the update date and time of the PMD stored in the pBase 23, the CPU 121 proceeds to step S2084 to set the contents of the PMD stored in the pBase 23 as synchronizing data. This synchronizing data is transmitted to the PK 22-1 in step S2043 (FIG. 30) after the end of the PMD synchronizing process. The PK 22-1 updates the PMD on the basis of the synchronizing data.

After the process in step S2083 or S2084, the CPU 121 determines in step S2085 whether all the PMD is checked. When the CPU 121 determines that all the PMD is not checked yet, the CPU 121 proceeds to step S2086 to check next PMD. Thereafter the process returns to step S2081 to repeat the process from step S2081 on down.

When the CPU 121 determines in step S2085 that all the PMD is checked, the process is ended.

PMD synchronization is thus performed in the pBase 23.

Figure 32:
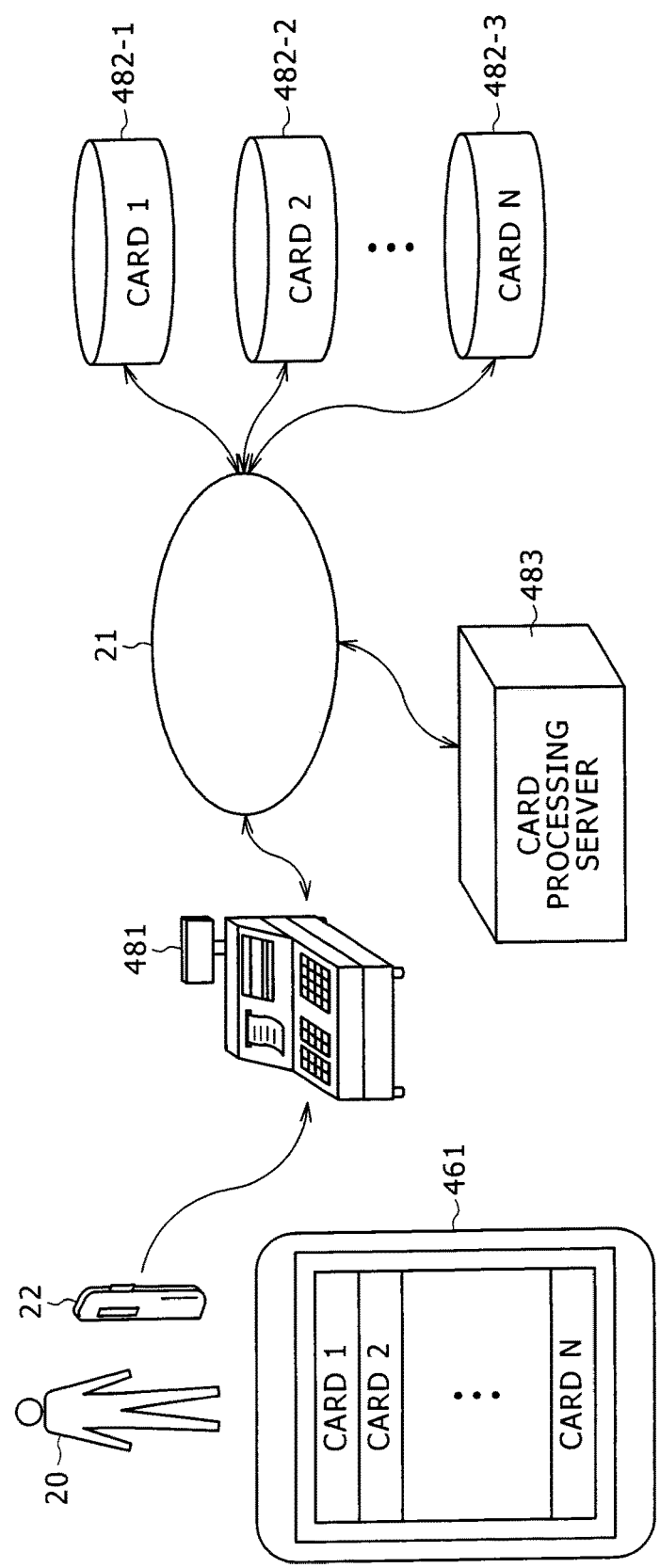
FIG. 32 is a diagram showing an example of retaining various card information in the PK and using the information.

An example of storing information of various cards in the PK and using the information will next be described with reference to FIG. 32. Suppose in this example that PMD 461 having card information is stored in the PK 22. When the user 20 makes a purchase, for example, the PK 22 communicates with a cash register 481 by wireless communication or the like, so that the information of the PMD 461 is obtained by the cash register 481. The PMD 461 includes card information describing the card numbers of cards 1 to N such as credit cards and the like retained by the user 20. At this time, a process as represented in FIG. 6 or FIG. 7 is performed between the PK 22 and the cash register 481 with the cash register 481 as a service system. Then, the cash register 481 communicates with a card processing server 483 performing the payment of shopping bills and the like via the Internet 21, and thereby the bill is paid.

For example, information such as a remaining amount of a prepaid card, a history of card use or the like is stored in the databases 482-1 to 482-N of other servers connected to the card processing server 483 via the Internet 21. After paying the bill, the card processing server 483 updates the contents of the databases 482-1 to 482-N.

Thus, with the PK 22 as a virtual card case, various cards can be put in the card case together, and the cards can be extracted and used as necessary. In addition, the PK 22 may be provided with a card reader function so that card information is read and the contents are transmitted to the cash register 481 in the vicinity of the PK 22.

An example of controlling devices in the vicinity of the user using the PK will next be described with reference to FIG. 33. In the same figure, the user 20, carrying both the PK 22 and a console terminal 521 having a display 521 with a touch pad, enters a conference room in which a projector 503 is installed. An access point 25 is installed in the conference room. The access point 25 is connected to the Internet 21. The Internet 21 is connected with an environment server 501 retaining control information for controlling a device such as the projector 503 or the like present in the vicinity of the access point 25. The user 20 obtains control code for controlling the projector 503 by using the PK 22, and controls the projector 503 by operating the console terminal 521.

Figure 34:
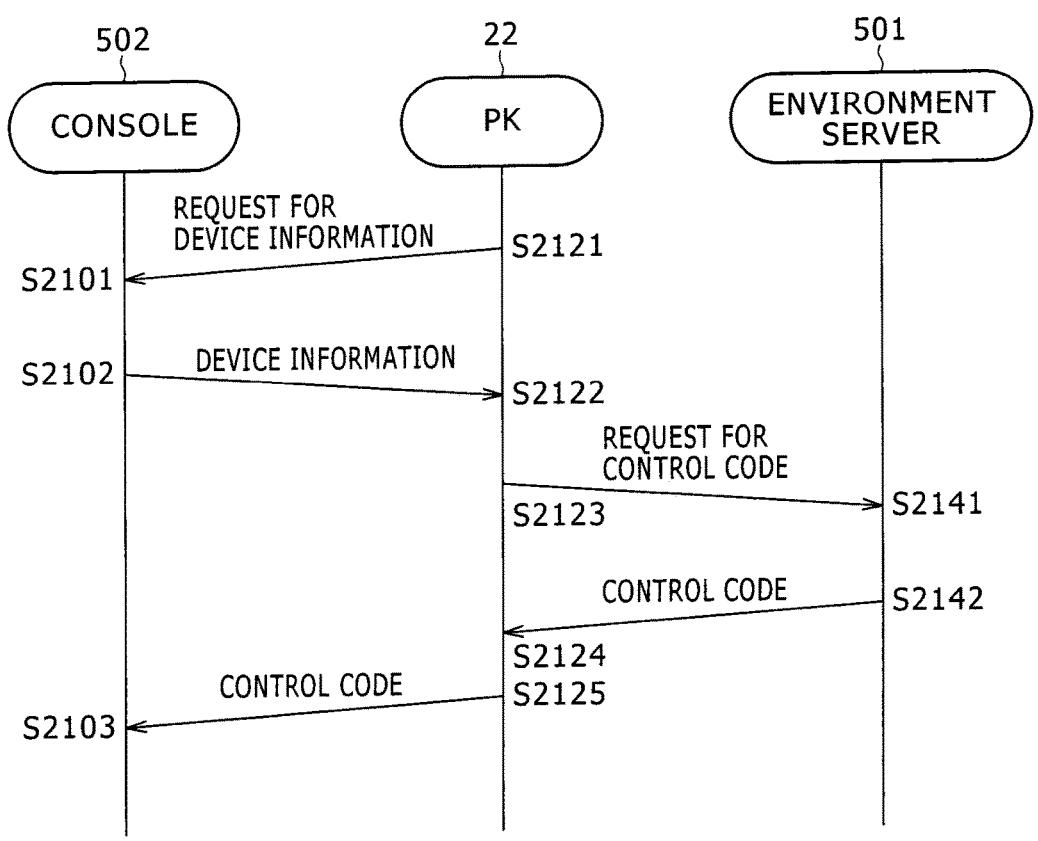
FIG. 34 is an arrow chart showing a flow of a process of obtaining the control code.

A flow of a process of obtaining the control code of the projector 503 from the environment server at this time will be described with reference to FIG. 34. In step S2121, the PK 22 communicates with the console terminal 502 by wireless communication or the like to transmit a request for device information to the console terminal 502. This is received in step S2101. In step S2102, the console terminal 502 transmits the device information of the console terminal 502 itself to the PK 22. This is received in step S2122.

When the user enters the conference room, the PK 22 communicates with the access point 25 by a wireless communication or the like, and communicates with the environment server 501 via the access point 25. At this time, a process as represented in FIG. 6 or FIG. 7 is performed between the PK 22 and the environment server 501 with the environment server 501 as a service system. Then, in step S2123, the PK 22 transmits a request to obtain the control code to the environment server 501 with the device information of the console terminal 502 as one piece of PMD. This is received in step S2141. In step S2142, the environment server 501 adds the control code of the projector 503 which code is to be installed in the console terminal 502 to the PMD, and transmits the PMD to the PK 22. This is received in step S2124.

Thereafter, a process as represented in FIG. 6 or FIG. 7 is performed between the PK 22 and the console terminal 502 with the console terminal 502 as a service system. Then, in step S2125, the PK 22 transmits the PMD received in step S2124 to the console terminal 502. This is received in step S2103. The control code of the projector 503 is installed in the console terminal 502. The user 20 controls the projector 503 by operating the display 521 with the touch pad.

Thus, using the PK, a device in the vicinity of the user is controlled. By thus selecting and transmitting proper control code or data or the like corresponding to a device in the vicinity, various devices can be controlled properly.

Figure 35:
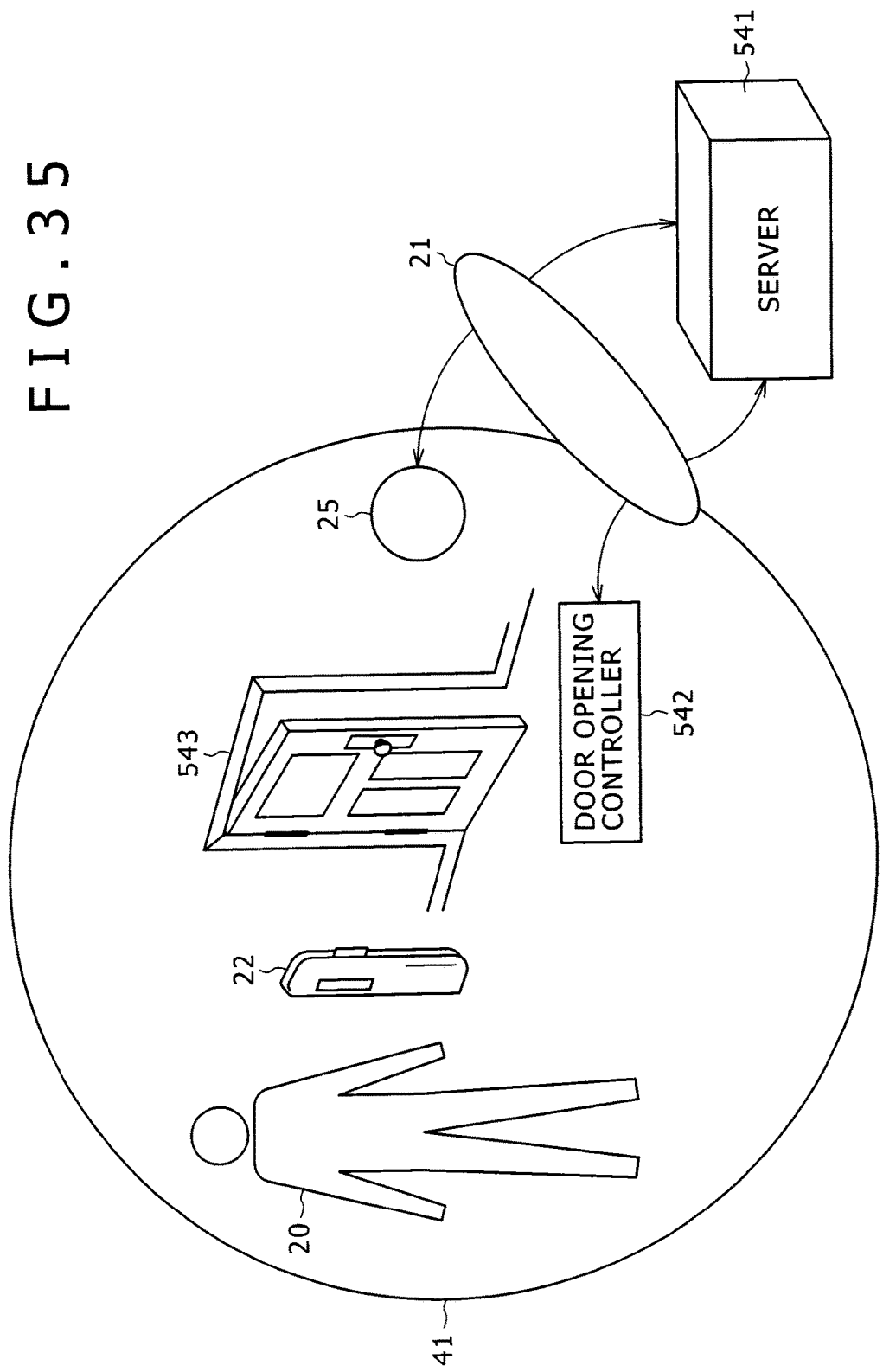
FIG. 35 is a diagram showing an example of opening a door by the PK.

As another example of controlling a device in the vicinity of the user using the PK, it is possible to open and close a door as shown in FIG. 35. In this example, there are a door 543 and a door opening controller 542 opening the door 543 by unlocking the door 543 in the vicinity of an access point 25. The door opening controller 542 is connected to a server 541 storing the control code of the door opening controller 542 via the Internet 21.

When the user 20 enters an area 41 in which communication with the access point 25 is possible, a process as represented in FIG. 6 or FIG. 7 is performed with the server 541 as a service system. The PK 22 carried by the user 20 communicates with the server 541 connected to the Internet 21 via the access point 25. The server 541 controls the door opening controller 542 so as to make the door opening controller 542 open the door 543.

In this case, for example, information such as an ID or the like for identifying the door 543 in the vicinity of the user 20 (PK 22) is transmitted as PMD to the server 541. The server 541 identifies the door 543 on the basis of the received PMD, and transmits a control code for making the door opening controller 542 open the door 543 to the door opening controller 542.

Thus, the door 543 can be automatically opened when the user 20 approaches the access point 25 near the door 543. In addition, since the spoofing preventing process as represented in FIG. 6 or FIG. 7 is performed between the PK 22 and the server 541, the door 543 is prevented from being opened for an unauthorized intruder or the like.

Figure 36:
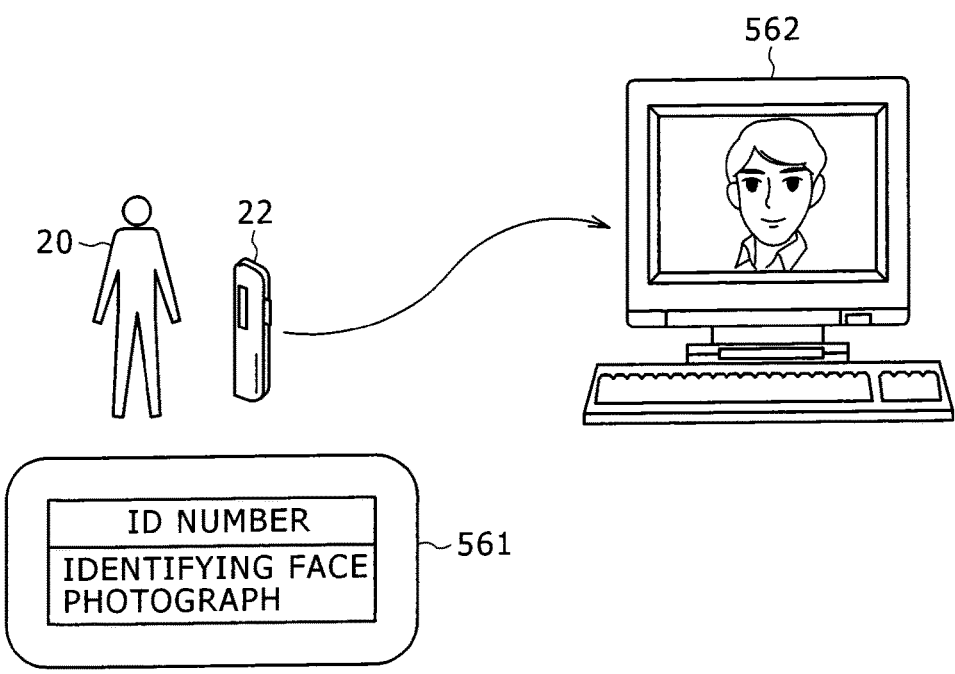
FIG. 36 is a diagram showing an example in which facial characteristics information in the PK is displayed on a terminal.

In addition, when there is a room for a guard or the like in the vicinity of the door 543, and the guard is keeping watch so as to prevent an unauthorized intruder from entering from the door 543, for example, security can be further enhanced by transmitting PMD including an ID number and face photograph data to a personal computer 562 in the room of the guard, and displaying a face photograph corresponding to the PMD on the personal computer 562, as shown in FIG. 36, for example. Thus, the face photograph corresponding to the PMD of the PK 22 (user 20) is displayed on the personal computer 562. Therefore, even when an unauthorized intruder attempts to intrude from the door 543 using a stolen PK 22, for example, the intruder cannot intrude from the door 543 because the guard can tell that the intruder is not the person whose face photograph is displayed (the intruder is not the user 20).

An example of making a conversation using the PK and a peripheral device will next be described with reference to FIG. 37. Suppose in this example that a user 20-2 desires a conversation with a user 20-1 having a PK 22-1. Suppose that the PK 22-1 communicates with the pBase 23 at predetermined time intervals, and that a PMD synchronizing process is performed as described with reference to FIG. 31.

An access point 25, a telephone 581, and a camera 582 and a display 583 used for videoconferencing are present around the user 20-1. An environment server 584 storing control codes for the telephone 581 to the display 583 is connected to the Internet 21. Further, the Internet 21 is connected with the pBase 23 and a conversation connecting server 601 providing conversion connecting service. The conversation connecting server 601 receives a request for conversation connection to a specific person at the other end (for example the user 20-1) from a user (for example the user 20-2), and provides for a conversation using a peripheral device of the person at the other end.

Figure 38:
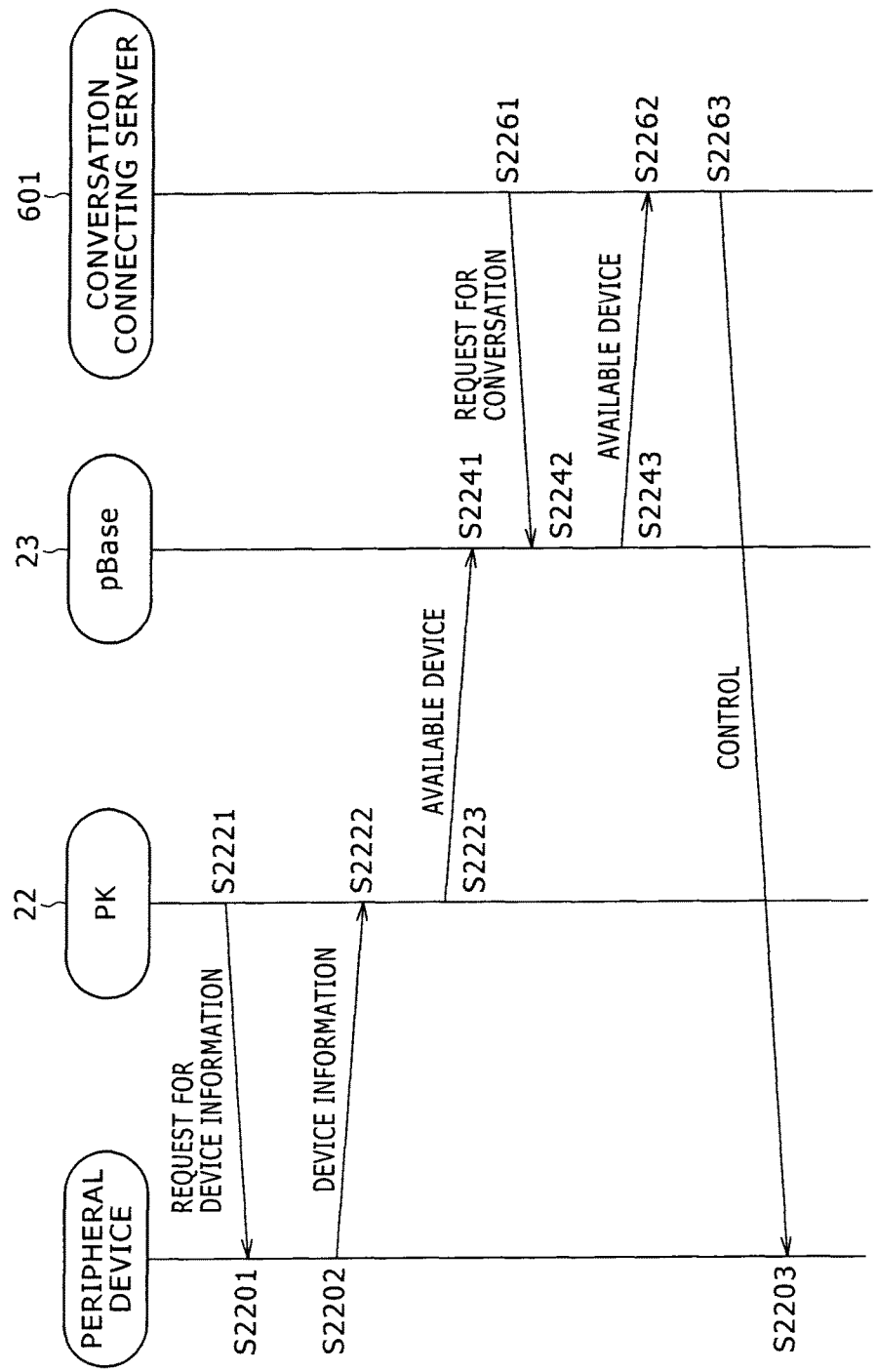
FIG. 38 is an arrow chart showing a flow of a process for making a conversation connection.

A flow of a process for making a conversation connection in this case will be described with reference to FIG. 38. The PK 22-1 performs a process as shown in FIG. 6 or FIG. 7 with a peripheral device such as the camera 582 to the display 583 as a service system to communicate with the peripheral device. In step S2221, the PK 22-1 transmits a request for device information to the peripheral device. This is received in step S2201. In step S2202, the peripheral device such as the camera 582 to the display 583 transmits the device information such as an ID, an address or the like of the peripheral device itself as PMD to the PK 22-1. This is received in step S2222. The received PMD is transmitted as PMD indicating devices available to the user 20-1 to the pBase 23 in step S2223. This is received in step S2241 (PMD synchronization is performed between the PK 22-1 and the pBase 23).

Receiving a request for conversation connection to the user 20-1 from the user 20-2, the conversation connecting server 601 in step S2261 transmits a conversation request to the pBase 23 retaining PMD corresponding to the user 20-1. This is received in step S2242. At this time, a process as represented in FIG. 6 or FIG. 7 is performed and communication is performed between the conversation connecting server 601 and the pBase 23 with the conversation connecting server 601 as a service system and with the pBase 23 in place of (acting for) the PK 22-1. Then, in step S2243, the pBase 23 transmits the PMD indicating devices available to the user 20-1 to the conversation connecting server 601.

In step S2263, the conversation connecting server 601 controls the peripheral device via the environment server 584 so that a conversation using the telephone 581 or videoconferencing using the camera 582 and the display 583 is performed between the user 20-1 and the user 20-2. Thus, using the PK, a conversation using the peripheral device is performed. Thus, even when the user 20-1 goes to another place, a conversation can be performed on the basis of the PMD indicating devices available to the user 20-1. In addition, since PMD synchronization is performed between the PK 22-1 and the pBase 23 at predetermined time intervals (for example intervals of 30 minutes), the user can have a conversation using a peripheral device anytime and anywhere.

An example of determining the present location of the user using the PK will next be described with reference to FIG. 39. In this example, the user 20 is carrying the PK 22, and the PK 22 communicates with a nearby access point 25-1. Access points 25-1 to 25-n are connected to a space server 641. The space server 641 stores information such as the ID or the like of an access point with which the PK 22 is communicating. The space server 641 is connected to the Internet 21. The Internet 21 is connected with the pBase 23 and a location server 642 for determining the present location of the user.

Figure 40:
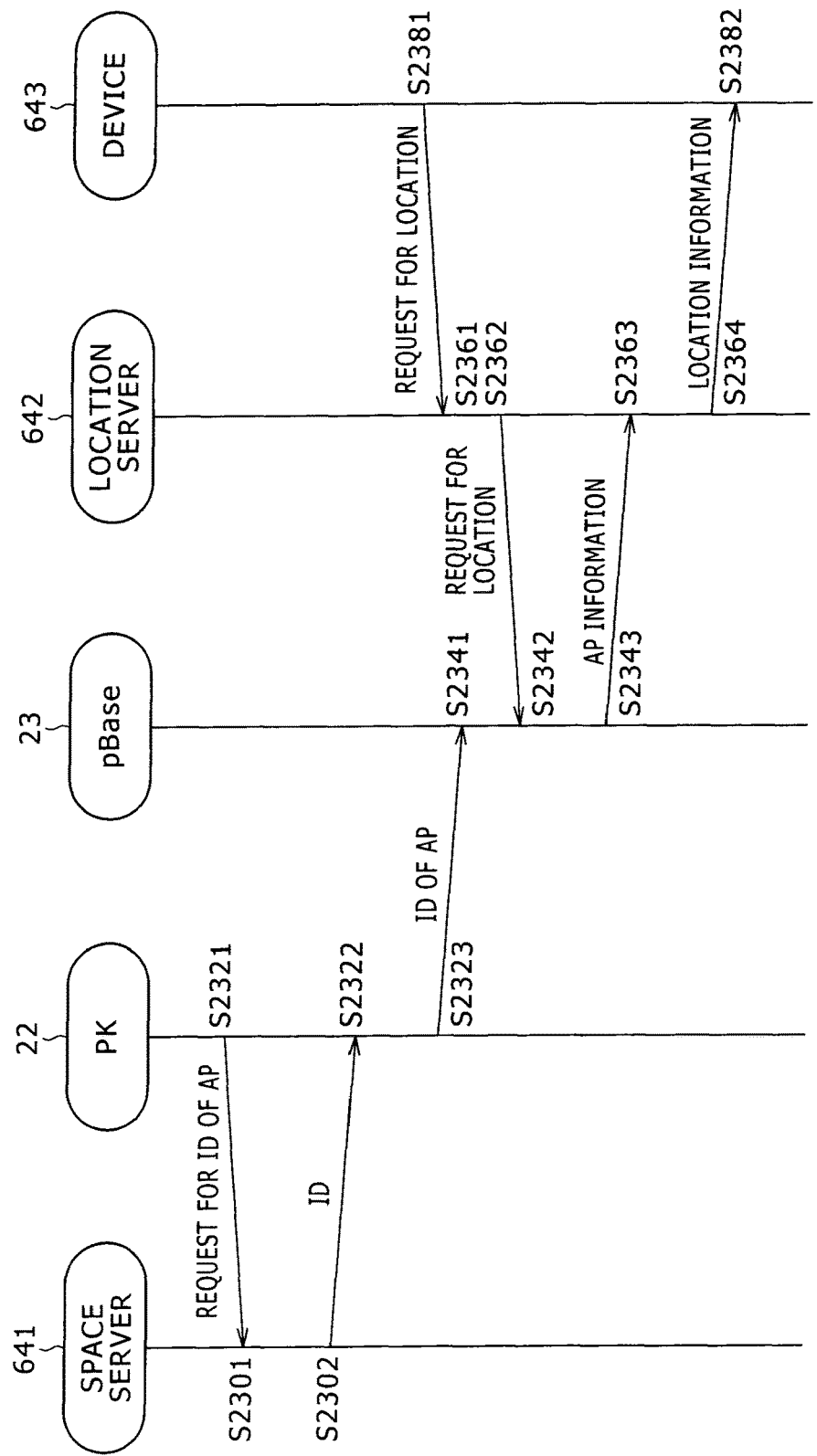
FIG. 40 is an arrow chart showing a flow of a process for determining the location of the user.

A flow of a process for determining the present location of the user using a device 643 connected to the Internet will be described with reference to FIG. 40.

The PK 22 performs a process as shown in FIG. 6 or FIG. 7 with the space server 641 as a service system to communicate with the space server 641. Then, in step S2321, the PK 22 requests the space server 641 to obtain the ID of an access point with which the PK 22 is communicating now. This is received in step S2301. In step S2302, the space server 641 transmits the ID of the access point 25-1 as PMD to the PK 22. This is received in step S2322. The received PMD is transmitted as PMD indicating the access point in the vicinity of the user 20 to the pBase 23 in step S2323. This is received in step S2341 (PMD synchronization is performed between the PK 22-1 and the pBase 23).

The device 643 transmits in step S2381 a request to obtain the present location of the user 20 to the location server 642. This is received in step S2361. In step S2362, the location server 642 transmits a request to obtain the present location of the user 20 to the pBase 23 retaining the PMD of the user 20. This is received in step S2342. At this time, a process as represented in FIG. 18 or FIG. 19 is performed and communication is performed between the location server 642 and the pBase 23 with the location server 642 as a service system and with the pBase 23 in place of (acting for) the PK 22. Then, in step S2343, the pBase 23 transmits the PMD indicating the access point in the vicinity of the user 20 to the location server 642. This is received in step S2363.

On the basis of the PMD received in step S2363, the location server 642 obtains information on the access point in the vicinity of the user 20 (the access point 25-1 in this case), and determines the location of the access point. Then, the location server 642 sets the vicinity of the access point 25-1 as the present location of the user 20. The location server 642 transmits the information of the present location to the device 643 in step S2382. This is received in step S2382.

Thus, using the PK, the present location of the user 20 is determined. Thus, even when the user 20 goes to another place (for example the vicinity of the access point 25-2), the present location can be determined accurately on the basis of PMD indicating an access point in the vicinity of the user 20.

Figure 41:
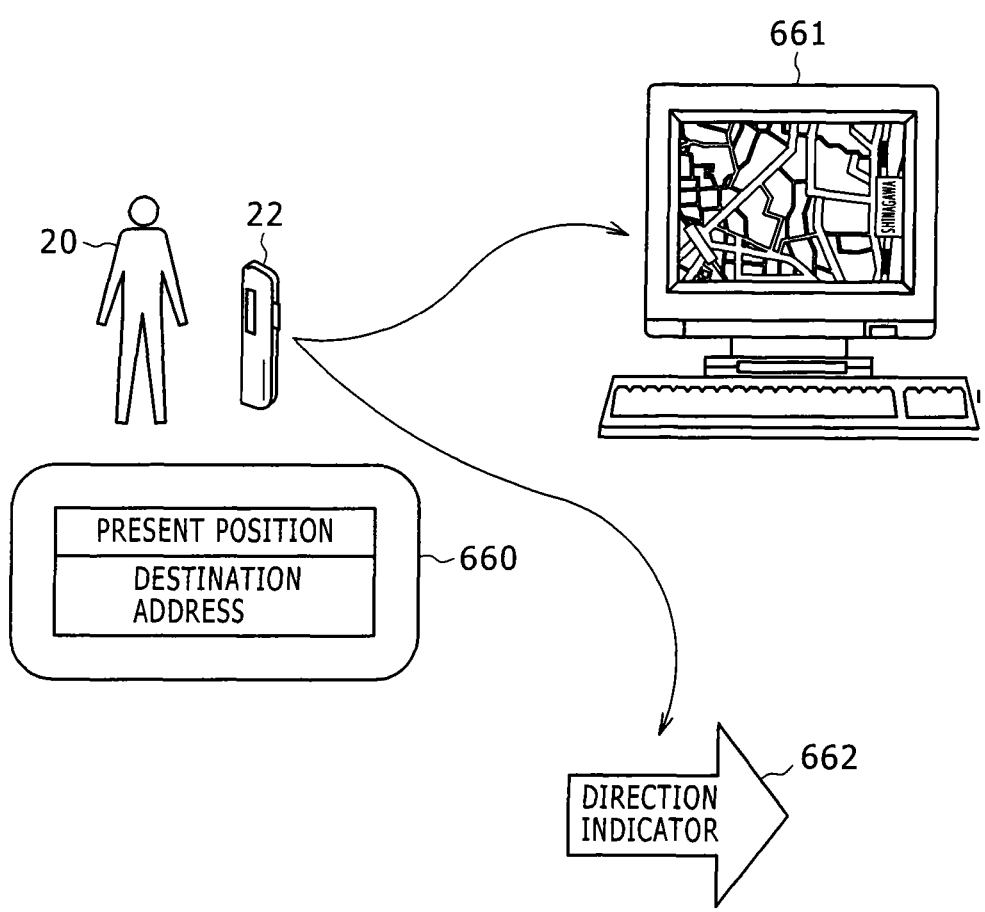
FIG. 41 is an example of providing map information service.

The PMD indicating an access point in the vicinity of the user 20 may be stored in the PK 22. For example, as shown in FIG. 41, when the user 20 is moving on a trip or the like, the user 20 carries the PK 22, and the PK 22 generates PMD 660 including the present location of the user (information on a nearby access point) and the address of a destination. While moving, the user 20 makes the PK 22 communicate with a terminal 661 providing map information to transmit the PMD 660 to the terminal 661. Thus, a map showing a route from the present location to the destination is displayed on the terminal 661, for example.

The PMD 660 may be transmitted to a direction indicator 662 to display a direction in which to proceed. By thus using the PMD 660, route guidance that is highly convenient to the user can be provided.

Alternatively, it is possible to transmit a message to the user on the basis of the thus determined present location of the user. For example, a mail server connected to the Internet 21 can receive information on the present location of the user from the space server 641, obtain information on a device available to the user by a method as represented in FIG. 37, and transmit an electronic mail. Thus, for example, when the user is at a head office, an electronic mail is transmitted to a personal computer at the head office. When the user is at a branch office on a business trip, an electronic mail is transmitted to a personal computer at the branch office. As a result, the user can surely receive a message for the user at any place where the user is located.

Figure 42:
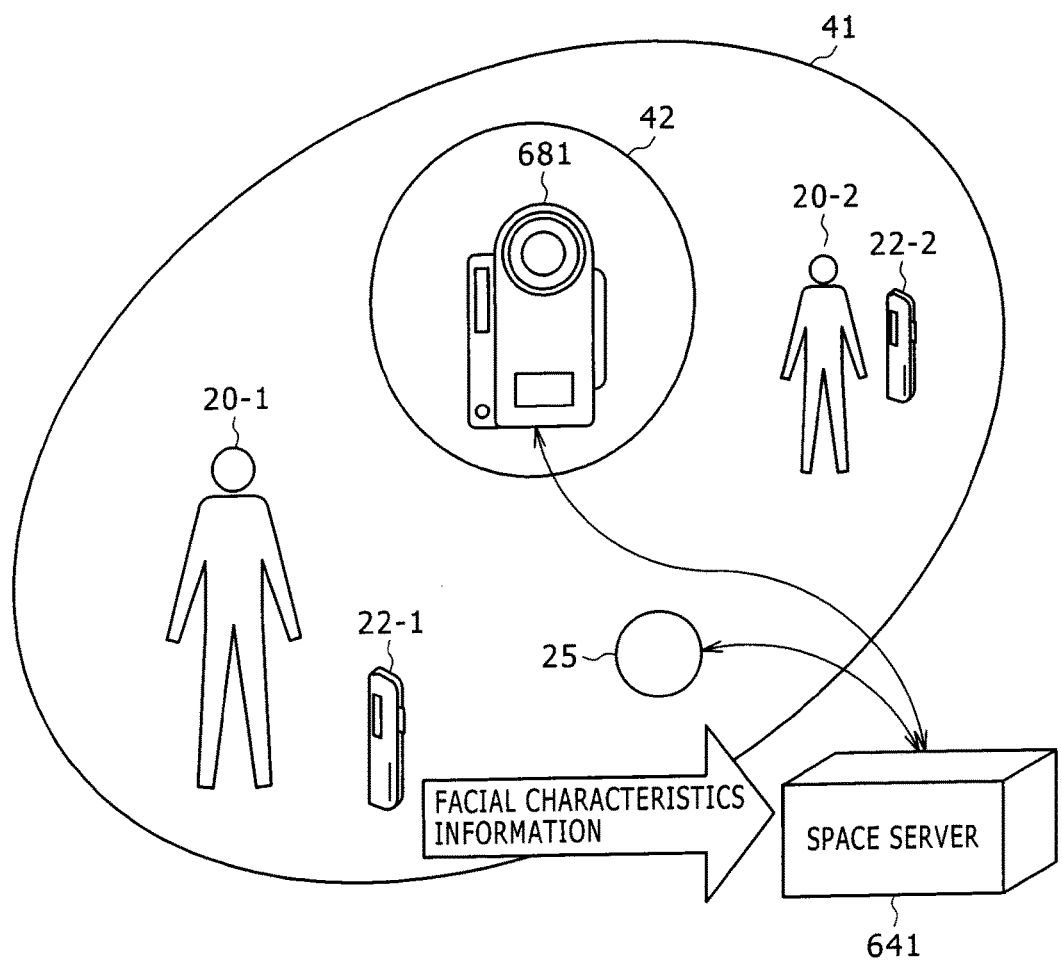
FIG. 42 is a diagram showing an example of determining the location of the user using a camera.

While the above description has been made of an example of determining the present location of the user from information on an access point near the user, the present location can be determined more accurately. For example, as shown in FIG. 42, when a user 20-1 carrying a PK 22-1 and a user 20-2 carrying a PK 22-2 are present in the vicinity of the access point 25, the PK 22-1 or 22-2 communicates with the space server 641 to transmit PMD including facial feature information of the user 20-1 or 20-2 to the space server 641.

Incidentally, suppose that the PK 22-1 or 22-2 can communicate with the access point 25 in an area 41.

A camera 681 is installed in the proximity of the access point 25. The camera 681 photographs an object in an area 42, and outputs image data. The space server 641 is connected to the camera 681. The space server 641 compares the image data output from the camera 681 with the facial characteristics information of the user 20-1 or 20-2. When an image matching the facial characteristics information is detected, the space server 641 determines that the user 20-1 or 20-2 is present in the vicinity of the access point 25. The space server 641 transmits the ID of the access point 25 to the PK 22-1 or 22-2.

Thus, the present location of the user 20-1 or 20-2 can be determined more accurately as the vicinity of the camera 681 (in the area 42) than as the vicinity of the access point (in the area 41).

Alternatively, the image data output from the camera 681 may be stored as PMD in the pBase 23, and provided as information on surroundings at the present location of the user to a service system as required. It is thus possible to provide an image of surroundings of the user while concealing the exact present location of the user.

When a plurality of access points are installed in relative proximity to each other, the PK 22 needs to select (detect) an access point with which to communicate.

Figure 43:
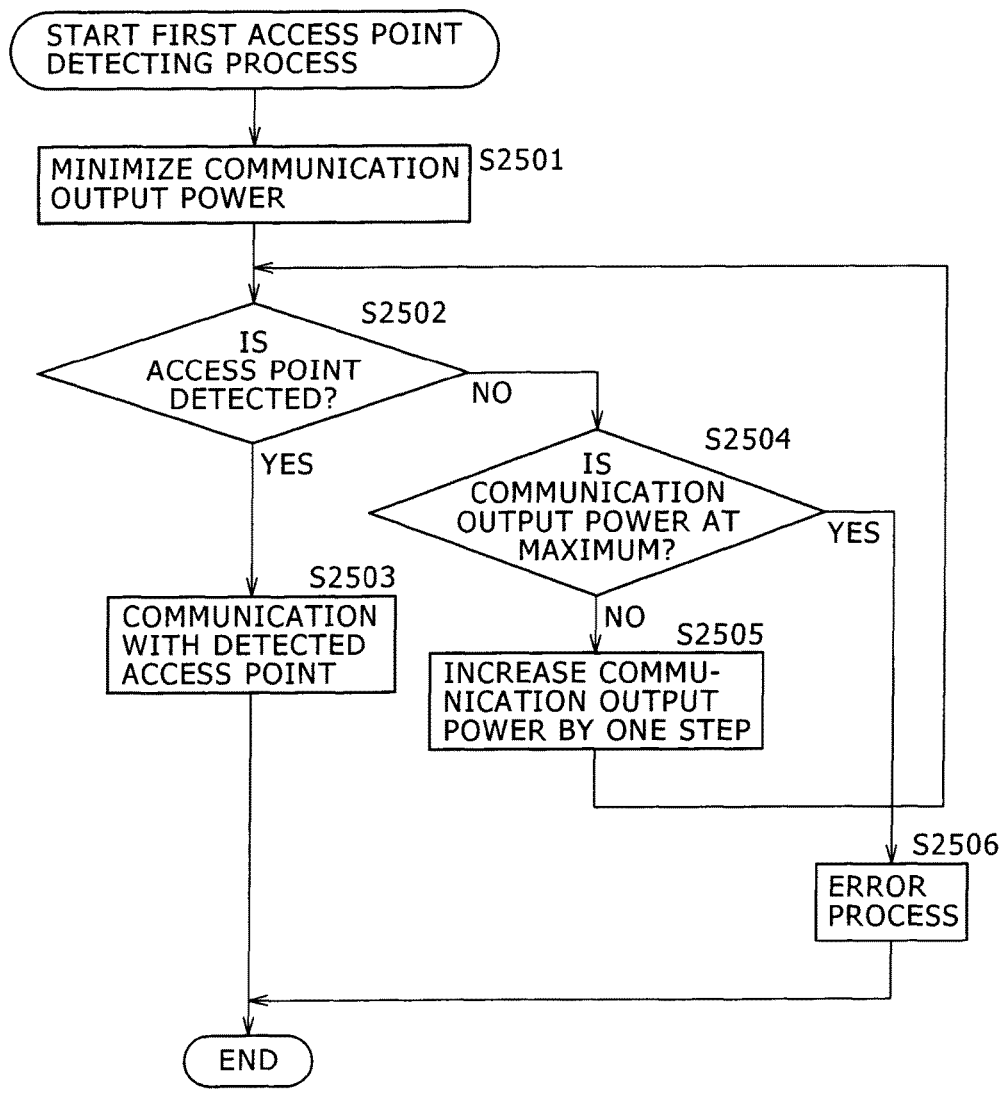
FIG. 43 is a flowchart of assistance in explaining a first access point detecting process.

A first access point detecting process as an example of detection of an access point by the PK 22 will be described with reference to FIG. 43. In step S2501, the PK 22 minimizes communication output power. As described above, the PK 22 communicates with an access point by wireless communication such as RF (Radio Frequency) communication, quasi-electrostatic field communication, optical communication or the like. In step S2501, the PK 22 sets the radio wave output of the PK 22 to a minimum, for example.

In step S2502, the PK 22 determines whether an access point is detected. When the PK 22 determines that no access point is detected, the PK 22 proceeds to step S2506 to determine whether the communication output power is at a maximum. When the PK 22 determines that the communication output power is not at the maximum yet, the PK 22 proceeds to step S2507 to increase the communication output power by one step. The process returns to step S2502 to repeat the process from step S2502 on down.

Figure 44:
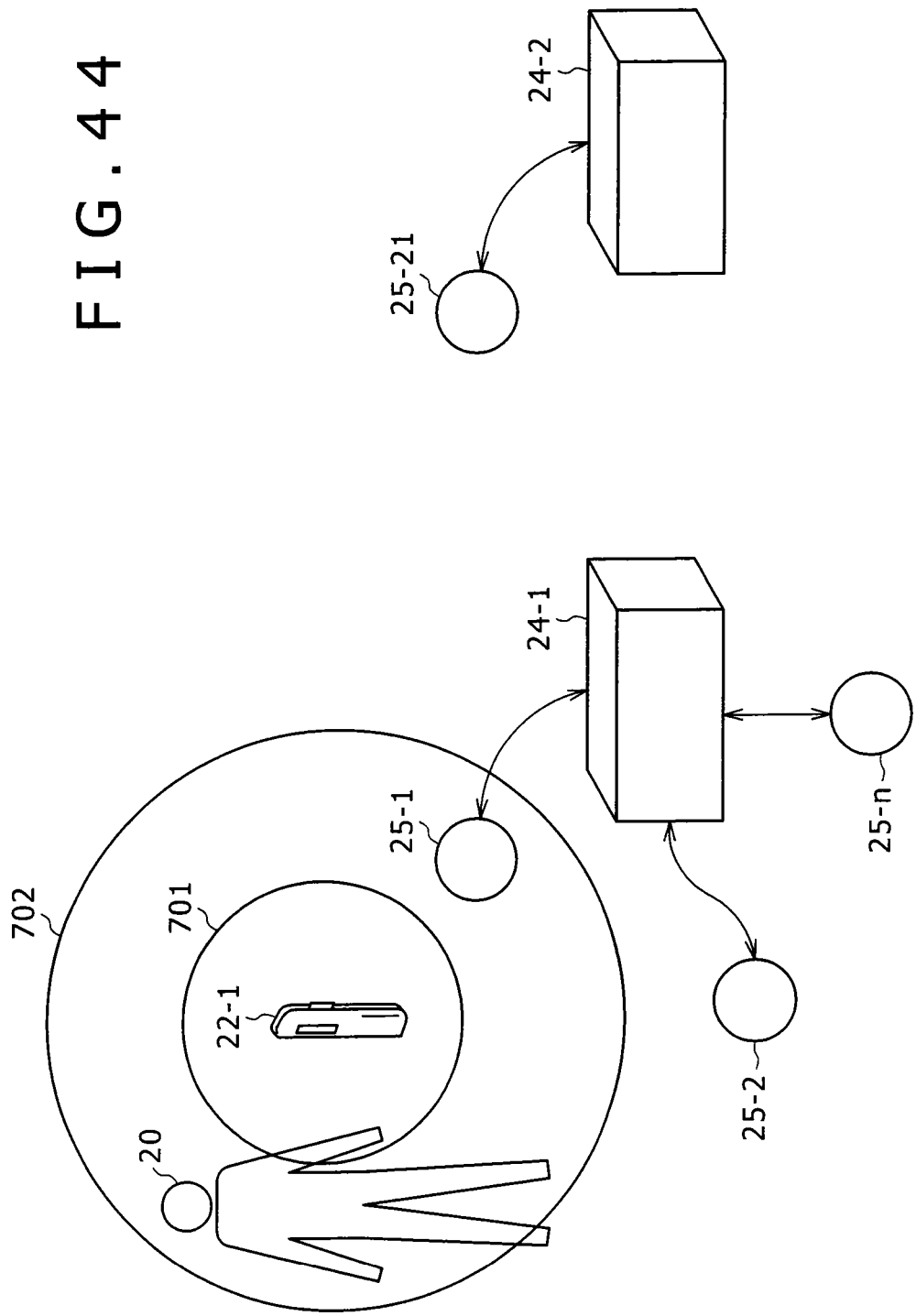
FIG. 44 is a diagram showing a mechanism of detection of an access point.

More detailed description will be made with reference to FIG. 44. When the communication power is the minimum output, the PK 22 can output a radio wave in an area 701. When access points 25-1 to 25-n detect the radio wave from the PK 22, the access points 25-1 to 25-n transmit a response, which is received by the PK 22, whereby the PK 22 detects the access points. Since there is no access point in the area 701, the PK 22 cannot detect an access point. Accordingly, the PK 22 increases the communication output power by one step to output a radio wave in an area 702. An access point 25-1 is present in the area 702. The PK 22 detects the access point 25-1.

Returning to FIG. 43, when the PK 22 determines in step S2502 that an access point is detected, the PK 22 proceeds to step S2503 to communicate with the detected access point 25-1.

On the other hand, when the PK 22 determines in step S2506 that the communication output power is at the maximum, the PK 22 determines that there is no access point in the vicinity of the PK 22. An error process is performed in step S2508. Then the access point detecting process is ended.

Thus, the PK 22 gradually increases the communication output of the PK 22, and communicates with an access point that the PK 22 finds first. Thereby, the PK 22 does not communicate with the access point 25-2 in FIG. 44, for example, and therefore reduces power consumption by communication.

Figure 45:
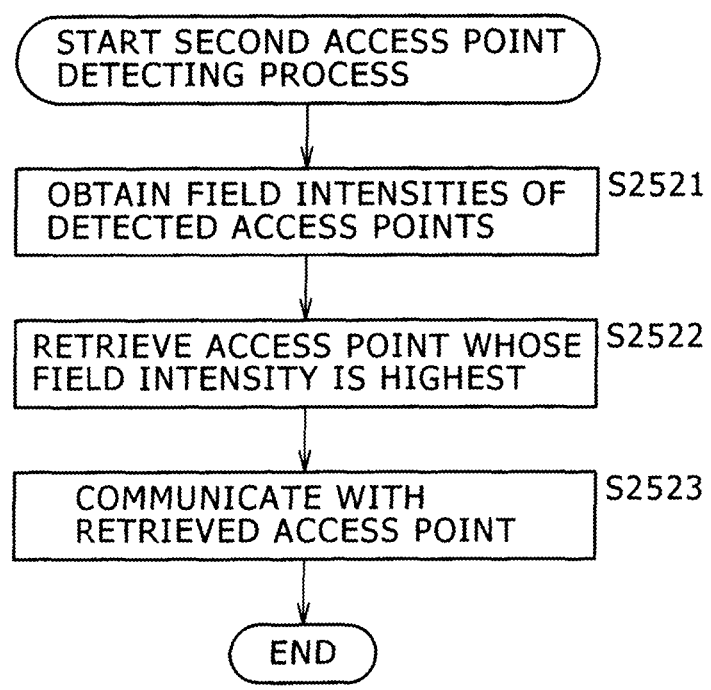
FIG. 45 is a flowchart of assistance in explaining a second access point detecting process.

While an example in which the PK 22 detects an access point while changing the communication output has been described with reference to FIG. 43, there is a case where a plurality of access points are detected at the same communication output of the PK 22. In such a case, an access point may be detected on the basis of a communication output (for example field intensity) emitted from the access point. A second access point detecting process as another example of detection of an access point by the PK 22 will be described with reference to FIG. 45.

In step S2521, the PK 22 obtains the field intensities of detected access points. In step S2522, the PK 22 retrieves an access point whose field intensity is highest. In step S2523, the PK 22 communicates with the retrieved access point.

Figure 46:
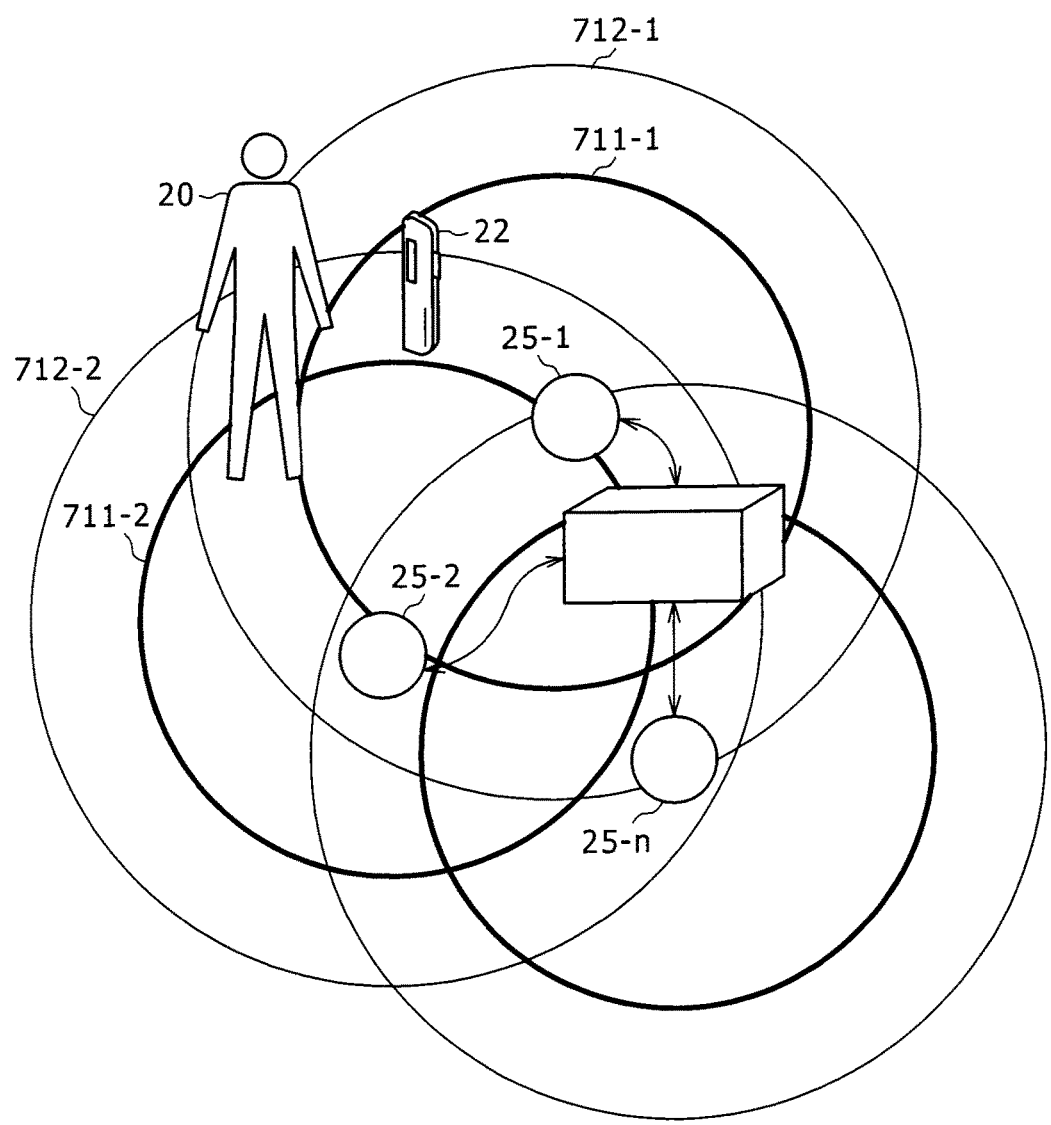
FIG. 46 is a diagram showing a mechanism of detection of an access point.

More detailed description will be made with reference to FIG. 46. In an area 711-1, a radio wave output from the access point 25-1 is received by the PK 22 at a field intensity 1. In an area 712-1, a radio wave output from the access point 25-1 is received by the PK 22 at a field intensity 2. Similarly, in an area 711-2, a radio wave output from the access point 25-2 is received by the PK 22 at a field intensity 1. In an area 712-2, a radio wave output from the access point 25-2 is received by the PK 22 at a field intensity 2.

Now, the PK 22 is receiving a radio wave output from the access point 25-1 at a field intensity 1, and is at the same time receiving a radio wave output from the access point 25-2 at a field intensity 2. In such a case, an access point having the highest field intensity is retrieved from among the plurality of access points (the access points 25-1 and 25-2). In this case, the access point 25-1 is retrieved, and the PK 22 communicates with the access point 25-1.

An access point is thus detected. Thereby, even when an access point is installed in both a room in which the user is present and a room adjacent to the room in which the user is present, for example, the PK 22 can surely perform communication using the access point in the room in which the user is present.

Figure 47:
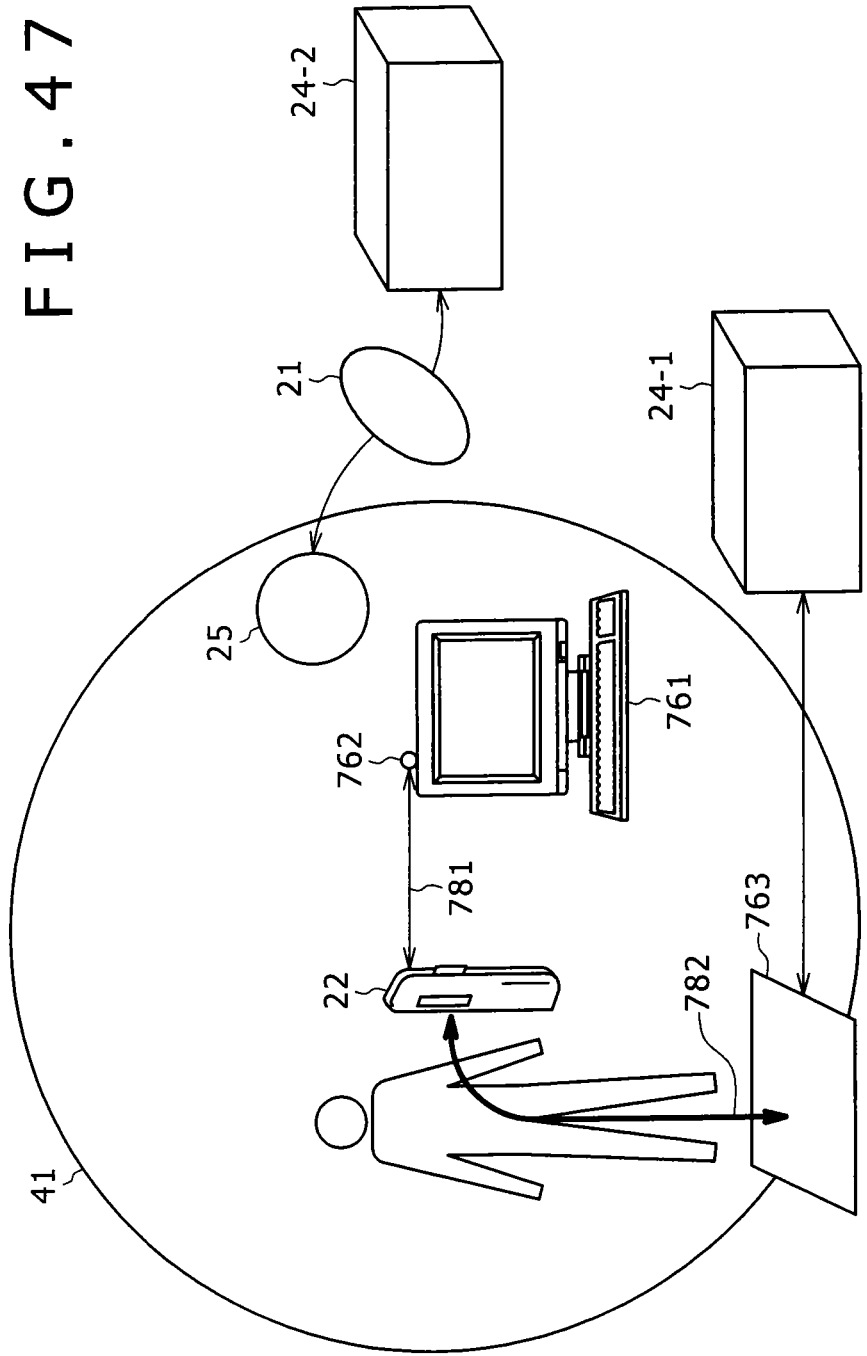
FIG. 47 is a diagram showing a plurality of communication routes of the PK.

Incidentally, the PK is not limited to a single communication path, and there may be a plurality of communication paths. Further, communication in a plurality of communication paths may be performed by different respective methods. FIG. 47 is a diagram showing a plurality of communication paths of the PK 22.

In the same figure, the PK 22 outputs a radio wave in an area 41 to perform RF communication with the access point 25. The PK 22 is then connected to the Internet 21 via the access point 25 to communicate with a service system 24-2. Meanwhile, the PK 22 performs optical communication with a nearby personal computer 761 having an interface 762 for optical communication. In this case, for example, light having directivity such as infrared rays is emitted from the PK 22 and the personal computer 761 along an arrow 781.

In addition, when the user 20 is on an interface 762 for quasi-electrostatic field communication, the PK 22 performs quasi-electrostatic field communication with the interface 762 as shown by an arrow 782. The interface 762 is connected to a service system 24-1. The PK 22 communicates with the service system 24-1 via the interface 762.

Figure 39:
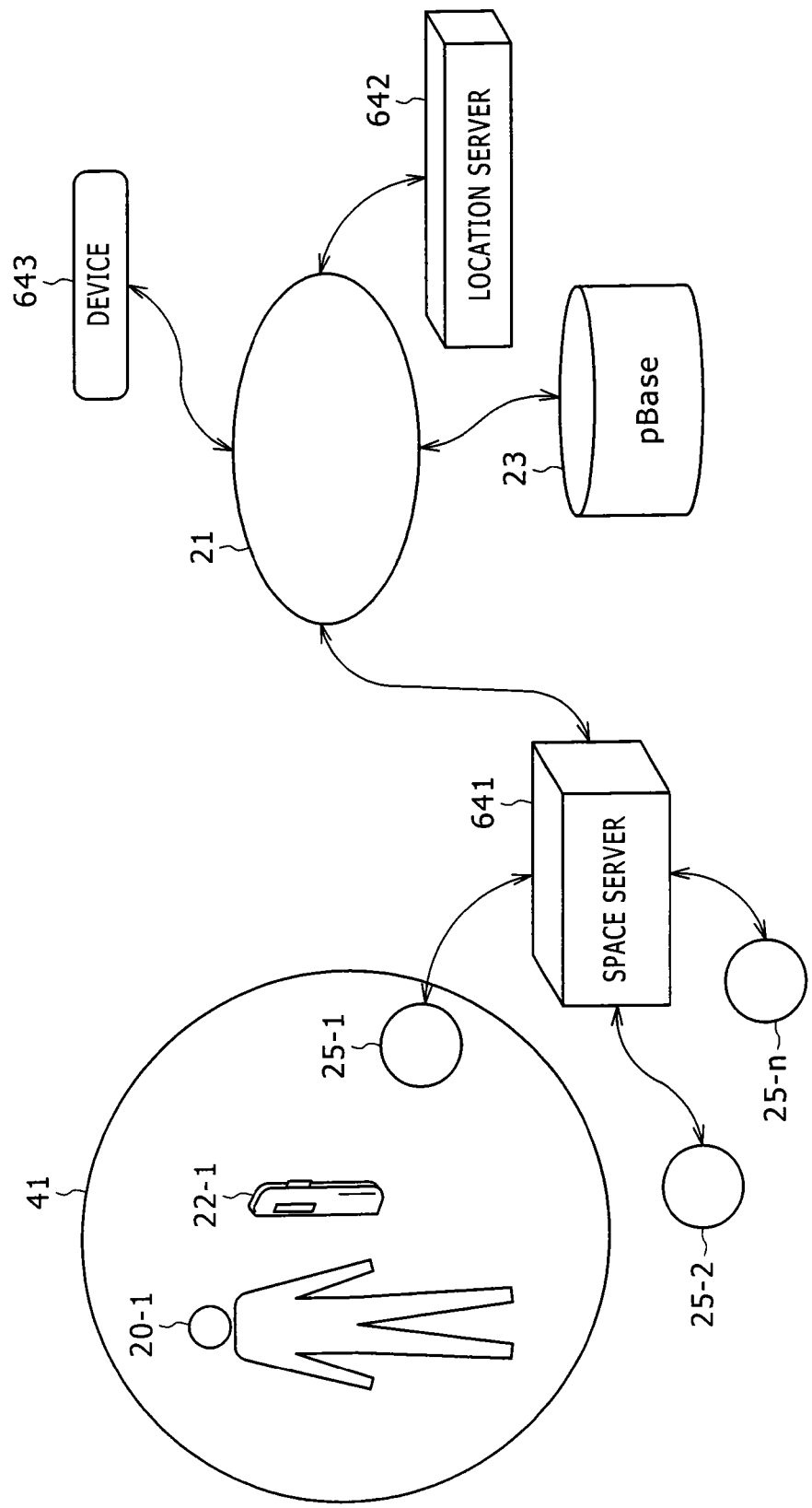
FIG. 39 is a diagram showing an example of determining the location of a user using the PK.

When the present location of the user is determined as shown in FIG. 39, for example, and the present location of the user (PK 22) is determined on the basis of the positional information of the interface 762 for quasi-electrostatic field communication rather than the positional information of the access point 25 for RF communication, the present location of the user can be determined more accurately. Further, when the present location of the user is determined on the basis of the positional information of the interface 762 for optical communication with high directivity, the present location of the user can be determined even more accurately. For example, when a plurality of interfaces 762 for optical communication are provided on a desk in a conference room, and seated users make PKs owned by the respective users communicate with the interfaces 762 for optical communication, it is possible to accurately grasp which user is sitting in which seat.

Alternatively, different communication paths may be set for a communication in the case of initial registration of the service system 24 as represented in FIG. 5 and a communication thereafter. For example, when the initial registration of the service system 24 is performed, since a spoofing preventing method is not yet determined between the PK 22 and the service system 24, the PK 22 performs the initial registration by directly communicating with the service system 24 by a communication that is difficult to intercept, such as optical communication or the like. In a communication thereafter, the PK 22 may communicate with the service system 24 via the Internet 21 by RF communication. Thereby safer service can be provided.

As described above, the PK is a small computer, and thus the PK itself can execute a program to perform a predetermined process (for example a process of displaying a received electronic mail). An example in which the PK executes a program to perform a predetermined process will be described with reference to FIG. 48 and FIG. 49.

Figures 48, 49:
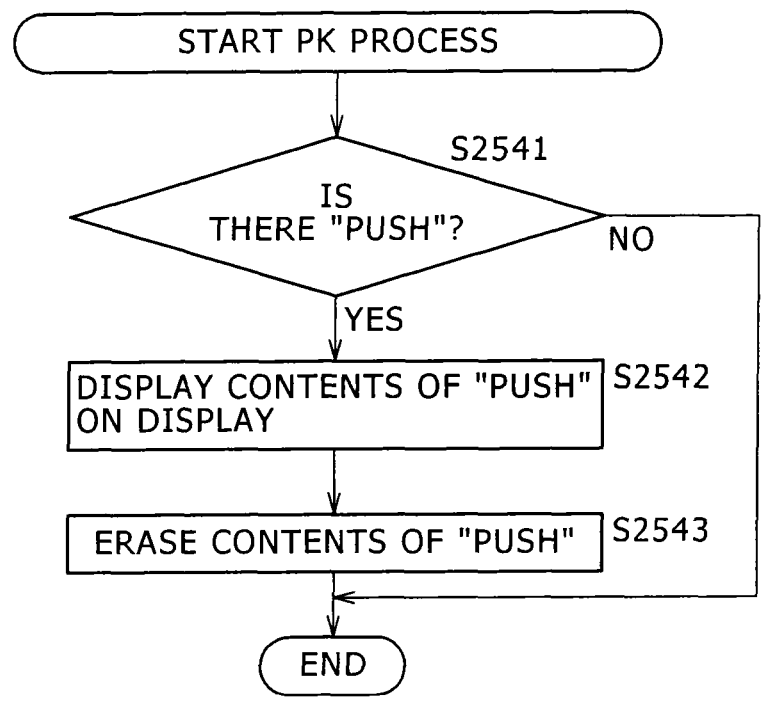
FIG. 48 is a diagram showing an example of composition of PMD.
FIG. 49 is a flowchart of assistance in explaining a program executing process of the PK.

In FIG. 48, suppose that the PK has PMD 801. A property "program" in the PMD 801 indicates a program to be executed by the PK 22, and a program code entity is stored as contents of the property. A property "name" indicates the user ID of the PK, and "foo" is described as contents of the property. A property "push" indicates data to be processed (for example a received electronic mail), and "Urgent message received . . . " is described as contents of the property.

A program executing process of the PK 22 will next be described with reference to FIG. 49. This process may be performed at predetermined intervals (for example intervals of one hour), or may be performed on the basis of a user command. A user command is issued by pressing a switch forming the input unit 106 of the PK 22 a predetermined number of times, for example. In step S2541, the CPU 101 determines whether the property "push" in the PMD 801 has data. When the CPU 101 determines that the property "push" has data, the CPU 101 proceeds to step S2542 to display the contents of the property "push" on a display. In this case, "Urgent message received . . . " is displayed. In step S2543, the CPU 101 erases the contents of the property "push."

When the CPU 101 determines in step S2541 that the property "push" has no data, the process is ended.

Thus, the PK itself executes a program to perform a process of displaying a received electronic mail, for example. When a process as represented in FIG. 6 or FIG. 7 is performed and electronic mail is transmitted and received between the PK as one service system and another PK, for example, the security of the electronic mail can be further enhanced because the users can be correctly authenticated by the spoofing preventing process.

In addition, the pBase 23 can be made to communicate as one service system with the PK 22, so that the PK 22 executes a program on the basis of a request from the pBase 23. A flow of a process in this case will be described with reference to FIG. 50. The same figure corresponds to FIG. 7, and the service system 24 in FIG. 7 is replaced by the pBase 23.

Figure 50:
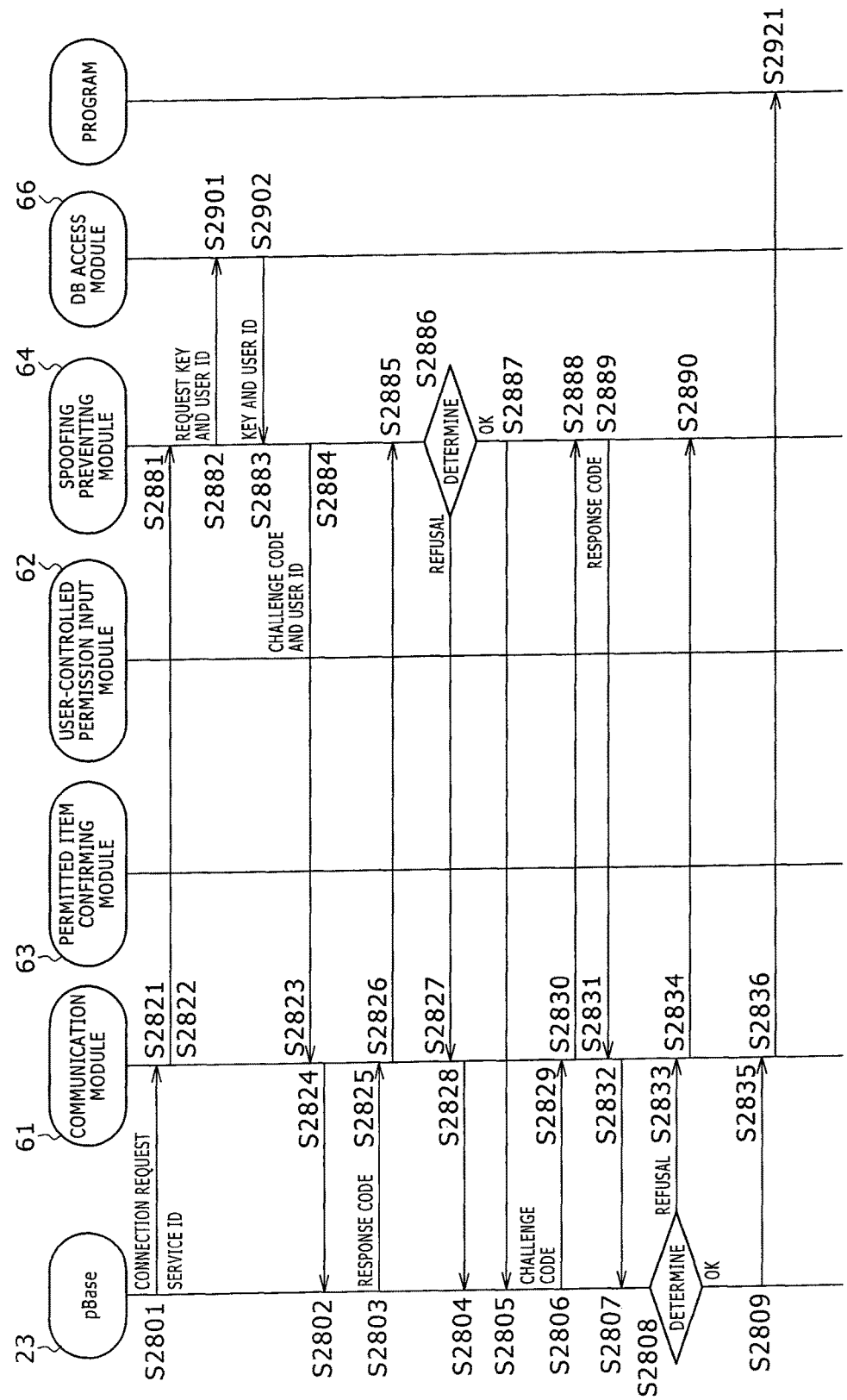
FIG. 50 is an arrow chart showing a flow of a process performed with the pBase as a service system.

A process of steps S2801 to S2808 in FIG. 50 is similar to a process of steps S401 to S408 in FIG. 7, and thus description thereof will be omitted. A process of steps S2821 to S2836 in FIG. 50 is similar to a process of steps S421 to S436 in FIG. 7, and thus description thereof will be omitted. A process of steps S2881 to S2891 in FIG. 50 is similar to a process of steps S481 to S491 in FIG. 7, a process of steps S2901 and S2902 in FIG. 50 is similar to a process of steps S501 and S502 in FIG. 7, and thus description thereof will be omitted.

In s2809, the pBase 23 transmits a request to execute a program to the PK 22. This is received by the communication module 61 of the PK 22 in step S2835. In step S2836, the communication module 61 outputs the contents received in step S2835 to a program via the DB access module 66. This is received in step S2921, and therefore the program is executed.

Thus, the program of the PK 22 is executed on the basis of a request from the pBase 23.

Incidentally, while an example in which the pBase 23 is made to communicate as one service system with the PK 22 has been described with reference to FIG. 50, a PK 22-1 can take a PK 22-2, which is another PK, as one service system, and communicate with the PK 22-2.

Since the PK 22 is carried by the user, power is supplied by a battery or the like. It is therefore desirable to minimize power used for communication. A communication standby process of the PK 22 will be described with reference to FIG. 51.

In step S3101, the CPU 101 communicates in a standby mode. At this time, the PK 22 performs only a quasi-electrostatic field communication that consumes the least power in the plurality of communication paths shown in FIG. 47, for example. In step S3102, the CPU 101 determines whether a communication is received. When the CPU 101 determines that a communication is received, the CPU 101 starts an 802.11b RF communication in step S3103. In step S3104, the CPU 101 determines whether a predetermined time has passed. The CPU 101 stands by until the CPU 101 determines that the predetermined time has passed.

When the CPU 101 determines in step S3104 that the predetermined time has passed, the CPU 101 proceeds to step S3105 to end the 802.11b RF communication. Thereafter the process returns to step S3101 to repeat the process from step S3101 on down.

Figure 52:
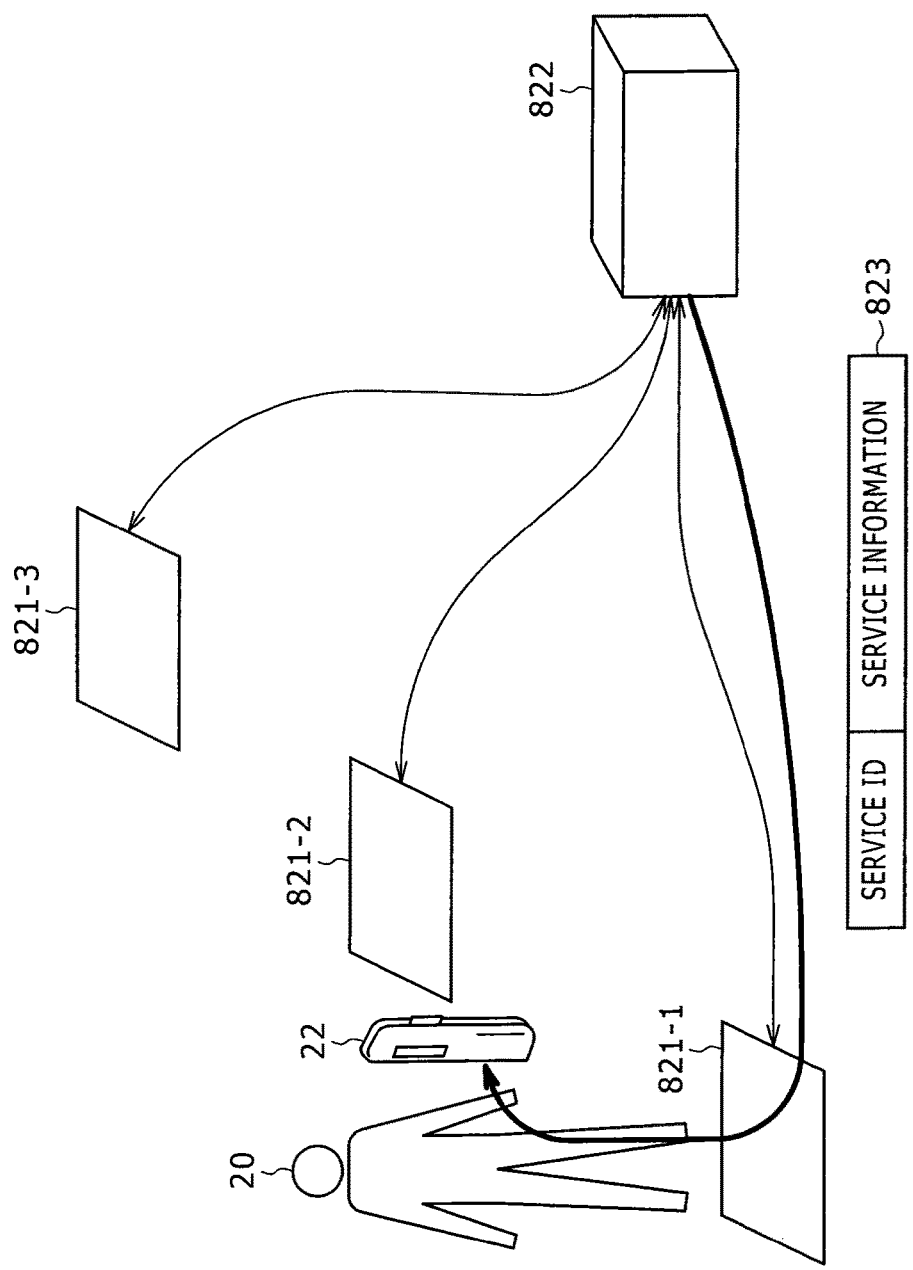
FIG. 52 is a diagram showing an example of a communication during standby.
Figure 53:
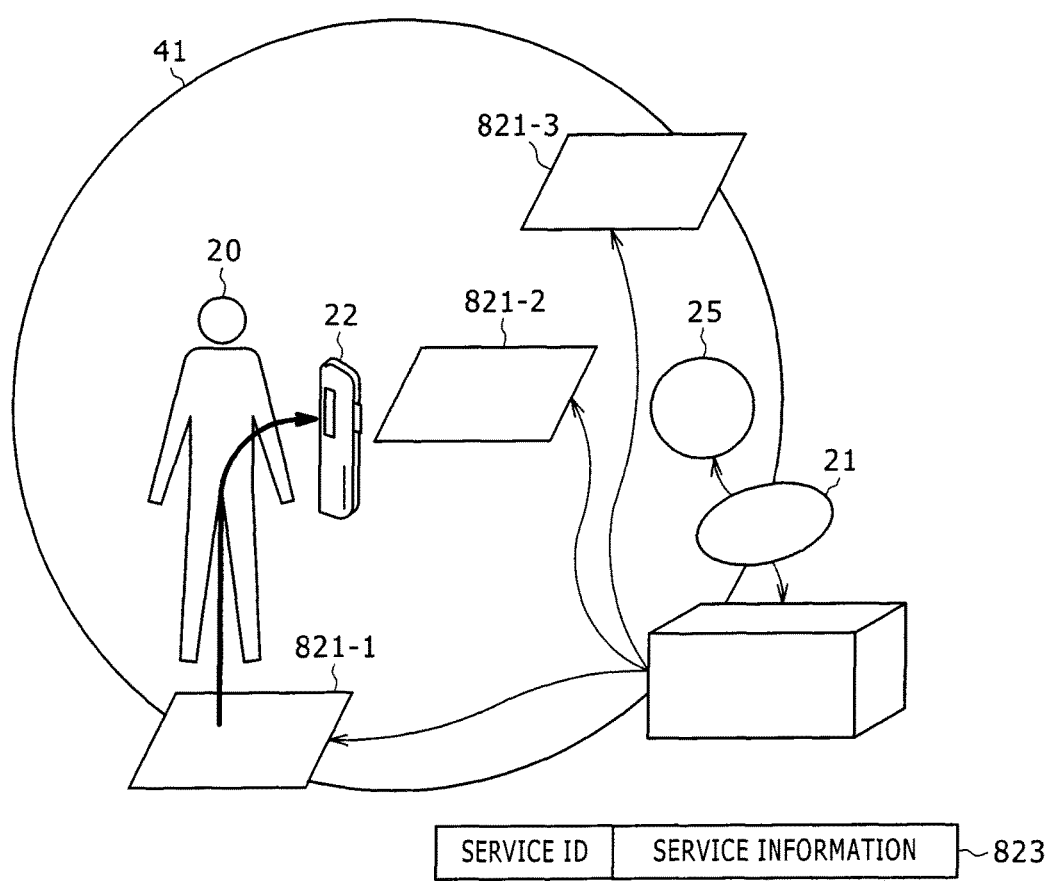
FIG. 53 is a diagram showing an example in which RF communication is performed.

More detailed description will be made with reference to FIG. 52 and FIG. 53. In FIG. 52, when the user 20 is on an interface 821-1 to 821-3 for quasi-electrostatic field communication, the PK 22 performs a quasi-electrostatic field communication with the interface 762. A service system 822 is connected to the interfaces 821-1 to 821-3. The service system 822 is transmitting a packet 823 formed by a service ID and service information to the interfaces 821-1 to 821-3 at all times. Since the user 20 is now on the interface 821-1, the PK 22 receives the packet 823, and thus determines that a communication is received (step S3102 in FIG. 51).

Figure 51:
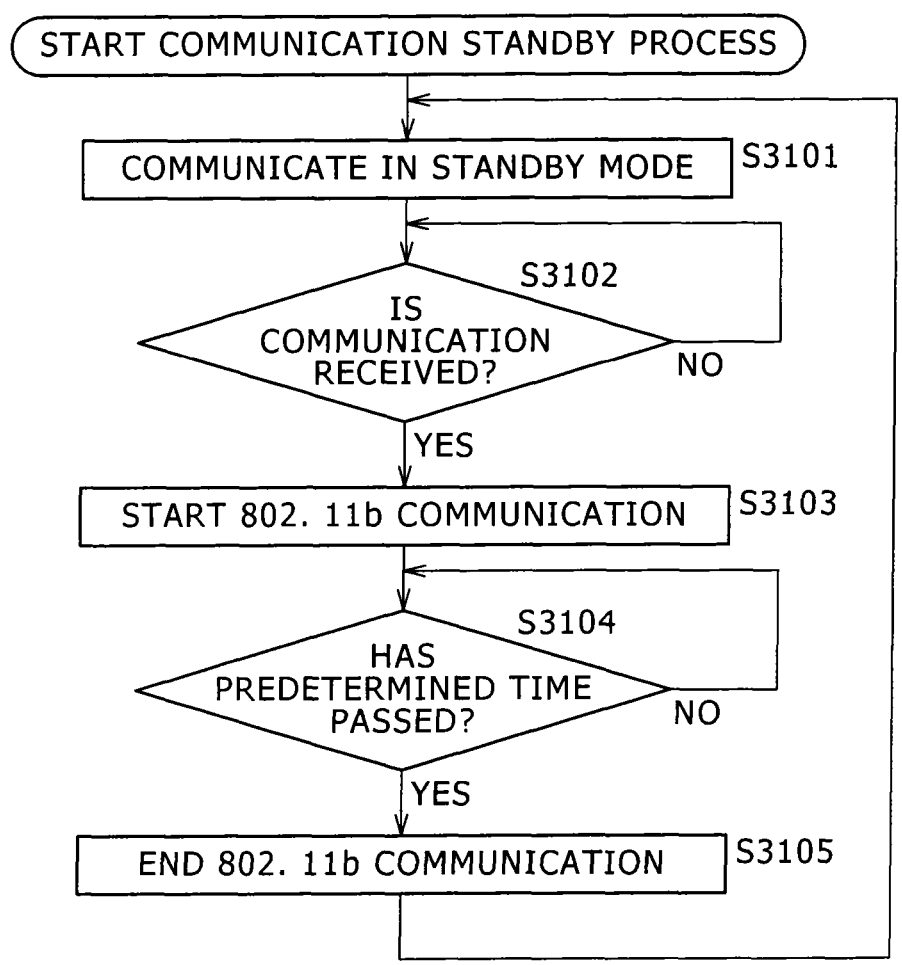
FIG. 51 is a flowchart of assistance in explaining a communication standby process.

Then, the PK 22 starts an RF communication (step S3103 in FIG. 51). As shown in FIG. 53, the PK 22 communicates with an access point 25 in an area 41, and communicates with the service system 822 via the access point 25.

It is thus possible to perform quasi-electrostatic field communication that consumes less power than RF communication at normal times (in the standby mode) and perform high-speed communication by using RF communication having a higher communication speed than quasi-electrostatic field communication only when a communication with the service system 822 is necessary. Therefore power consumption can be reduced, and efficient communication can be performed.

Figure 54A:
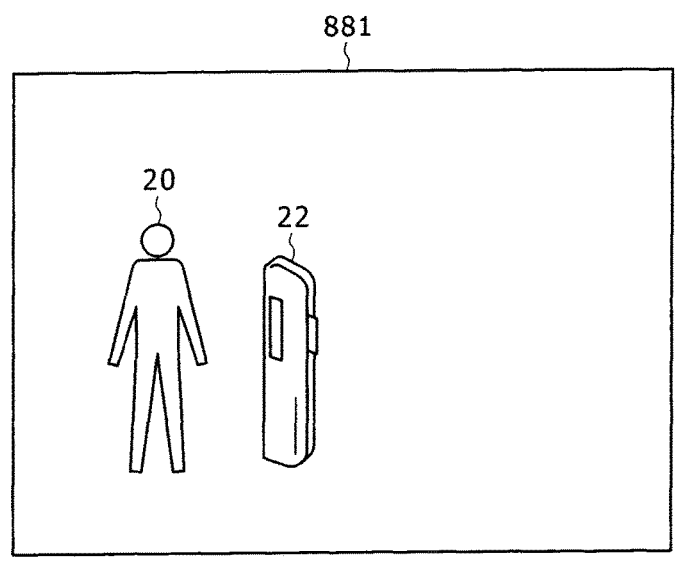
FIG. 54A is a diagram showing an example of notifying the user of a message by the PK.
Figure 54B:
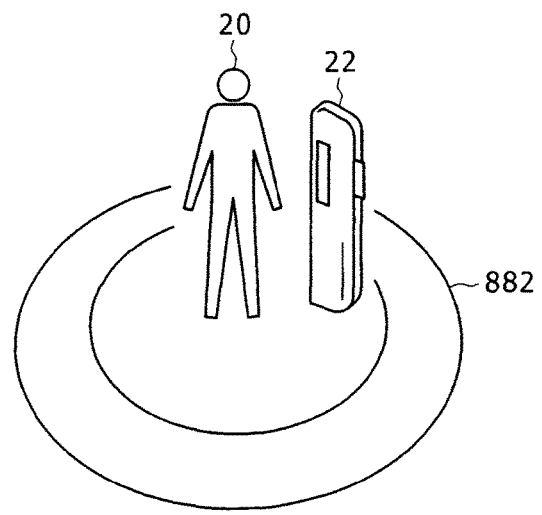
FIG. 54B is a diagram showing an example of notifying the user of a message by the PK.

Examples of a combination of a plurality of services realized by the PK or the pBase will next be described with reference to FIGS. 54 to 58. In FIG. 54A, when the user carrying the PK 22 enters a room having an access point installed therein, the contents of a message for the user 20 are transmitted from the pBase 23. Thus, a message "A communication received from A," for example, is displayed on the display of the PK 22. Alternatively, as shown in FIG. 54B, a display device 882 installed in a floor in a room 881 may be turned on to notify the user 20 that there is a message for the user 20.

Notified that there is a message for the user 20, the user 20 makes the PK 22 communicate with a personal computer 901 to make the personal computer 901 obtain PMD including a communication list from the pBase 23 and display the communication list, as shown in FIG. 55. The communication list describes a list of people from whom communications to the user 20 were received, and for example shows that communications were received from four people A to D.

The people A to D also have a PK. The present locations of the respective people are determined by a method as represented in FIG. 39. The communication list for example shows that the person A is moving, the person B is in the seat of the person B, the person C is in a conference room C, and the person D left a message.

Figure 56:
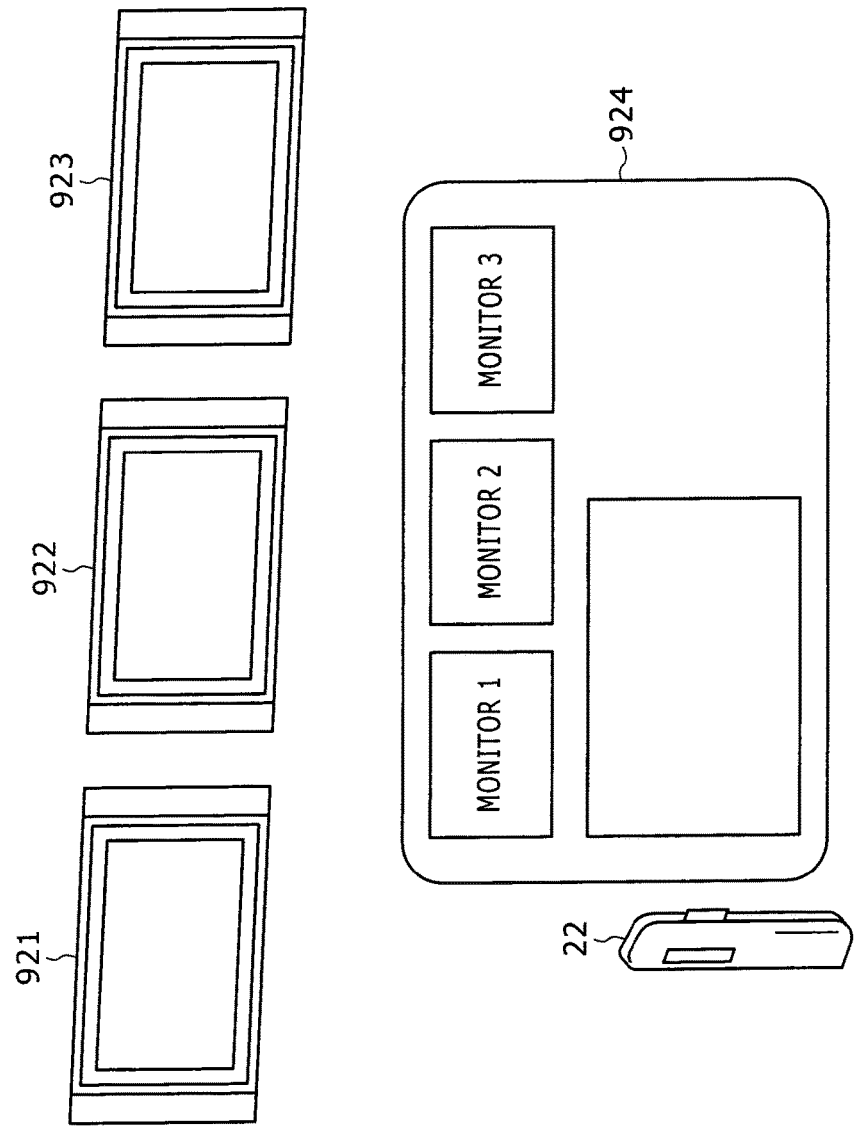
FIG. 56 is a diagram showing devices in a conference room.

When the user 20 desires to contact the person C in the conference room, for example, the user 20 enters a nearby conference room A to perform videoconferencing with the conference room C. As shown in FIG. 56, a monitor 921 for displaying an electronic document or the like, a monitor 922 for displaying the face of the person C, a monitor 923 for displaying the entire conference room C, and a console terminal 924 having a display with a touch pad are installed in the conference room A.

Figure 33:
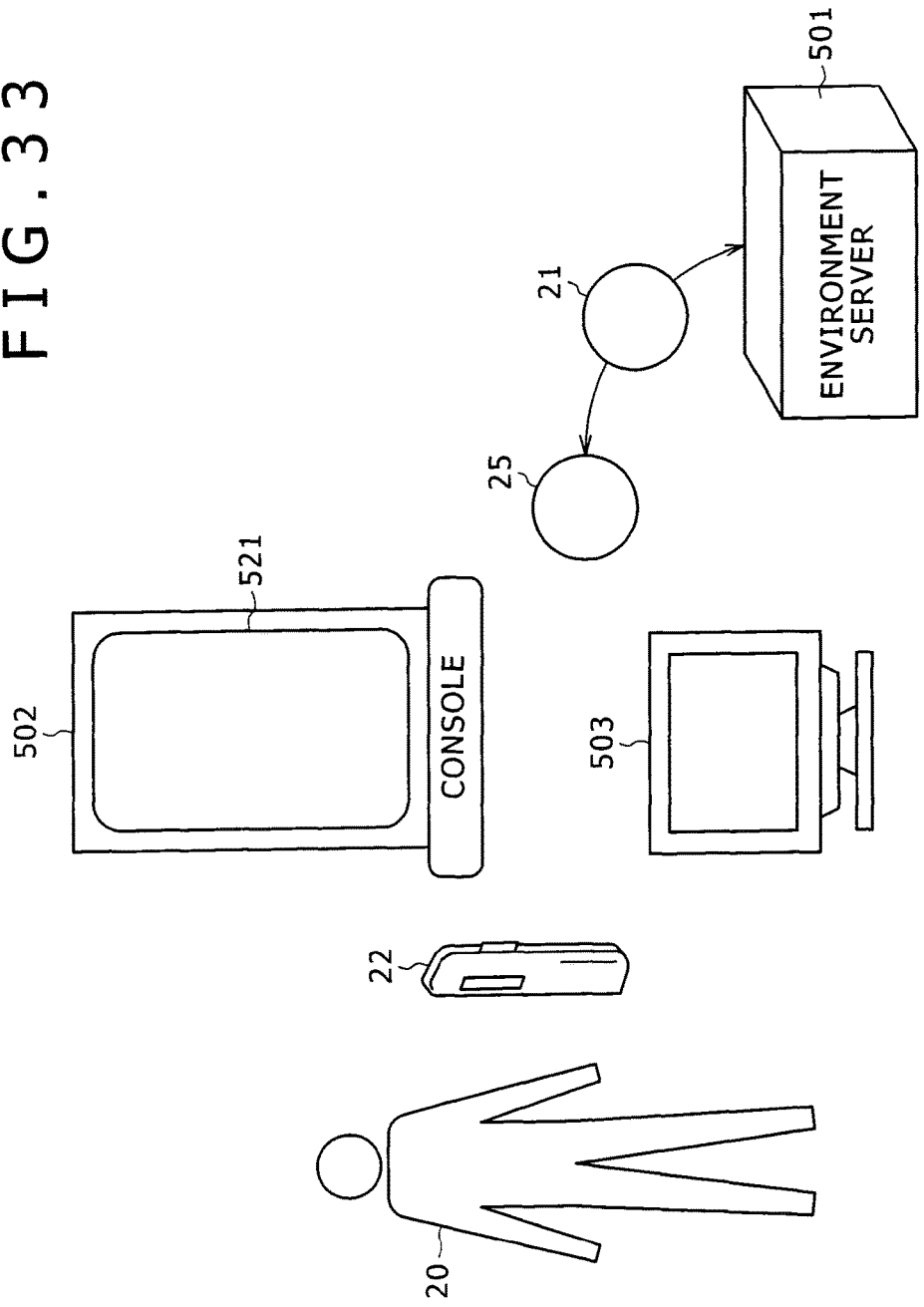
FIG. 33 is a diagram showing an example of installing control code in a console terminal.

At this time, the user 20 installs control codes for the monitors 921 to 923 on the console terminal 924 by a method as represented in FIG. 33, and controls the monitors 921 to 923 by operating the console terminal 924.

Figure 57:
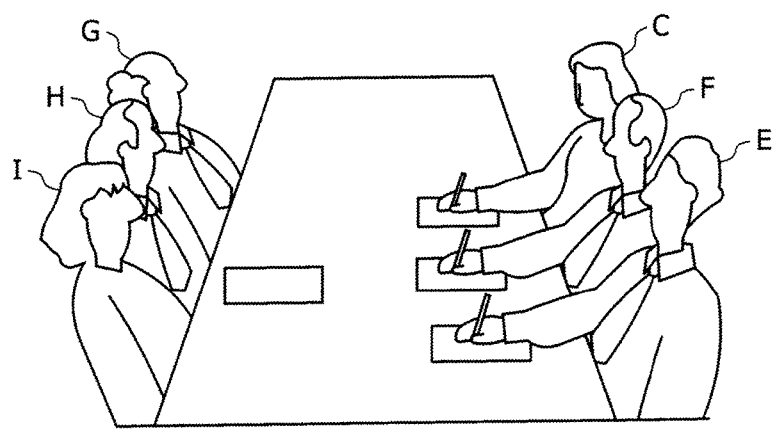
FIG. 57 is a diagram showing seated positions in a conference room.

As shown in FIG. 57, when six people, that is, the person C and people F to I are present in the conference room C, suppose that each person owns his/her PK, and each person makes his/her PK communicate with an optical communication device installed on a desk in the conference room C. Optical communication has high directivity, and thus enables a place where the PK is present to be determined accurately. Thereby, for example, the names, posts, seated positions and the like of the person C and the people F to I are displayed on the console terminal 924 in the conference room A.

Thus, the PK and the pBase can provide a mechanism of communication highly convenient to the user.

Figure 58:
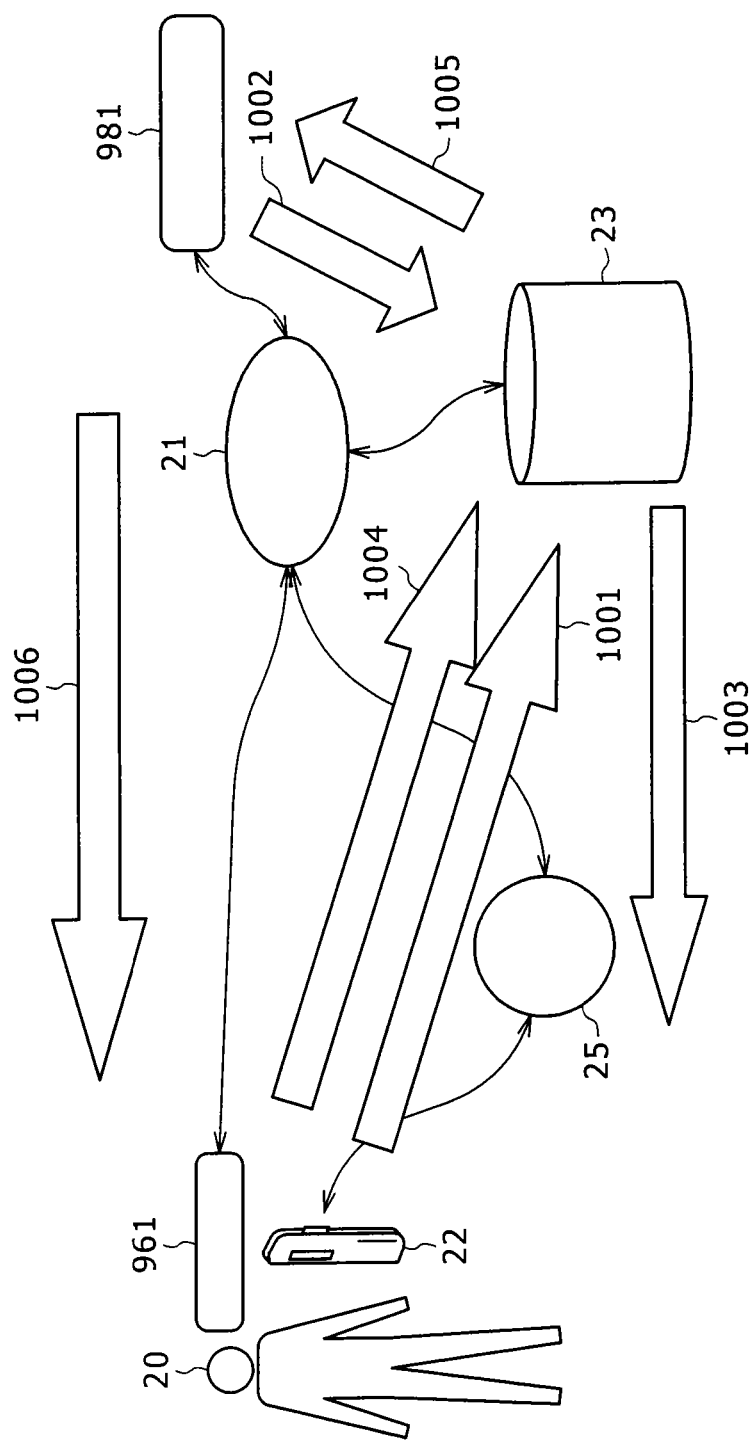
FIG. 58 is a diagram showing an example of reducing power consumption of an IP telephone.

FIG. 58 is a diagram of assistance in explaining an example of reducing standby power of an IP telephone 961 by a combination of the PK 22 and the pBase 23. The access point 25 and the IP telephone 961 are present in the vicinity of the user 20 carrying the PK 22. The IP telephone 961 is connected to the Internet 21 for a telephone conversation with a predetermined person. Incidentally, the IP telephone 961 is normally turned off to reduce power consumption.

Figure 37:
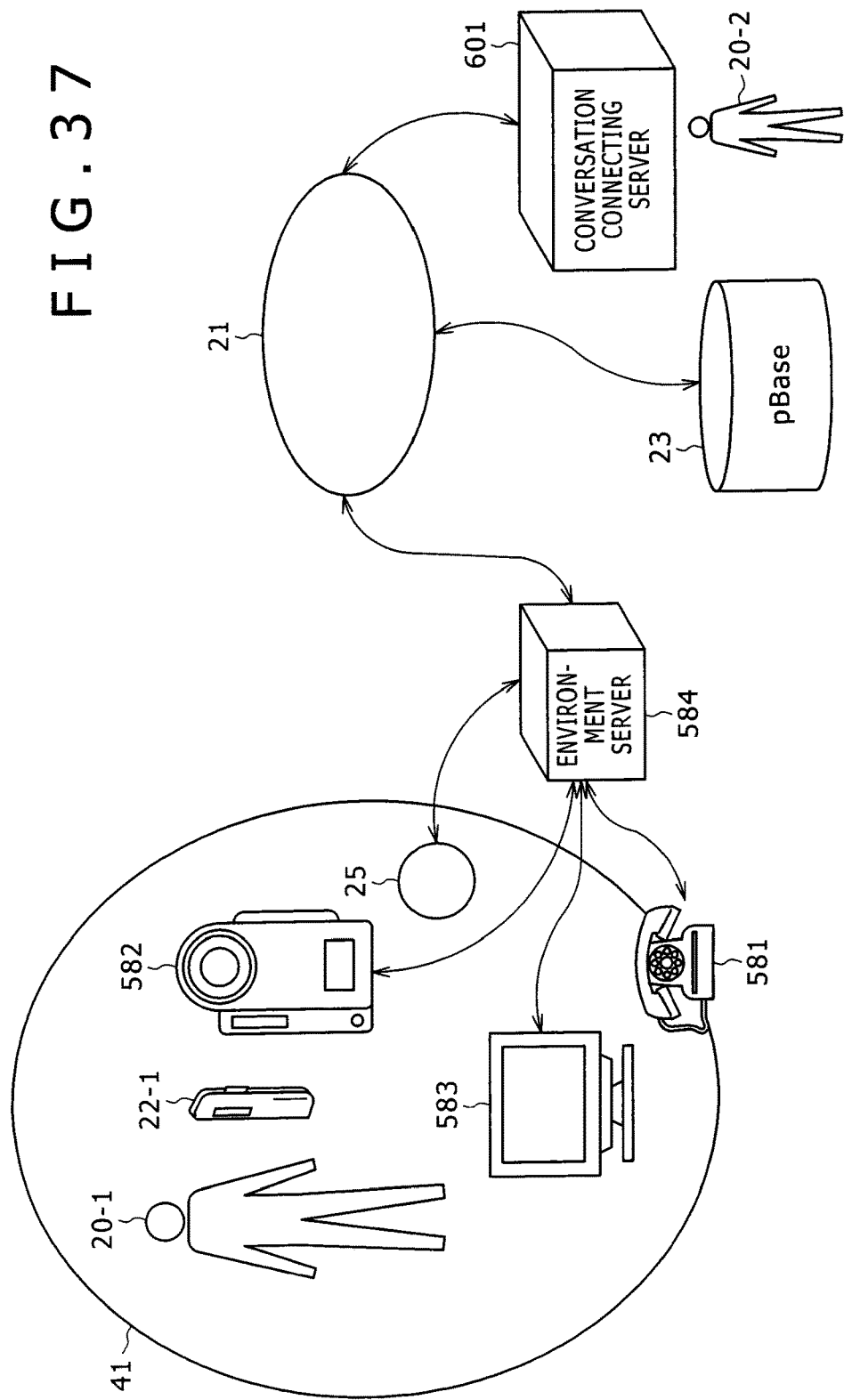
FIG. 37 is a diagram showing an example of conversation connecting service.

In this case, the PK 22 communicates with the pBase 23 via the access point 25 to transmit PMD indicating devices available to the user 20 to the pBase 23 by a method as represented in FIG. 37 (an arrow 1001 in FIG. 58). A device 981 that desires a conversation with the user 20 makes a conversation connection request to a conversation connecting server on the Internet 21, and the conversation connection request is transmitted to the pBase 23 (an arrow 1002 in FIG. 58). The pBase 23 communicates with the PK 22 to notify the conversation connection request to the PK 22 (an arrow 1003 in FIG. 58). As a result, as described above with reference to FIG. 49, the connection request is displayed on the display of the PK 22.

When the user 20 notices the conversation connection request and turns on the IP telephone 961, information indicating that the IP telephone 961 has become useable is transmitted to the pBase 23 (an arrow 1004 in FIG. 58). Further, the pBase 23 notifies the device 981 that the IP telephone 961 has become useable (an arrow 1005 in FIG. 58). Thereby, a conversation using the device 981 and the IP telephone 961 is started.

Thus, the user 20 can use the IP telephone 961 while reducing power consumption.

While the above description has been made supposing that the PK 22 is a small computer that can be carried by the user, the software 60 in FIG. 4 can be implemented in a general-purpose personal computer, for example, so that the general-purpose personal computer is used as a PK.

Figure 59:
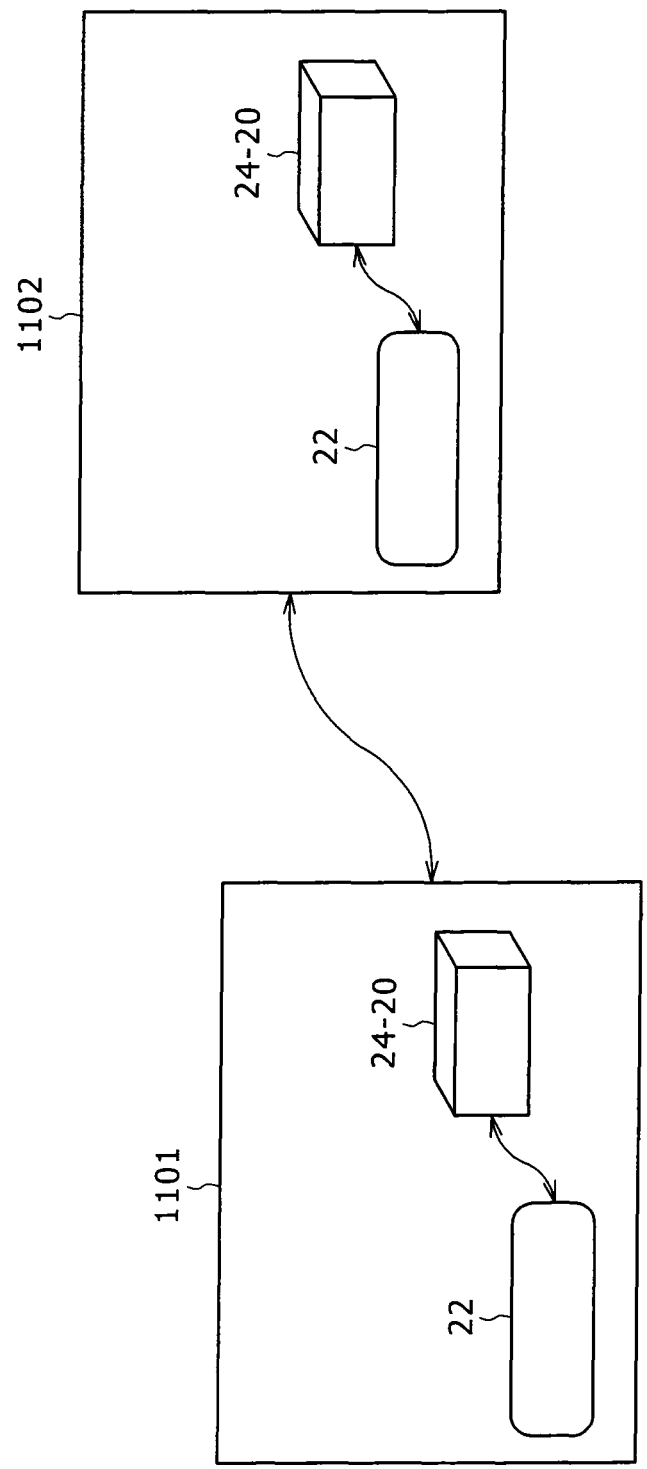
FIG. 59 is a diagram showing an example of implementing the software of the PK and the software of a service system in one device.

FIG. 59 is a diagram showing an example of implementing the software 60 of the PK 22 in portable devices 1101 and 1102 carried by the user. In the same figure, the portable devices 1101 and 1102 are small music reproducing devices such for example as Walkmans (trademark) that reproduce music data desired by the user. The software 60 of the PK 22 is implemented in the portable devices 1101 and 1102, and the software of a service system 24-20 as a service system obtaining or transmitting music data matching user preference information is also implemented in the portable devices 1101 and 1102.

That is, the portable devices 1101 and 1102 are a realization of the PK 22 and the service system 24-20 as one information processing device. The user can be provided with service without sending or receiving data by communication. As a result, the user can listen to music suiting the taste of the user anywhere the user goes on the basis of the preference information of PMD stored in the portable device 1101 or 1102.

In addition, the portable devices 1101 and 1102 may be provided with a communication function. This enables the user 22-11 of the portable device 1101 and the user 22-12 of the portable device 1102 to exchange music data of music suiting the tastes of the users when the users meet on the road, for example.

Figure 60:
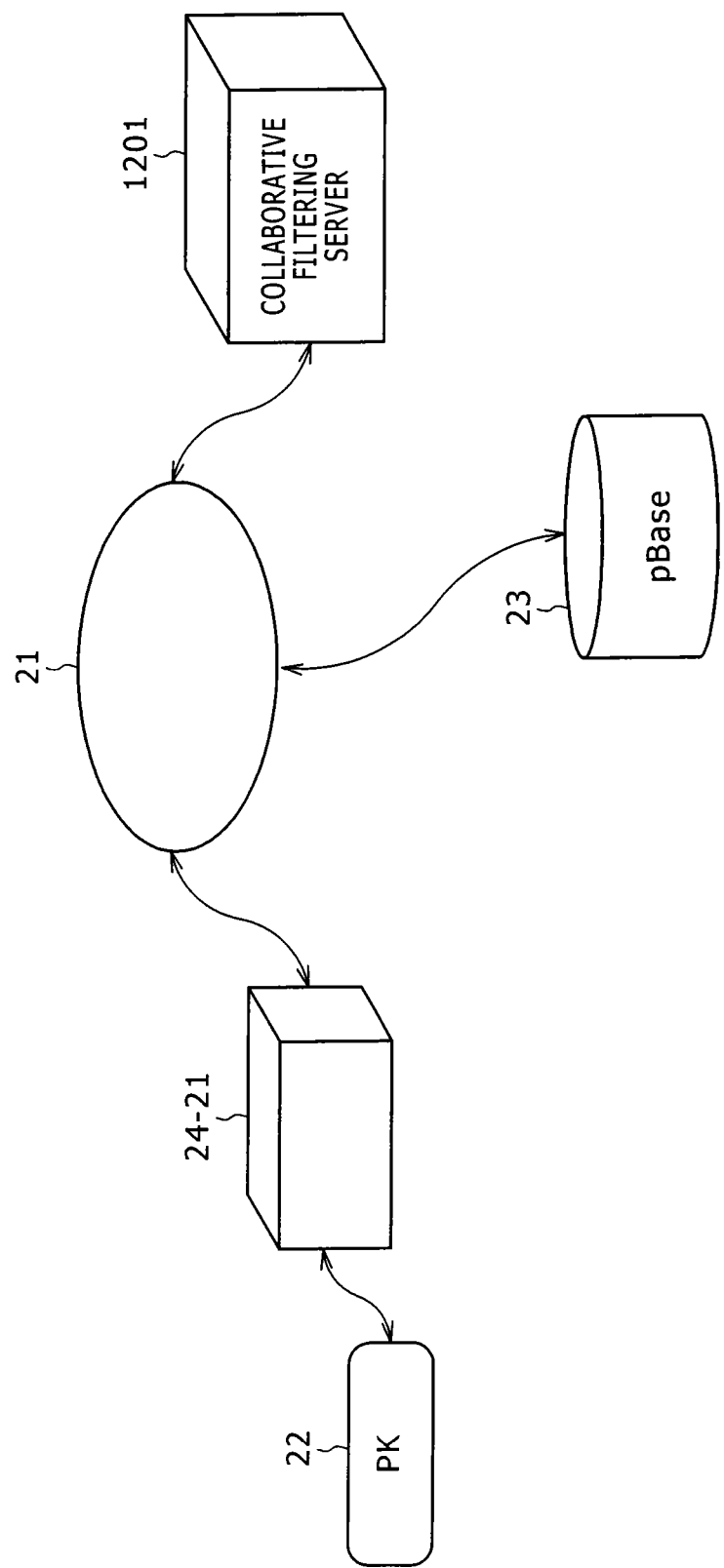
FIG. 60 is a diagram showing an example of performing personalization using a collaborative filtering server and PMD.

Incidentally, description with reference to FIG. 25 has been made of an example of performing personalization on the basis of the preference information in the PMD of the user; however, when user preferences are already analyzed in another server connected to the network, for example, more detailed personalization can be performed with a result of the analysis. In FIG. 60, a service system 24-21 connected to the Internet 21 recommends a television program on the basis of the preference information of the user of the PK 22. On the other hand, the Internet 21 is connected with a collaborative filtering server 1201 that analyzes user preferences by collaborative filtering.

The collaborative filtering server 1201 obtains the PMD of users from the pBase 23, and analyzes histories of viewing (operation) which histories are included in the PMD. The collaborative filtering server 1201 compares a history of viewing of a user with histories of viewing of other users, and obtains a history of viewing of another user which history is similar to that of the user in question. The collaborative filtering server 1201 obtains and recommends the name of a program viewed by the other user whose history of viewing is similar (who has a similar taste) to that of the user in question but not yet viewed by the user in question.

The service system 24-21 further selects the program thus recommended by the collaborative filtering server 1201 on the basis of the PMD of the PK 22, and recommends the program to the user. Thereby, the user can be recommended the program matching the preferences of the user more closely.

Of course, the program recommended by the collaborative filtering server 1201 may be recommended directly to the user. Since preference information is already stored in the PMD of the user by the PK 22 or the pBase 23, a processing load on the collaborative filtering server 1201 can be reduced as compared with a case of collecting preference information directly from a history of viewing or the like of a device (for example a television receiver or the like) and recommending a program without using the PK 22 or the pBase 23.

The steps for carrying out the series of processes described in the present specification include not only processes carried out in time series in the described order but also processes carried out in parallel or individually and not necessarily in time series.

The invention claimed is:

1. An information processing device communicating with a plurality of service systems, the information processing device comprising:
   circuitry configured to
      receive a service ID and information from a service system, wherein the service ID specifies the service system and the information indicates metadata of user information to be read or changed by the service system,
      determine whether a user refuses access to the metadata to be read or changed based on user input, and
      set access permission information based on the determination, wherein the access permission information indicates whether access from the service system to the metadata is permitted or not.

2. The information processing device according to claim 1, wherein
   the metadata of user information includes user preferences,
   the circuitry is further configured to analyze the user preferences using an operation history of the service system, and
   the circuitry is further configured to update the metadata of user profile information based on the analysis of the user preferences.

3. The information processing device according to claim 2,
   wherein the circuitry is further configured to provide recommended information, based on the user preferences, to a second service system.

4. The information processing device according to claim 1, wherein the metadata of user information includes user name, user location, and user preferences.

5. An information processing method comprising:
  receiving a service ID and information from a service system, wherein the service ID specifies the service system and the information indicates metadata of user information to be read or changed by the service system;
  determining whether a user refuses access to the metadata to be read or changed based on user input; and
  setting access permission information based on the determination, wherein the access permission information indicates whether access from the service system to the metadata is permitted or not.

6. The information processing method according to claim 5, wherein the metadata of user information includes user preferences, and the information processing method further comprises
  analyzing the user preferences using an operation history of the service system; and
  updating the metadata of user information based on the analysis of the user preferences.

7. The information processing method according to claim 6, further comprising: providing recommended information, based on the user preferences, to a second service system.

8. The information processing method according to claim 5, wherein the metadata of user information includes user name, user location, and user preferences.

9. An information processing system, comprising:
  a first service system including first circuitry configured to obtain metadata of user information;
  a second service system including second circuitry configured to obtain authentication identification information;
  a server apparatus comprising:
    third circuitry configured to
      receive a service ID and information from the first service system, wherein the service ID specifies the service system and the information indicates metadata of user information to be read or changed by the service system,
      determine whether a user refuses access to the metadata to be read or changed based on user input, and
      set access permission information based on the determination, wherein the access permission information indicates whether access from the service system to the metadata is permitted or not,
    wherein the metadata of user profile information includes at least one of user name, user location, user preferences, service identification information, or information provided from another user.

10. The information processing system according to claim 9, wherein
  the metadata of user information includes user preferences,
  the third circuitry is further configured to analyze the user preferences using an operation history of the first service system, and
  the third circuitry is further configured to update the metadata of user information based on the analysis of the user preferences.

11. The information processing system according to claim 10,
  wherein the third circuitry is further configured to provide recommended information, based on the user preferences, to the second service system.

12. The information processing system according to claim 9, wherein the metadata of user information includes user name, user location, and user preferences.

13. A non-transitory computer readable medium having stored thereon a program that, when executed by a computer, causes the computer to implement an information processing method comprising:
  receiving a service ID and information from a service system, wherein the service ID specifies the service system and the information indicates metadata of user information to be read or changed by the service system;
  determining whether a user refuses access to the metadata to be read or changed based on user input; and
  setting access permission information based on the determination, wherein the access permission information indicates whether access from the service system to the metadata is permitted or not.

14. The non-transitory computer readable medium according to claim 13, wherein the metadata of user information includes user preferences, and
  the information processing method further comprises:
    analyzing the user preferences using an operation history of the service system; and
    updating the metadata of user information based on the analysis of the user preferences.

15. The non-transitory computer readable medium according to claim 14, wherein the information processing method further comprises:
  providing recommended information, based on the user preferences, to a second service system.

16. The non-transitory computer readable medium according to claim 13, wherein the metadata of user profile information includes user name, user location, and user preferences.

17. A service system comprising:
  circuitry configured to
    obtain metadata of user information, and
    transmit the metadata of user information to an information processing device having second circuitry configured to receive a service ID of the service system and the metadata of user information to be read or changed by the service system, determine whether a user refuses access to the metadata to be read or changed based on user input, and set access permission information based on the determination, wherein the access permission information indicates whether access from the service system to the metadata is permitted or not,
  wherein the metadata of user profile information includes at least one of user name, user location, user preferences, service identification information, or information provided from another user.

18. The first client terminal according to claim 17, wherein the metadata of user information includes user name, user location, and user preferences.

19. The information processing apparatus according to claim 1, wherein the metadata of user information is provided to a second service system in response to second authentication identification information received from the second service system matching first authentication identification information of the user associated with the metadata of user information.

20. The information processing apparatus according to claim 1, wherein the metadata of user information is distinct from the second authentication identification information.

* * * * *